United States Patent [19]
Rudow et al.

[11] Patent Number: 5,689,431
[45] Date of Patent: Nov. 18, 1997

[54] GOLF COURSE YARDAGE AND INFORMATION SYSTEM

[75] Inventors: Richard W. Rudow, Mesa; John Coffee, Gilbert; Douglas L. Lecker, Chandler; Tuan Pham, Phoenix; Kirk Bingeman, Chandler, all of Ariz.

[73] Assignee: Leading Edge Technologies, Inc., Chandler, Ariz.

[21] Appl. No.: 423,295

[22] Filed: Apr. 18, 1995

[51] Int. Cl.⁶ .............................. G01S 5/10; G01S 11/02
[52] U.S. Cl. .................... 364/449.7; 364/449.2; 364/449.9; 364/460; 340/990; 340/995; 342/457
[58] Field of Search .................... 364/449, 410, 364/460, 449.2, 449.7, 449.9; 340/990, 995; 342/357, 457

[56] References Cited

U.S. PATENT DOCUMENTS

| | | | |
|---|---|---|---|
| 4,480,310 | 10/1984 | Alvarez | 364/450 |
| 4,489,314 | 12/1984 | Miller | 340/568 |
| 4,656,476 | 4/1987 | Tavitgian | 340/993 |
| 4,703,444 | 10/1987 | Storms, Jr. et al. | 364/561 |
| 4,823,086 | 4/1989 | Whitmire et al. | 324/434 |
| 4,906,825 | 3/1990 | Wu | 235/95 |
| 4,910,677 | 3/1990 | Remedio et al. | 364/410 |
| 4,926,161 | 5/1990 | Cupp | 340/572 |
| 5,044,634 | 9/1991 | Dudley | 273/32 |
| 5,056,106 | 10/1991 | Wang et al. | 375/1 |
| 5,086,390 | 2/1992 | Matthews | 364/410 |
| 5,095,430 | 3/1992 | Bonito et al. | 364/410 |
| 5,097,416 | 3/1992 | Matthews | 364/410 |
| 5,127,044 | 6/1992 | Bonito et al. | 379/88 |
| 5,214,757 | 5/1993 | Mauney et al. | 395/161 |
| 5,319,548 | 6/1994 | Germain | 364/410 |
| 5,364,093 | 11/1994 | Huston et al. | 273/32 |
| 5,434,789 | 7/1995 | Fraker et al. | 364/460 |
| 5,438,518 | 8/1995 | Bianco et al. | 364/460 |
| 5,469,175 | 11/1995 | Boman | 342/357 |
| 5,507,485 | 4/1996 | Fisher | 273/32 R |
| 5,524,081 | 6/1996 | Paul | 364/460 |
| 5,528,518 | 6/1996 | Bradshaw et al. | 364/561 |

FOREIGN PATENT DOCUMENTS

| | | |
|---|---|---|
| 2246198 | 1/1992 | United Kingdom . |
| 9312439 | 6/1993 | WIPO . |

OTHER PUBLICATIONS

Blackwell, Earl G., *Overview of Differential GPS Mehtods;* Jan. 1985, pp. 89–100.

*Primary Examiner*—Michael Zanelli
*Attorney, Agent, or Firm*—Wigman, Cohen, Leitner & Myers, P.C.

[57] ABSTRACT

A player position determining and course management system for a golf course having a plurality of roving units for use by players in playing the course is disclosed. Each roving unit includes a central processing unit (CPU) including a data processor for executing various tasks ranging from fastest execution of a task to slowest execution of a task on a schedule of priorities of task completion, a real-time means for controlling the processor to give the tasks priority ranging from fastest execution of a task with highest priority to slowest execution of a task with lowest priority, and a means for precisely timing functions of the system including modulating means utilizing a common digital modulation technique for digitally modulating data transmitted to and from all of the roving units. Each of the roving units include a monitor for displaying the golf course including each of the holes with its tee box, fairway, green, cup and hazards, as well as the position of the roving unit on the course in real time. Additionally, the system includes a course management base station for transmitting and receiving information to the roving units and a monitor for displaying the the location of each roving unit on the golf course in real time.

48 Claims, 16 Drawing Sheets

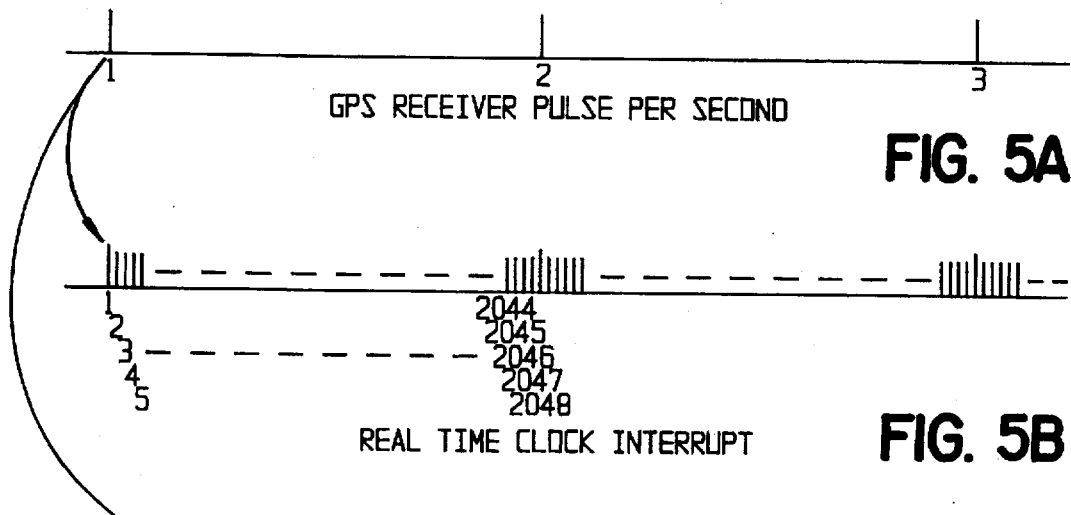
FIG. 5A
FIG. 5B
FIG. 5C
FIG. 5D
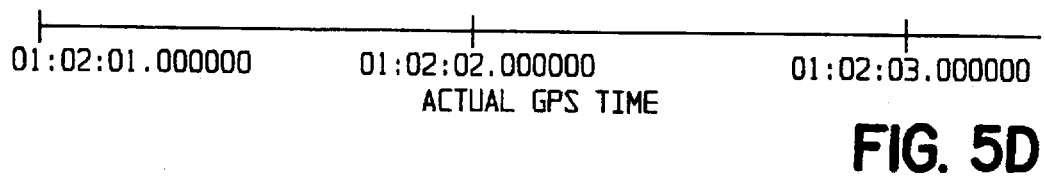
FIG. 12
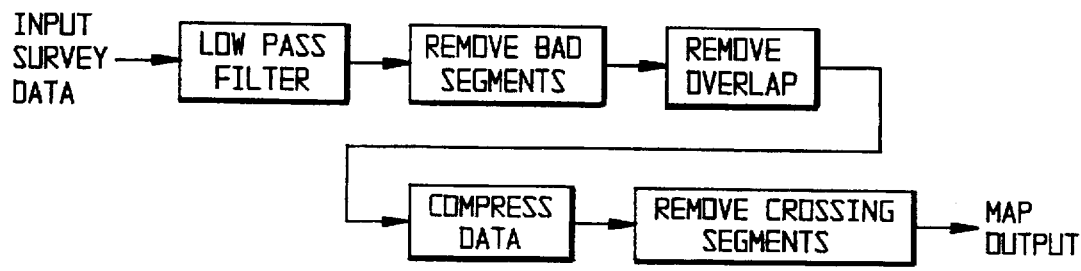

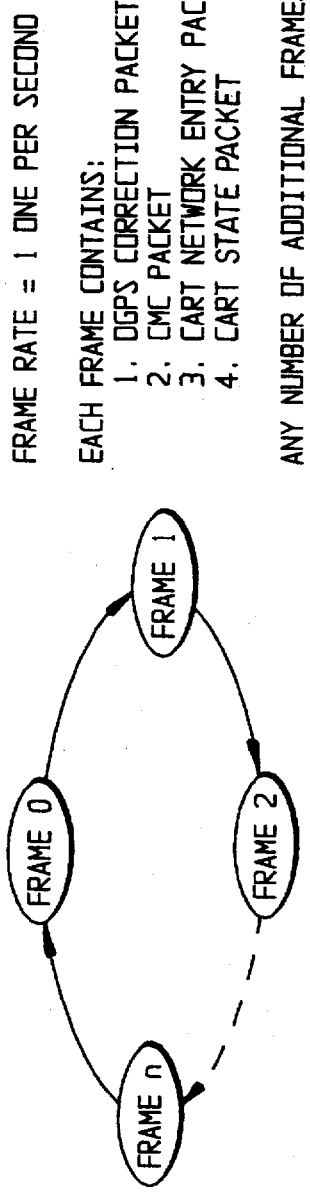
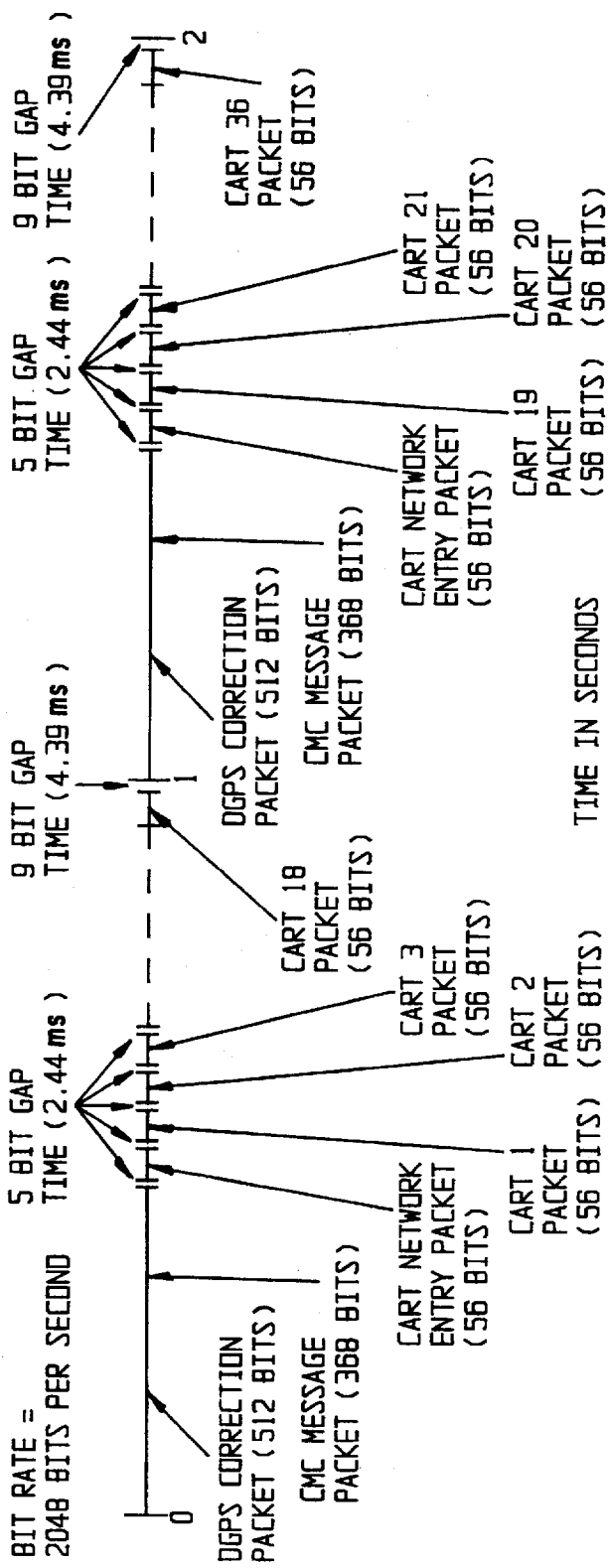

FIG. 13A
BEFORE OVERLAP REMOVAL

START POINT
END POINT
OVERLAP REGION

FIG. 13B
AFTER OVERLAP REMOVAL

FIG. 14A
DATA WITH A CROSSING LINE SEGMENT

CROSSING LINE SEGMENT REMOVED

FIG. 14B
DATA POINTS BETWEEN THE CROSSING LINE SEGMENTS REPLACED WITH A SINGLE POINT AT THE VERTEX

FIG. 18

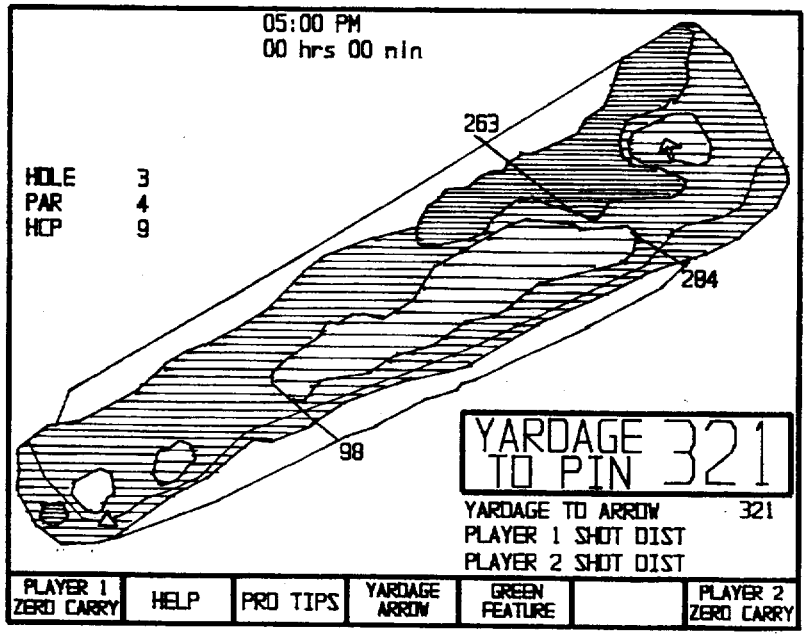

05:00 PM
00 hrs 00 min

HOLE 3
PAR 4
HCP 9

263
284
98

YARDAGE TO PIN 321

YARDAGE TO ARROW 321
PLAYER 1 SHOT DIST
PLAYER 2 SHOT DIST

| PLAYER 1 ZERO CARRY | HELP | PRO TIPS | YARDAGE ARROW | GREEN FEATURE | | PLAYER 2 ZERO CARRY | d4 EXCEEDS THE MAXIMUM ERROR, THEREFORE RETAIN POINT 5

LEAST SQUARES IN ADJUSTMENT FOR POINT 5

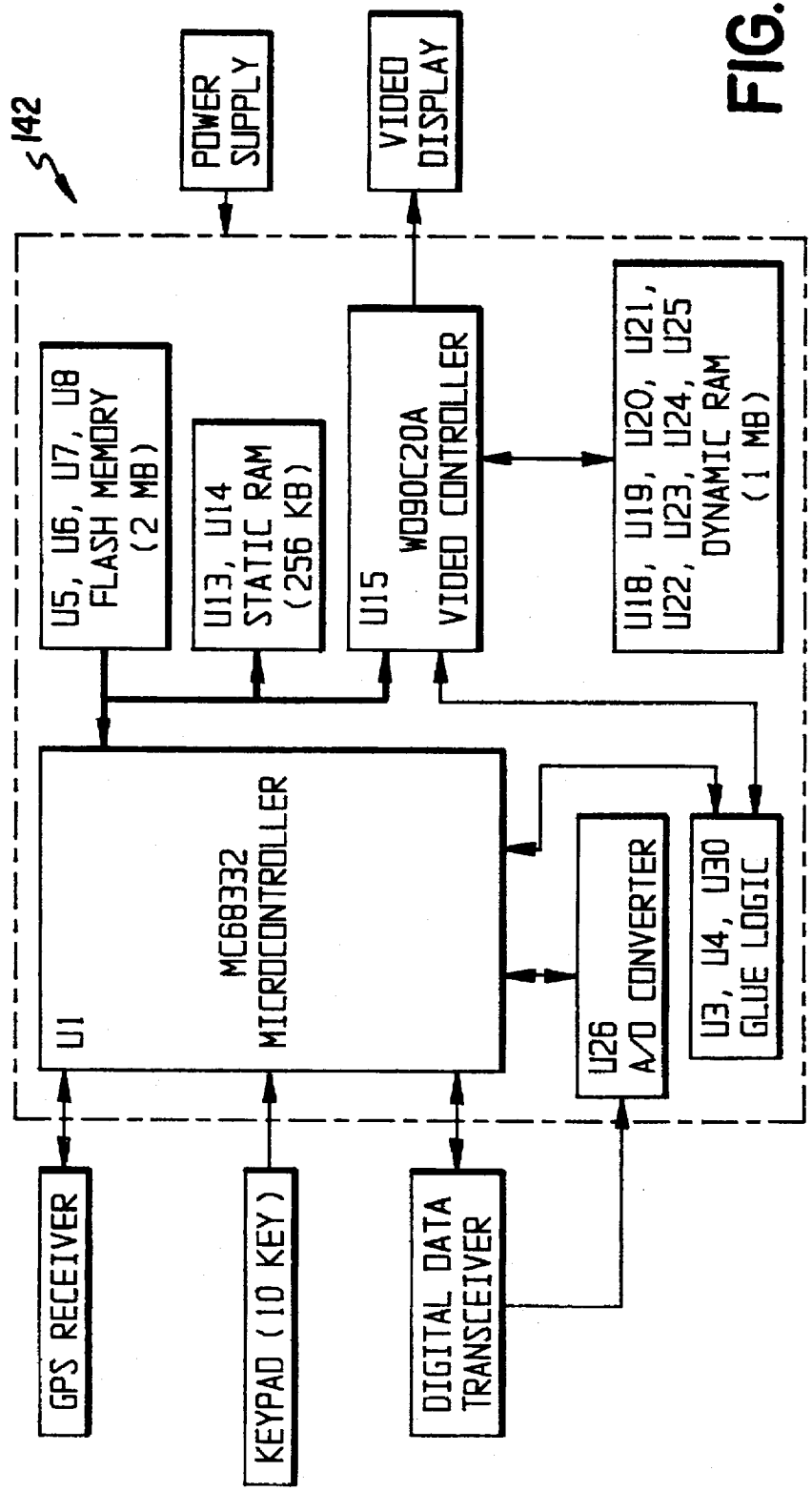

GOLF COURSE YARDAGE AND INFORMATION SYSTEM

BACKGROUND OF THE INVENTION

The present invention relates generally to yardage systems and more particularly to a new and improved golf course yardage and information system.

Before starting play on an unfamiliar or infrequently played course, golfers typically familiarize themselves with the layout of each hole. This gives the golfer the knowledge at the tee box of a particular hole being played, for example, as to whether the hole is a 'dog leg left', a 'dog leg right', or straight; whether any hazards, such as sand traps, bunkers, and water traps, are hidden from view; whether and where the range is posted to calculate yardage from the ball's (and the golfer's) present location to the front of the green, the rear of the green, the pin, a key hazard, or a desired lay up position for the green approach shot.

Customarily, golf courses market informative books on the course in the pro shop, to indicate layout features for each hole and yardage from a few locations along the hole to the center of the green. Also, yardage markers typically are provided at sprinkler heads along the route of each hole, so that the player will know the range from that point to the center of the green. These playing aids provide information on the hole layout and location of hazards, and also allow the golfer, by pacing off yardage from the ball to the nearest sprinkler head, to estimate yardage from the ball to the center of the green. Such measures are by no means precise, but do enhance one's knowledge of the hole, and thereby, an opportunity to improve one's game. They also exact a cost—slowing the pace of play of every golfer behind the one or more who are familiarizing themselves with the course, pacing off yardage, and so forth. Slow play has an adverse effect on the course's daily revenue, as well as on other players' enjoyment of the game.

Various proposals have been made toward improving golf course information systems. The intent of these ostensible improvements has been to reduce the average player's score; to increase enthusiasm and speed of play; and to enhance the player's knowledge of the course regarding every hole, the yardage from the ball or "lie" to the green, the distance and bearing to the pin, and the location of hazards. Proposals have included use of buried electrical wires in various layout configurations about the course for interaction with mobile overland components, or of radio direction finding or triangulation techniques, to inform the golfer of gross features of the course and distances from specific markers to the pin or flag for the hole being played.

A recent proposal for a position and distance measuring system for a golf course enlists the capabilities of the existing U.S. government-sponsored Global Positioning System (GPS) which was established over the last 20 years with space satellites and ground based stations. The GPS system was established as a means for determining distance, range, and position for various governmental purposes, but has become quite useful in many industrial and commercial applications as well. A number of earth-orbiting satellites provide reference points from which to determine the position of a point on or near the earth, using the ground-based receivers. The orbits of these satellites are monitored by the ground station GPS receivers, and the travel times of signals received from the satellites are used to measure distance to each satellite. Each timing signal from a satellite is coded to permit the receiver to determine the elapsed time between launching of the signal from the respective satellite and receipt at the GPS receiver antenna, and thereby to calculate the distance as the product of that elapsed time and the speed of light. Receivers need not be restricted to large ground stations, but are available in portable, mobile and hand-held versions, for a multitude of private navigation, position and distance-measuring systems.

Distance measurements to three GPS satellites can accurately define the position of an object (i.e., that of the GPS receiver, whether of the stationary or portable type) on or near the surface of the earth. A fourth satellite provides a distance measurement that serves to verify clock timing within the GPS system. With several satellites in "view", and through the use of a computer, the GPS receiver theoretically can calculate distances virtually instantaneously with great accuracy. In practice, however, even small errors that typically occur in the calculated measurement of satellite signal travel time from system and natural phenomena severely reduce the accuracy of the distance and position calculations. Error causing phenomena include atmospheric propagation, receiver contributions, satellite ephemeris (transient, and satellite clock. Furthermore, the U.S. Department of Defense (DOD) purposely introduces errors in the satellite signals to deny civilian users full accuracy. Erroneous measurements of 100 meters or so may be tolerated in many GPS-based measurement systems, but would be unacceptable in a golf course positioning and distance measuring system.

The recently proposed golf course position GPS system employs purely conventional differential GPS, which has found wide use to reduce errors in distance measuring systems. The differential GPS (DGPS) system broadcasts error correction information from a ground receiver of known location in the vicinity of the user. Two GPS receivers are used, one at a known fixed position, so that the difference between that known position and its position calculated from the satellite GPS signal fixes the error in the signal. The fixed position (reference) receiver provides a continuous correction for use by all other receivers, which may be mobile, within its reception area. Knowledge of the error allows all distance and position calculations at the user's receiver to be corrected. Conventional DGPS can reduce errors in position calculations to allow accuracies of within about five meters—quite suitable for most commercial needs, but still unacceptable for a golf course distance measuring system. However, the same conventional DGPS system may be used to determine the location of a golf cart receiver relative to the pin on a hole of a golf course as to determine the location of a ship relative to a land-based point of interest. Weather conditions and terrain have little effect on position determination in the GPS system, and few restrictions are imposed on size or location of a user's receiver.

Details of DGPS are readily available from a number of sources, an example being Blackwell, "Overview of Differential GPS Methods", *Global Positioning System*, vol. 3, pp. 89–100, The Institute of Navigation, Washington, D.C. (1986). The Blackwell (Stanford Research Institute International) paper details four differential GPS techniques, one of which is virtually identical to the previously proposed GPS-based golf course positioning system.

It is a principal object of the present invention to provide a new and improved golf course yardage and information system utilizing DGPS.

Another object of the invention is to provide such a system having considerably greater accuracy than is available with conventional DGPS.

SUMMARY OF THE INVENTION

Before summarizing the best mode presently contemplated for practicing the golf course yardage and information system of the invention, it bears emphasis that the present invention is not limited to providing distances and information in the context of golf courses. Rather, it may be extended to any number of other consumer, commercial, and industrial applications of satellite navigation and digital communications technology. The present invention will be described in the context of a golf yardage and information system, embodied in what is referred to herein as the PROLINK (PROLINK is a trademark of Leading Edge Technologies, Inc. of Scottsdale, Ariz., the assignee of the invention disclosed in this patent specification) yardage and course management system (or more briefly, as the 'PROLINK system'), but the invention is not limited to use on or for a golf course.

The PROLINK system includes a golf cart-based subsystem, although it may be packaged alternatively or additionally into a hand-held unit carried by the golfer. Both such versions are included within the generic terminology of a mobile unit, a portable unit, or a roving unit. Each roving unit utilizes state-of-the-art DGPS technology, with considerable enhancement by the features and aspects of the present invention, incorporated in hardware and software.

The PROLINK system possesses the capability to create, store, and display a color or black and white graphical representation or map of the golf course on a video monitor in the cart (or on a liquid crystal display ('LCD') of a hand-held unit). Each hole of the course is selectively displayed with all of its hazards and features, with the golfer's fixed or changing position (strictly speaking, the cart's position) superimposed thereon in real time during play of the hole. The system provides the golfer with an accurate measurement of the distance (typically, in yards) from the current tee box to the current pin placement (both of which may be subject to daily change by the course administrator), as well as from any other location of the cart on a hole to the pin or any other feature of the hole. In essence, an 'electronic yardage and hole feature book' is presented by which to enhance club selection for each lie of the ball during play.

An ancillary feature of the PROLINK system is its capability to display personal messages to a golfer at a selected cart, as well as to provide informative tips ('pro tips') at specific holes, and system-wide advertising and promotional messages. The PROLINK system includes a course management subsystem that enables the course administrator (typically the golf professional who operates the pro shop) to track the location of and to communicate selectively with each golfer or all golfers on the course, to monitor and improve the pace of play, and to compile a statistical data base on course operations. Personal messages may be sent to the selected carts and emergency or other overall messages may be sent system-wide at any time, while 'pro tip', advertising or promotional messages may be activated based on the cart's location on the course, such as when approaching the next tee.

The cart-based or other type of roving unit of the PROLINK system provides advantages to the golfer without burdening or significantly changing the way the course or any particular hole is played, or how business is conducted by course management. Such advantages include (1) real-time, accurate indications of distance (typically within two yards) from the cart to significant course features—green, pin, hazards in fairway, etc., (2) a large (e.g., 7.5-inch), high resolution, color display of map of entire course, individual hole, or green or other detailed features, on the cart monitor, and (3) the capability of individualized communications and messaging to and from the cart.

The position of the cart is displayed in real time on the map of the hole being played, both on the individual cart monitor and a monitor at the course management station. As the cart moves, the yardage-to-pin calculation is automatically updated on the display. According to a related feature of the invention, a separate movable cursor on the display allows the player—by simply appropriately positioning the cursor—to obtain a precise yardage measurement to any feature shown on the hole map. Another feature is the capability to read the carry distance of each shot by simply pressing a 'carry' button adjacent the display.

The golfer may selectively view the entire course layout or obtain a display of an individual hole, in full color, before, during, or after play. An automatic zoom feature increases the selected target area resolution, such as to view the contour of the green or the details of a particulate hazard. If desired, the roving unit cart record an entire game—stroke-by-stroke—to allow it to be replayed at home or elsewhere from a computer disk as it was originally displayed on the cart monitor. Alternatively, a 'hard copy' printout of each shot, from tee to fairway to green, may be obtained from a club house computer. The player cart thus analyze the game, and devote time to problem areas to improve skills before the next round of play.

The most significant decision on each shot is selection of the golf club to play the lie relative to the pin location, hazards, and so forth. The PROLINK system enables the player to make consistently better and faster club selection. At the same time, the system enables the golfer to correct natural inconsistencies in swing that may otherwise be attributable to inadequate information concerning target distance and course layout.

The course management portion of the PROLINK system includes a base station receiver/transmitter unit and video monitor in the clubhouse (or other desired location) to give the course administrator better insight into daily operations and revenues. Principal advantages of the course management portion include (1) the capability to identify, locate and monitor movement of every golf cart on the course in real-time, with precise positioning during play on each hole, (2) use of that knowledge to pinpoint location and analyze cause of bottlenecks, toward improving speed of play, and greater enjoyment by all players, (3) compilation of an extensive computerized data base to provide management and designated staff personnel with accurate statistical insight into course operations and techniques for instituting improvements, and (4) availability of a convenient source of communication and messaging to all roving units, with potential concomitant revenue enhancement through advertising and promotions.

The data compiled as part of the club's data base is readily used for management information system ('MIS') reporting to management and board members, and to provide reports complete with tables, charts and graphs on an as-needed basis for club members and players, or, in the case of municipal and other public courses, to provide necessary reports to the appropriate authorities as well as statistical and course information to players. The compiled data may include date and times rounds were commenced, player names for each round, tee times, actual start times, actual finish times, time required for each round, time required for each hole, strokes per hole, daily pin placements, and total rounds, by way of example.

The size of a golf course's ranger staff may be reduced by virtue of having a wealth of information available to the course administrator from the PROLINK system. Despite their fewer number, the rangers may be used more efficiently by dispatching them to precise locations where bottlenecks or other barriers to efficient play are occurring. Each roving unit is assigned a unique ID number which is transmitted by the system for periodically monitoring (and displaying) (e.g., every 1 to 16 seconds, depending upon the number of carts on the course) each unit during play, for identifying selected golfers for messages, or those who may be causing problems, or for other purposes.

By having a high resolution, color monitor for the PROLINK system in the pro shop, customers and first time players of the course are given a unique opportunity to view the course layout and its significant features.

The PROLINK course management system includes a Course Management Computer (CMC), with a combination of radio frequency (RF) data links and personal computer (PC) modem links that allow the base station and roving units to communicate and share information with one another. The overall system is simple and flexible, with powerful system software, and human engineering of hardware such as a majority of user interfaces being single button operations on the roving units.

In operation of the system, the hole display and yardage functions in the cart system are activated automatically at the beginning of each hole. Yardage from the roving unit to the pin and to key hazards such as traps and water are displayed and updated at all times on the display as these features are viewed. Four arrow keys allow the player to move a cursor around the hole display and obtain yardage to any point on the course. A single button press may, for example, provide a pro tip created by the course golf professional, or a blow-up of the green complete with contour lines for the critical approach shot. In addition, the player's driving distance is displayed automatically after a tee shot, and the distance to the pin for the next shot is available automatically. After the player reaches the green, a screen allows advertising, promotional messages, and any other information, such as course trivia, to be displayed. When the player approaches within a fixed distance of, or reaches the next tee, the PROLINK system automatically moves to the next hole layout display for continuing play.

Although use in connection with golf course operations is of principal interest, the PROLINK system architecture cart be utilized for mapping and location information as well as command and control capabilities for mass transit, forestry, express package services, shipping, and other applications.

BRIEF DESCRIPTION OF THE DRAWINGS

The above and still further objects, features, aspects and attendant advantages of the present invention will become apparent from a consideration of the following detailed description of the best mode presently contemplated for practicing the invention, with reference to a preferred embodiment and method, in conjunction with the accompanying drawings, in which:

FIGS. 5A, B, C and D are charts illustrating the system timing mechanization;

FIG. 10 is a simple diagram of the PROLINK variable length packet length network;

FIG. 11 is a communications network packet timing diagram for the PROLINK system;

FIG. 12 is a block diagram illustrating a post processing algorithm for use with data obtained from surveying a golf course;

FIGS. 13A and B are pictorial diagrams illustrating an overlapping segments situation (13A), and the results of a portion of the post processing algorithm for removing overlapping and bad segments (13B);

FIGS. 14A and B are pictorial diagrams illustrating a crossing line segments situation (14A), and the results of a portion of the post processing algorithm for removing crossing line segments (14B);

FIG. 18 is a pictorial diagram illustrating a digital map of a hole on the golf course showing distances from the cart to pin and from the cart to various markers to be displayed on a monitor of the cart;

FIG. 19 is a detailed block diagram of the CPU/video controller card of FIG. 9;

DETAILED DESCRIPTION OF THE PREFERRED EMBODIMENT AND METHOD

Figure 1A:
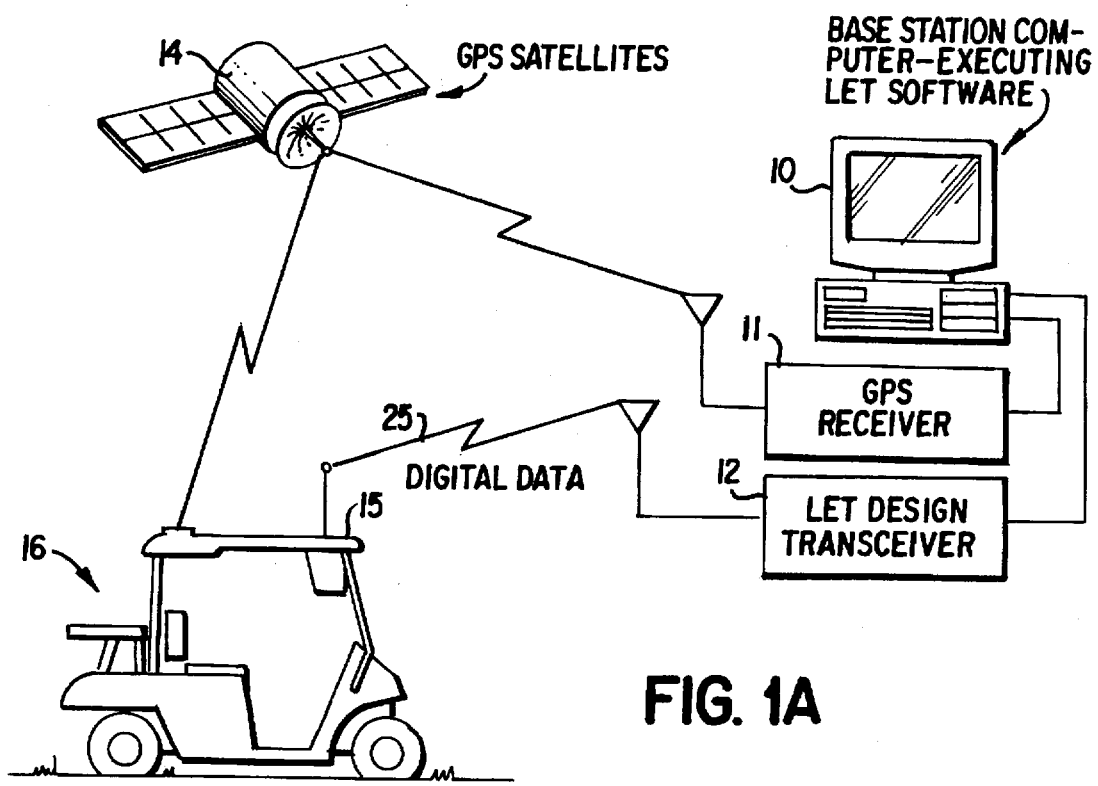
FIGS. 1A, 1B, and 1C are, respectively, a simplified diagram of a portion of the PROLINK system in use on a golf course, a block diagram of the principal electronic components of a cart-based portion of the system, and the visual display mounted on the interior of the roof of a cart for viewing by the occupants.

Referring to FIG. 1A, a presently preferred embodiment of the PROLINK system includes a base station computer 10 (sometimes referred to herein as the course management computer, or CMC), located at a convenient place on the golf course premises such as in the clubhouse (preferably, in the pro shop). A related DGPS receiver 11 (a Navstar XRS-M6 DGPS receiver in the preferred embodiment) receives transmissions from GPS satellites such as 14, and a transceiver 12 provides two-way radio frequency (RF) communication with a multiplicity of mobile receivers which may be cart-based (as at 15) or hand-held units (handsets, not shown). From time to time, the mobile units will be referred to herein as roving units. In the preferred embodiment, each roving unit is cart-based, i.e., installed on its own golf cart 16.

Figure 1C:
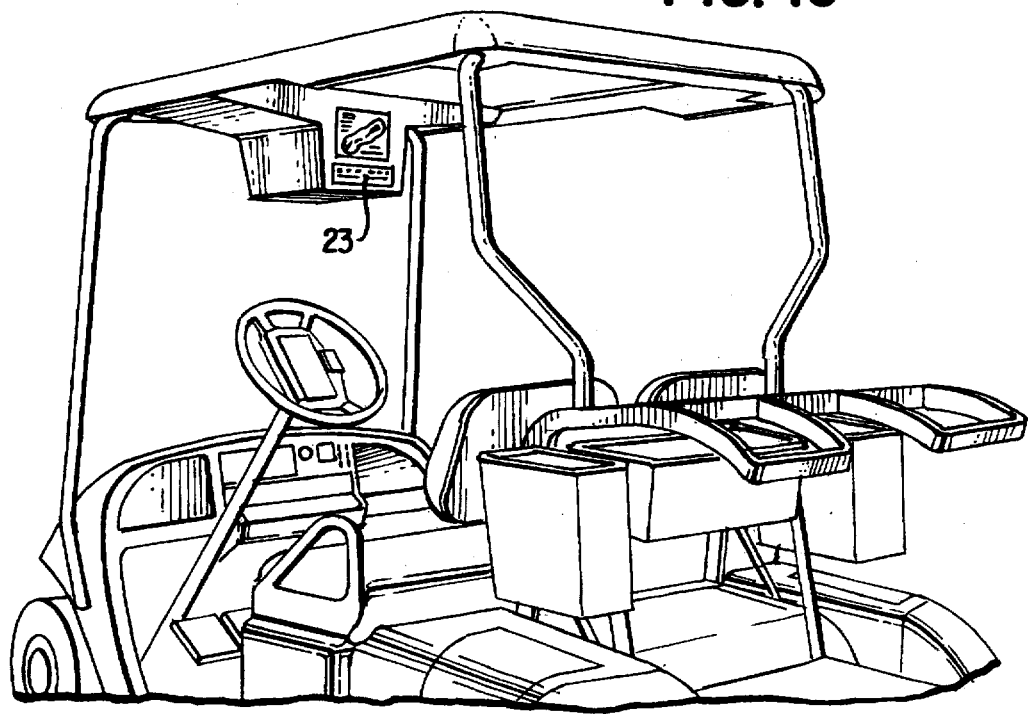

Each roving unit provides the user with a high resolution visual image of the course hole being played as shown in FIG. 1C, and simultaneously displays accurate distance measurements from the roving unit to the pin for that hole. The Prolink system acquires conventional GPS data transmitted from all GPS satellites in view (i.e., capable of being received by an ordinary GPS receiver in proximity to the golf course). CMC 10 includes a computer with a central processing unit (CPU) and video monitor.

Figure 1B:
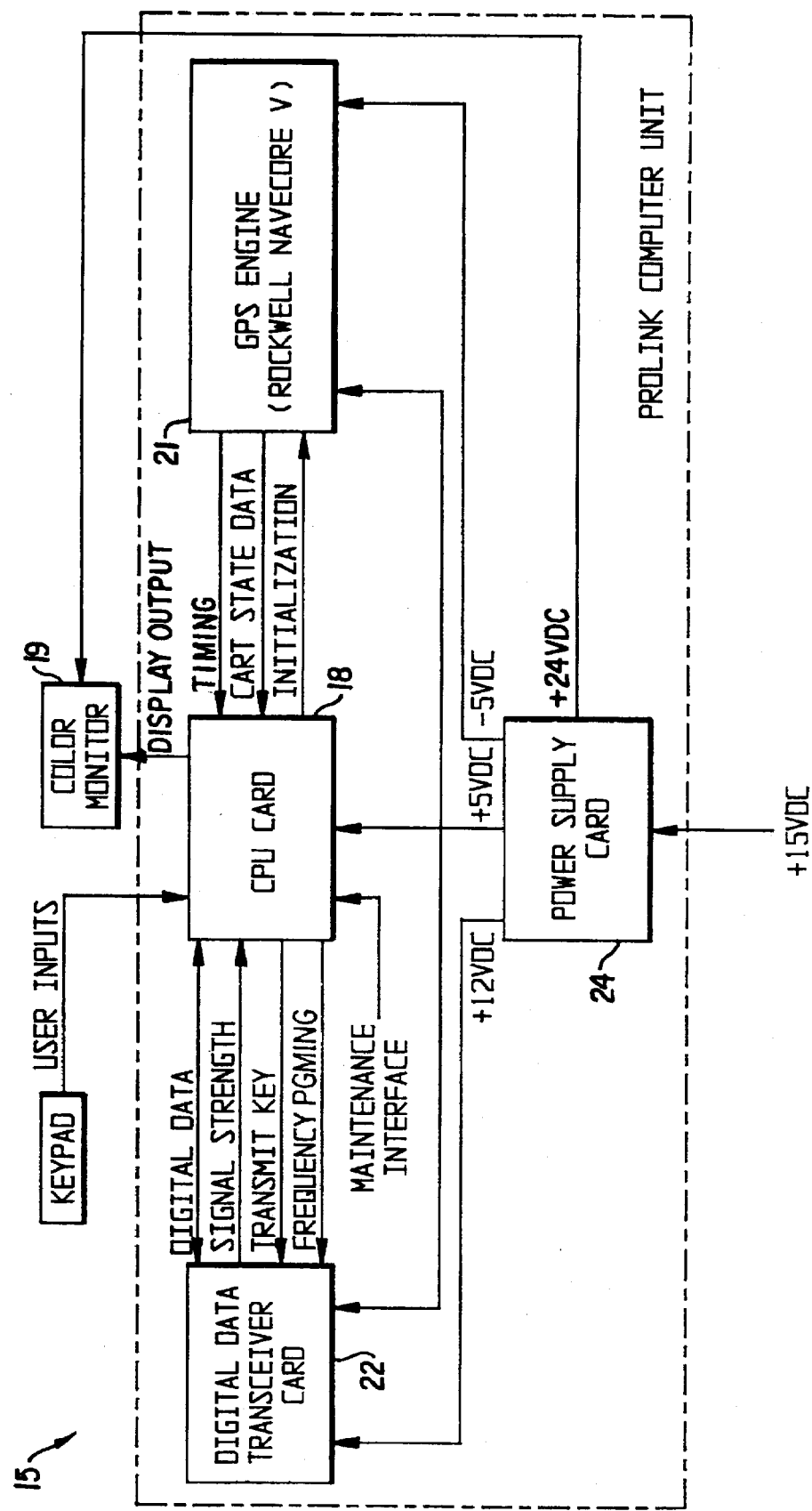

Referring to FIG. 1B, the cart-based unit (CBU) 15 includes a cart-based computer (CBC) with CPU/video card 18, a digital map display monitor 19, a Rockwell International GPS receiver 21, an RF transmitter/receiver (transceiver) card 22, and a power distribution card 24.

The monitor 19 is shown in somewhat more detail in FIG. 1C. It is mounted at the underside of the roof 20 of golf cart 16, and is turned on (together with the other electronics in the cart-based unit) at the time the cart is checked out from the course cart shop. Except for an advertising display presented prior to play and between holes, the monitor normally displays the layout of the hole being played, and this is done automatically (as the default display) as the cart approaches within a predetermined distance of the tee boxes for the hole. Alternatively, the user (typically, the golfer playing the course, although maintenance people and others may at times use the cart) may select some other option at any particular time by operating control buttons 23 on a control panel mounted just under the monitor in the cart roof.

Figure 2:
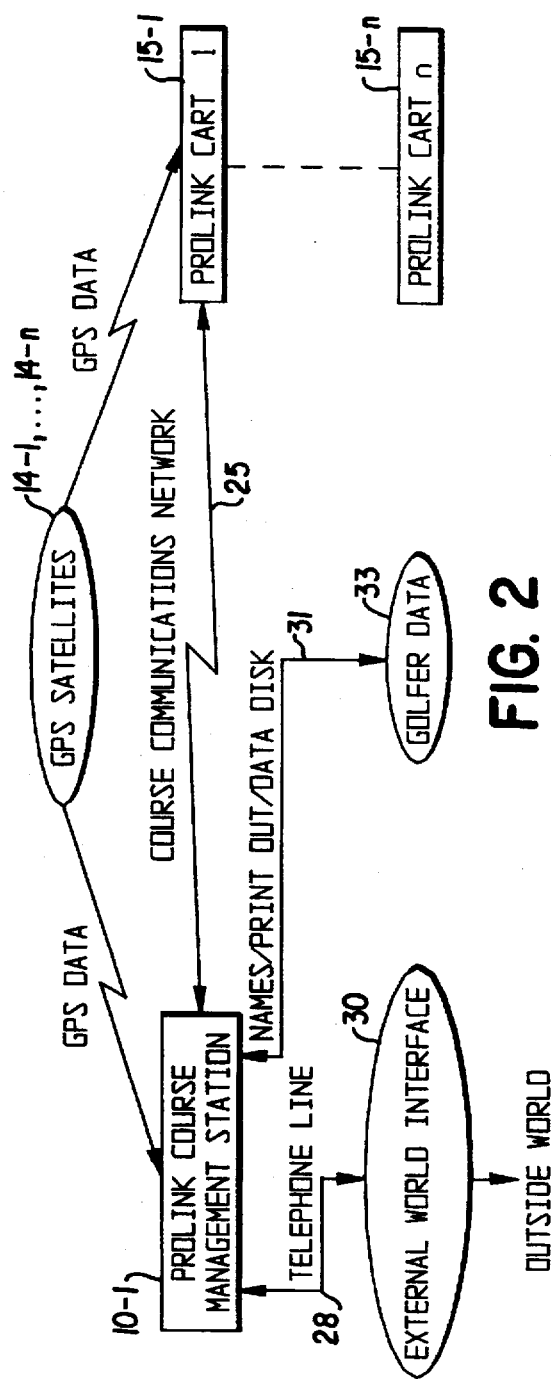
FIG. 2 is a simplified block diagram of the overall PROLINK system.

FIG. 2 is a simplified block diagram of an exemplary overall PROLINK system. GPS data transmitted by GPS satellites 14-1, . . . , 14-n is received by the PROLINK course management station 10-1 and simultaneously at the cart-based units of the Prolink system 15-1, . . . , 15-n. An RF course communication network 25 is established via the transceivers between the course base station 10 and the carts 15 for transmission of advertising, general information, system-wide and individual cart messages from the base station, DGPS corrections, and transmission of messages from the carts to the base station. A telephone line 28 provides a data/voice/fax communication link between the base station constituting the course management station (CMS) 10-1 and an interface 30 to the outside world.

The golf carts in which the roving units are installed are normally garaged at a course cart shop when not in use. The cart attendant, who obtains identification from each golfer/renter at the time the cart is checked out, may record this information for subsequent entry of the golfer's name and the ID number of the respective cart into CMS 10 for correlation purposes. With this information available for instant readout, any personal messages that may need to be directed to a player during a round of golf cart be communicated to that player's cart anywhere on the course.

Also, when players return their cart to the attendant, the data on the round captured and stored in the cart based computer is readily transmitted to CMS 10-1 via transmission line 31 and a print out may be generated in the clubhouse for pick-up and use by the golfer.

While the preferred embodiment of the PROLINK system uses DGPS, it is possible to take advantage of certain features of the present invention in other position determining or distance measuring systems. Such other systems might include dead reckoning navigation, inertial navigation (a form of dead reckoning), LORAN C, Omega, Transit satellites, and radio direction finding, to name a few. In a typical commercial GPS system, the fixed base station/GPS receiver is located at a precise survey point and satellite computed position. In a golf position determining application, such as the PROLINK system, the position error attributable to GPS (as a consequence of signal degradation due to selective availability and the Earth's atmosphere) is common to the base station and all roving units of the system.

The five meter accuracy attainable with DGPS still represents considerable error from the viewpoint of the golfer seeking to determine yardage from his or her ball lie to pin placement on the hole. The PROLINK system, however, employs certain unique filtering algorithms to be described hereinafter, that reduce the remaining error so as to obtain position accuracy of less than two meters. The system also provides the capability to perform differential GPS positioning without need for a precise base station survey point.

It is imperative, of course, that the base station 10-1 and the golf carts (the CBC) 15 be adapted to communicate with each other in a robust, reliable manner, and that capability is a feature of the PROLINK system. Additionally, both the CMS 10-1 and the CBC 15 must be capable of assimilating the collected information. The PROLINK system provides for data assimilation in a full color electronic digital map of the overall course and each hole.

Information transmitted from the CMS 10-1 to each CBC 15 includes DGPS corrections for CBC computation of position, velocity, and distances. Also, network control data provides essential timing information for the base station/cart communications, messages, dynamic object status (such as pin placements and tee box locations), initialization message with time and position data to 'cold start' the CBU GPS receivers if required, and golfer names and start times information for the course rangers. Information supplied by each CBC to the CMS includes the location of each golf cart by ID, message information from the golfers, and player score and statistics information for post-play output.

By use of variable length communications network innovations of the PROLINK system, an almost unlimited number of carts can be supported by the system. Typically, an 18 hole course may utilize some 70 to 80 golf carts, a number which is easily accommodated by the system of the invention.

The course management portion of the system performs various functions beyond those already mentioned. For example, a high resolution color computer monitor displays the course map with all its features, and indicates on the map the locations of the individual roving units on the course including golf carts, refreshment carts, and maintenance carts, updated in real time as the carts move about the golf course. A zoom feature allows enlargement of any area of the map of interest, such as a particular hole or a number of contiguous holes. Pop up windows may be engaged by the CMS operator to execute any of several actions, such as a global message for distribution to the golf carts. Advertising and promotional messages, such as the day's lunch special, sports scores, identity of a golfer who hit the longest drive in a scramble, and corporate advertisements, may be displayed on the cart monitor as it is moved from one hole to the next. Also, the course management portion provides overall system timing, and master control of the PROLINK system communications network.

Figure 3:
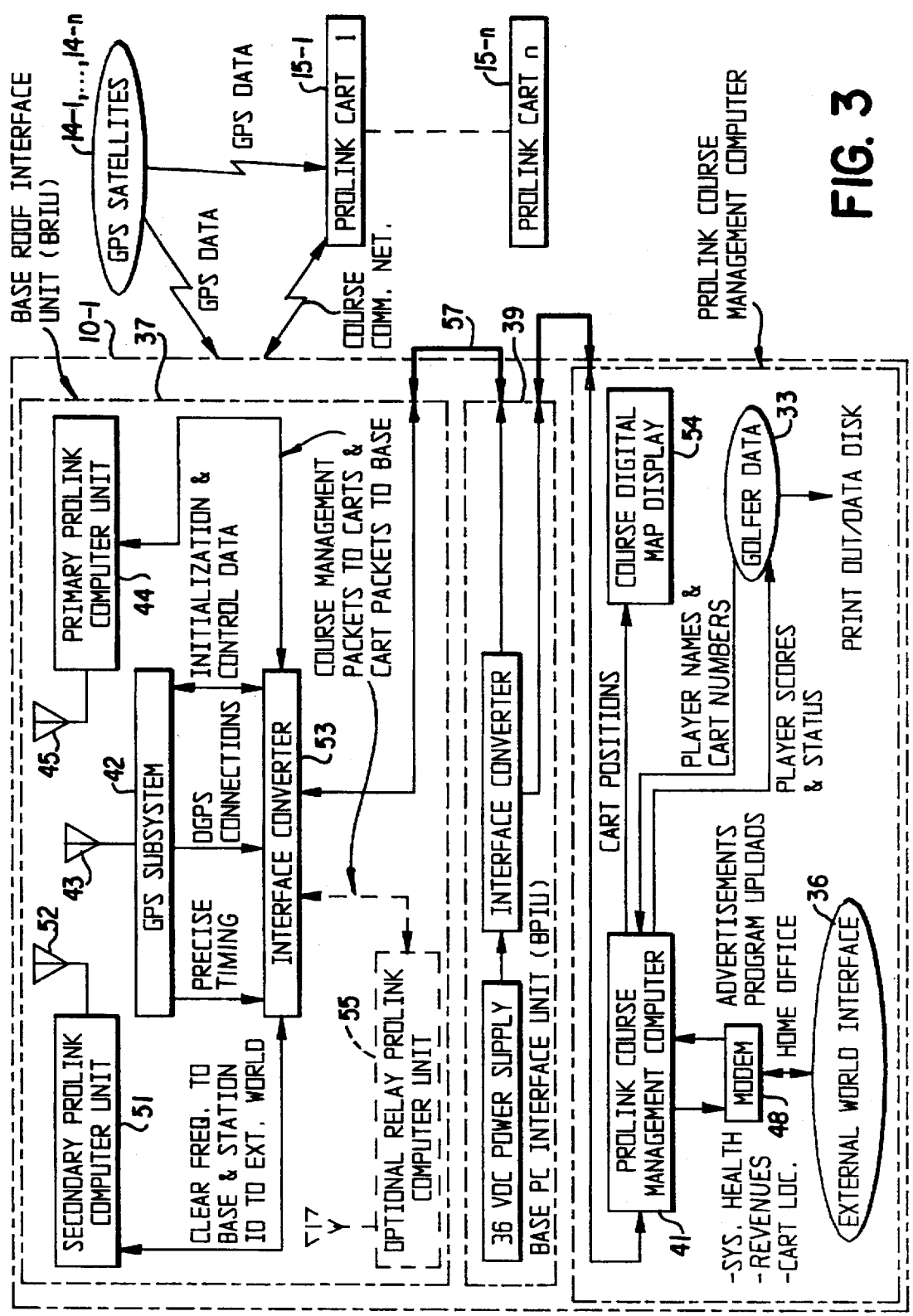
FIG. 3 is a more detailed block diagram of the course management system (base station) portion of the PROLINK system.

A block diagram of the course management station 10-1 of the PROLINK system is shown in FIG. 3. The CMS 10-1 includes base roof interface unit (BRIU) 37, base PC interface unit (BPIU) 39 and PROLINK course management computer (CMC) 41. BRIU 37 is typically mounted on or near the roof of the building or structure that CMS 10-1 is installed for improving transmission and reception. CMC 41 is the master control for entire PROLINK system. BPIU 39 provides an interface between BRIU 37 and CMC 41. BPIU 39 converts RS-232 formatted data from CMC 41 to RS422 formatted differential data to BRIU 37 and vice versa. This conversion is performed because RS422 formatted differential data provides more robust data for traversing relatively long distances through cable 57 to reach BRIU 37 which as previously mentioned is typically mounted on or near the roof of a building and, thus, may be several hundred feet away from CMC 41.

BRIU 37 includes a DGPS subsystem 42 with antenna 43, a primary PROLINK computer unit (PCU) 44 with antenna 45 for transmitting and receiving data packets to and from each of the carts, a secondary PROLINK computer unit (PCU) 51 with antenna 52 for monitoring frequencies before transmission to assure compliance with the Federal Communications Commission, and interface converter 53 for providing an interface between subsystem 42 and computer units 44 and 51. BRIU 37 may optionally include a relay PROLINK computer unit 55.

GPS subsystem 42 generates differential GPS (DGPS) corrections using the GPS signal data received from GPS satellites 14-1, . . . , 14-n in view. These are generated as differential pseudo range, pseudo range rate, and ephemeris corrections for each visible GPS satellite with respect to the fixed survey point of the CMS base station located, for example, at or near the golf course club house. The DGPS corrections are communicated to the CMC via BPIU 39. Similarly, CMC 10 creates a communication packet that is robust against bursty channel errors, which is sent via BPIU 39 to primary PCU 44 for subsequent transmission to the cart-based units 15-1, . . . , 15-n.

GPS subsystem 42 also provides precise system timing to CMC 10 by means of a pulse per second (PPS) signal implemented as an interrupt to the computer, for system timing down to near microsecond levels to precisely control the RF transmissions via primary PCU 44. The GPS time tagged message broadcast from the GPS subsystem immediately following the particular PPS is time-validated as of the occurrence of the PPS. A description of system timing will be set forth presently. In the unlikely event that the GPS subsystem is not properly initialized on power up, CMC 10 provides it with initial position, time, and date for proper satellite acquisition.

The GPS subsystem 42 is preferably a Navstar System Limited XR 5M GPS base station. Navstar is an England-based company with a subsidiary located in Sarasota, Fla. The GPS antenna 43 is a microstrip patch antenna with a built-in pre-amplifier with circular disk ground plane to minimize multipath interference.

CMC 41 serves as the master control for the entire PROLINK system. It may, for example, be an IBM-compatible 486-based 66 MHz PC (personal computer) with 8 megabytes (MB) of RAM (random access memory), an 200 MB hard drive, and extended graphics capability with a local bus video system, a video accelerator high-resolution card having 1024 pixels vertical resolution and 1280 pixels horizontal resolution, and nominally 256 colors. In addition to its capabilities described above, this computer enables asset (e.g., golf cart-based units) management by the course administrator. The course digital map display 54 is preferably a color video (computer) monitor with 17- to 21-inch screen size.

Primary PCU 44 transmits information to the cart-based units 15 under the command of CMC 10, and sends data received from the carts to the CMC for processing and response. Computer unit 44 converts the packetized serial data stream supplied by CMC 41 to a binary frequency shift keyed (FSK) digital modulation, for broadcast on the PROLINK system. Data received from the cart-based units is likewise converted at unit 44 from FSK to a packetized serial bit stream for processing by CMC 41.

If the golf course is sufficiently hilly or has other obstructions to line-of-sight (LOS) communication between carts and the base station, RF reflectors, diffractors, or repeaters may be employed to alleviate the problem. A reflector, specular or diffuse, is the preferable device. A specular reflector strategically located atop an obstruction reflects a concentrated beam of RF energy in which angle of incidence equals angle of reflection. A diffuse reflector reflects the energy in many directions as a function of wavelength of the RF signal and roughness of the reflector surface. Alternatively or additionally, communication may be maintained by bending the RF energy around an obstruction, using appropriately mounted RF knife edge diffractors albeit with greater RF power loss than with reflectors. The amount and depth of diffraction is a function of the sharpness and height of the diffractor edge.

Another alternative for maintaining communications where obstructions are present is the use of repeaters with directional antennas. These may be substantially identical to PCU 44, and are also effective to extend the range of communication. The repeater receives communications simultaneously with the RF transceiver, but at a different frequency to avoid interference with the primary course communication frequency. Solar powered repeaters with highly directional (e.g., yagi) antennas are preferable.

The secondary PCU 51 monitors frequencies before transmission to assure compliance with Federal Communications Commission requirement that shared frequency users must not be interrupted. If transmission by another user is detected by computer unit 51 on the frequency being used for the PROLINK system, the CMS computer immediately commands the network to switch to a predetermined unused frequency. In addition, frequency transitions by the PROLINK system are commanded periodically by the CMS computer whether or not an actual interfering user is present, so as to comply with an FCC rule that no user may assert exclusive use of a frequency. These features will be described in detail hereinafter.

A 9600 bps modem 48 monitors the status of CMC 41, and also allows usage data and overall system operation data to be downloaded from the computer. The latter data includes the status of each cart-based unit 15, such as a need for emergency repair following a breakdown. Similarly, the modem allows data to be loaded into the computer, such advertising matter to be sent to the carts for display. The system may be implemented to allow a PROLINK maintenance provider to call into the system for remote extraction of information concerning system performance history since the last review, and to load new software upgrades into the PROLINK system. The modem may also be used to allow players in other cities to preview the course on which the system is installed, by observing course features and actual play in progress, in anticipation of playing the course during an upcoming visit. Conventional security measures may be invoked by the user course or by the system supplier to limit system user access to certain functions and information.

Each cart with a roving unit is assigned an ID number to be incorporated in the header of a message packet for communication with the golfer(s) who rented the cart.

Correlation of golfers with carts is performed by entering data into the CMC 41 by an attendant at the time of cart checkout. On completion of play of the round, the CMC may be activated by a trigger signal when the cart departs from the 18th hole, or by manual selection, to compile the stored data for the individual player's statistics for that round, including drive distance on each hole, score for each hole and total score, and so forth. This statistical data is then available to the golfer in the clubhouse in the form of a hardcopy printout or computer disk. As a result, the golfer is able to replay and analyze his or her game at a convenient time at home.

The CMC 41 and associated video display monitor 54 may be located in the pro shop where the club pro assigned the duties of course administrator cart monitor play. The CMC automatically collects statistics on average speed of play of golfers by individual or group for collection and analysis of ways to speed up play or to identify responsible golfers, course bottlenecks, or other problems. The monitor displays the location of all players and flow of play in real time. Additionally, CBC 18 is programmed to display ads in between holes without input from CMC 41 as will described presently.

Standard RS 232 links provide interfaces between the CMC 41 and modem 48 while standard RS 422 links provide interfaces between GPS subsystem 42, primary PROLINK computer unit 44 and secondary PROLINK computer unit 51. A standard 15 pin VGA connector provides the interface to the course digital map display monitor. Moreover, BPIU 39 provides the interface link between the RS 232 standard and the RS 422 standard.

Figure 4:
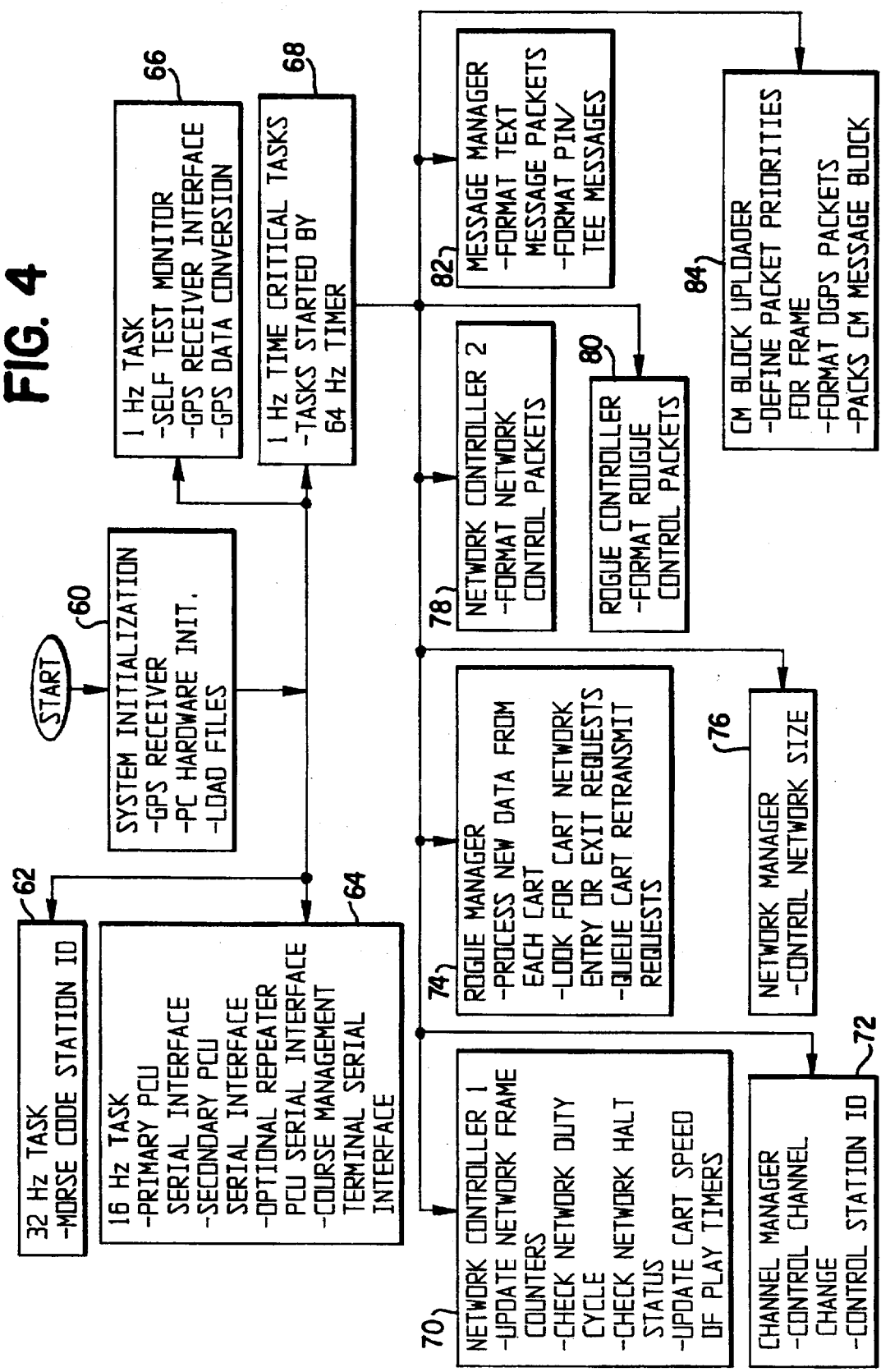
FIG. 4 is a block diagram of the CMS computer software.

FIG. 4 is a block diagram illustrating a top level description of the tasks performed by the CMC software as well as the rates at which each task needs to be performed. At both the cart and the base station sides, a real time operating system takes inputs from a user and automatic inputs from external sources, and responds accordingly. Before execution, system initialization 60 is performed to set up the CMC video environment and the communication ports, and to bring up the communication network by which the CMC talks to all carts on the golf course (it is assumed here that all golf carts on the course are equipped with PROLINK roving units, as would generally be the case). System initialization 60 also initializes a GPS receiver with its position and time, polls primary and secondary PCU's in the base roof interface unit and loads data files such as course maps and information containing the number of golf carts that are in the system.

Upon completion of system initialization, a number of tasks are commenced. Thirty-two (32) hertz (Hz) task 62 when activated sends out morse code data to enable the FCC to broadcast the station identification on the channel that CMS 10-1 is currently operating on.

Sixteen (16) Hz task 64 are communication tasks that send and receive data from the various devices in the system such as the primary and secondary PCU (44 and 51). Also, GPS receiver data is checked during the 16 Hz task to see if any new data has been received.

The one (1) Hz task 66 is a self-test monitor that determines whether all of the components of the PROLINK system are functioning properly. One Hz task 66 also decodes new messages received from the GPS receiver and performs GPS data conversion as presently described. These one Hz tasks of block 66 may be referred to as non-critical tasks because although they have to occur at a rate of 1 Hz, the time that they occur during a 1 second interval is not critical. Rather, the tasks just must be performed within a 1 second time interval.

One Hz time critical task 68, however, include task that must be performed at a rate of 1 Hz and those that must be performed at specific times within a 1 second time interval within a 1 second frame. One Hz time critical task 68 includes a number of subtasks. Network controller 1 subtask 70 keeps track of the network timing by updating some of the frame counters and determining if there are any carts on the course and updates the speed of play timers for those golf carts.

Channel manager subtask 72 determines whether the current channel that is being operated by the PROLINK system needs to be changed to a different channel because, for example, an event has occurred to cause the data to be disrupted such as someone else attempting to use the channel or if the PROLINK system has been using one channel for a 15 minute interval.

Rogue manager subtask 74 manages the different rogues on the golf course by verifying the data received from each of the rogues, determining the status of each of the rogues to determine whether any special action for those rogues are required such as allowing the rogue to enter or exit the network, or receiving a special message from the rogue. Rogue is synonymous in this application with the term carts or golf carts or any type of mobile vehicle.

Network manager subtask 76 controls the size of the variable length network according to the number of rogues entered in the network, and consequently, lengthens or shortens the variable length network according to the number of carts on the course.

Network controller 2 subtask 78 follows the channel manager, rogue manager and network manager subtask which have already determined what activity has taken place in the last frame and thus subtask 78 creates a network control packet that reflects the decision of the network manager as to the size of the variable length network and as to what additional network activity is to be commenced. For example, in the case of a channel change, network controller 2 creates a network control packet that includes information to inform the rogues that there is going to be a channel change. This network control package will be described in detail presently.

Rogue controller subtask 80 performs a similar task based upon the results of rogue manager subtask 74 creating rogue control packets for transmission to each of the rogues.

Message manager subtask 82 determines whether the course management system has entered a message to be transmitted to the rogues and formats the text message for transmission to one or more rogues as time and space permit in the output stream. Subtask 82 also produces the pin and tee placement messages and transmits those messages once every 16 seconds to the rouges.

Course management block uploader subtask 84 assembles all of the data packets that have been created by network controller 2 subtask 78 and message manager subtask 82 and packs them into a specific time space as well as places differential GPS data messages into the data packet. Subtask 84 also attempts to assign priorities between text messages and the pin-tee messages and rogue control packets and network control packets along with the differential GPS data so that all of the differential GPS data which is critical for providing accurate calculation of yardage is sufficiently updated. However, this information is allocated to a 784 bit stream per frame. Accordingly, some of the differential GPS packets may be delayed a couple seconds by including such data in the next frame.

One of the significant aspects of the PROLINK system is highly precise system timing. The manner in which system timing is implemented in the PROLINK system is significant, at least in part, because it is achieved at very low cost. The largest cost factors are the number of roving units or carts on the course at any given time (for example, 80 on a typical popular 18-hole course). The single base station used to control those 80 carts on the course is a substantially smaller factor in the cost of the overall system.

Conserving on cost of cart-based unit (CBU) components must be achieved, however, without the expense of loss of quality or reliability. One scheme for achieving that employs an RF transmitter/receiver subsystem that uses a common digital modulation scheme. Frequency shift keying (FSK) allows extremely cost-effective digital receivers to be manufactured with many readily available components, but FSK lacks spectrum efficiency. Instead, phase shift keying (PSK), for example, would efficiently utilize the FCC authorized and available spectrum. A 1200 bps FSK message can fill a given that spectrum; whereas, a considerably faster 4800 bps signal could be used with PSK within the same FCC-authorized spectrum.

PSK is the more desirable technique for digitally modulating data transmitted to and from the cart-based systems, but a considerable cost saving per cart is achieved by using an inexpensive FSK receiver. That choice becomes more attractive when the cost saving per cart is multiplied by the number of cart-based systems per course and by the number of host courses. Nevertheless, if FSK is used, FCC rules restrict transmission rates that are much faster than 1200 bps, for example to 2400 bps.

A significant innovation of the PROLINK system that allows sending and receiving information efficiently—indeed, with apparent great speed at only 1200 bps—is the variable link network, which will be discussed presently. For the moment it is sufficient to note that to execute the variable link network a very precise system timing is required. It is essential that the timing accuracy of the base station (CMS) and the carts (CBS) be precise to one millisecond (ms) for the communications network employed in a manner to be described.

To examine how such accuracy may be achieved reference is made to FIG. 5, with parts A,B,C and D, illustrating system timing mechanization. The actual GPS time line is depicted in part D of the Figure. The first time point is chosen arbitrarily, showing that the time line starts at 01:02:1.0 second, moves to 01:02:2.0 second, then 01:02:03.0 second, and continues on indefinitely. The GPS system has extremely precise timing, with the GPS receivers employing the pulse-per-second output as part of the GPS system method of informing a user that a particular measurement is valid.

The PROLINK system receives the pulse per second (PPS) signal from the GPS receiver as an interrupt into the CMC. The interrupt informs the PROLINK software that the GPS receiver message at the RS232 interface at the instant the interrupt was received was valid. So the interrupt provides information as to when time commenced for a valid measurement, but because of RS232 interface latency another half-second may elapse before that time is recognized. This required creating a system to know that time point within a thousandth of a second.

According to the invention, upon receipt of the PPS from the GPS receiver (FIG. 5A), the real-time clock interrupt counter is immediately reset (FIG. 5B). Thus, a real-time clock interrupt is running asynchronously with the PPS so that an interrupt occurs 2048 times every second. At the instant that the PPS is received from the GPS receiver, the timer is zeroed out and the count is immediately commenced from 1 to 2048 again.

Thereafter, a message is received from the GPS receiver indicating the time at which that PPS was valid (FIG. 5C). (In addition, the message contains the range and range rate differential correction information actually transmitted to the card, but that is merely incidental to the timing.) Consequently, upon receipt of this message, the precise GPS time that was valid when the pulse per second occurred is known. The number of 2048 Hz interrupts received since the PPS occurred can be counted to synchronize the system to that time. This allows time to be maintained accurate to $\frac{1}{2048}$ of a second, or slightly better than 1 millisecond, based on random sampling theory.

A significant aspect of the present invention for system timing then, is having a fast real-time clock interrupt, with an interrupt from the GPS receiver pulse per second that provides information when the next time message was valid, proceeding then to count the number of 2048 Hz task interrupts received up to the point the message containing the actual time that GPS was valid was received at the GPS receiver, and using that count to start incrementing from that point to maintain very precise timekeeping in the system. This ensures that the real time clock is perfectly aligned with GPS pulse per second signal. That is, tick zero of the real time clock interrupt is aligned with the pulse per second signal.

According to another aspect of the invention, the PROLINK system is capable of calibrating errors in the real-time clock. For example, although temperature differences can cause the crystal oscillator to drift, the oscillator may be recalibrated by taking advantage of the extremely precise timing provided by the GPS receiver. Each time a pulse per second is received, a count is commenced up for 2048 counts until the next pulse per second is received, because the real-time clock is running at 2048 Hz. If the count has reached only 2000 when the next pulse per second is received, it indicates that the system clock is running slow by $\frac{48}{2048}$ second. If the next pulse per second had been received and the count was 2100 interrupts, it would indicate that the system clock is $\frac{52}{2048}$ seconds fast. This information permits precise calibration of the CMC scale factor correction to the real-time clock every second. Such scale factor correction maintains the required one ms timing accuracy of the PROLINK system.

It bears emphasis that it is not required for the PPS from the GPS receiver to be synchronized to GPS time in integer seconds. As pointed out in the description of FIG. 5, the integer GPS time seconds starting at 01:02:01.00 second (FIG. 5B) does not correspond to the exact time at which the PPS actually occurred as indicated by the GPS receiver GPS time message (FIG. 5C). Rather, in the example, the pulse per second actually occurred at 01:02:01.123456 second, which is accurate to the microsecond level (millionth of a second) although the PROLINK system only requires timing to about one thousandth of a second. Hence, the fact that synchronization exists on some GPS receivers and not on others is immaterial to proper operation of the PROLINK system.

Another significant aspect of the system software according to the invention is the use of a windowing graphical user interface which is tailored to support real-time operating systems by requiring only relatively little CPU throughput for operation. The graphical user interface utilizes on-screen windows that contain important information to the particular user, and is employed on both the golf cart mobile unit display and the course management display.

Figure 6:
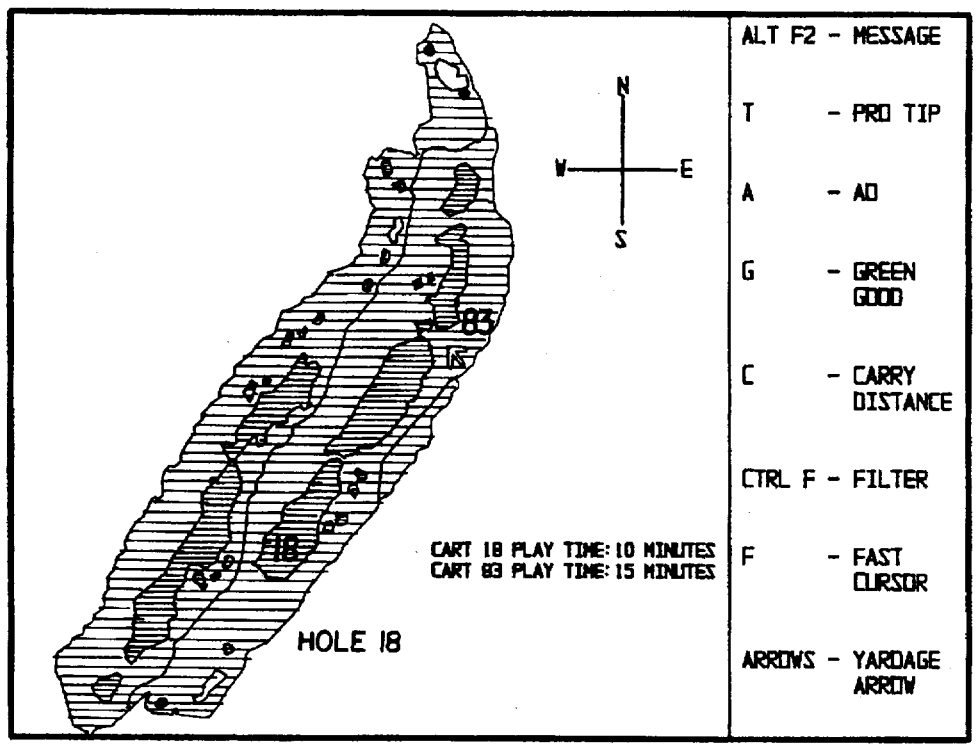
FIG. 6 is a graphical user interface (GUI) windows display on the CMS computer monitor.

In addition to being tailored for real-time operations, the entire graphical user interface is data-base driven. With reference to FIG. 6, three windows for a particular golf hole are depicted on display 54 of CMC 41. A first window contains the depiction of the golf holes and may utilize a particular background and border, for example, a one-line border. The second window, which may have its own distinctive background and border, indicates the name of the golf course or golf club being played or being observed. The third window may also be uniquely distinctive in background and border, and contains instructions to the course manager to use the PROLINK CMC software and indicating the functions performed by the listed keys.

In the PROLINK system, the user has the liberty to modify or customize a window by changing the depiction, the size, the background or the border, and may do so without need for any special programming knowledge.

Figure 7:
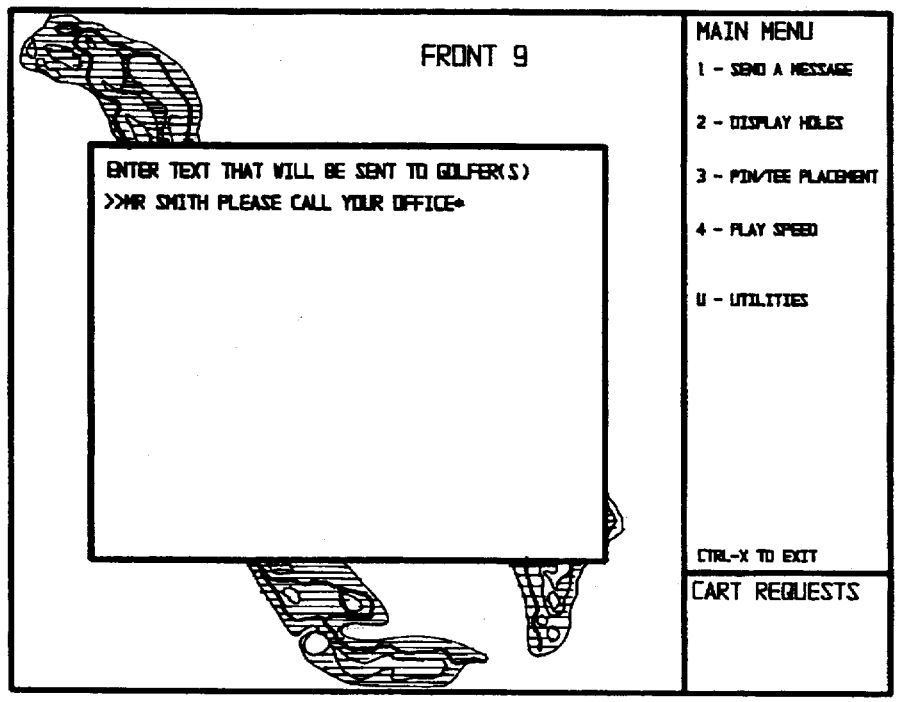
FIG. 7 is a GUI windows display with pop-up message on the CMS computer monitor.

FIG. 7 illustrates another important utility of the CMC's graphical user interface (GUI), with reference again to FIG. 6 as well. The latter shows a display of the holes for the front nine illustrating all the carts within that area—one of which happens to occupied by Mr. Smith. FIG. 7 shows system reaction to indicate the need for operator action, intervention or awareness, by the appearance of a pop-up window. In this example, the window message indicates to a message window for sending a message to Mr. Smith's cart to inform him to call his office. Thus, the system of the invention provides the user not only with windows containing information, but with windows that pop up instantly to provide additional information in situations that require immediate attention.

Another important aspect of the PROLINK system illustrated in FIG. 6 is the "play time" display feature that gives the course manager or administrator critical speed-of-play information for improving efficiency of course utilization. A play time of 20 minutes on this hole, for example, might indicate woefully slow play, and in that situation the course manager could dispatch rangers to speed up play. Thus, the speed-of-play feature is important to the course manager in providing a real time indication of the flow of play. On one hand, of course, it is important to proper course administration to recognize that some players are slower than others and to allow some reasonable latitude in that respect. On the other hand, inordinately slow play by one golfer or golfing group cart produce manifest loss of enjoyment by those playing behind the group, and a direct impact on course revenues.

Still another feature of the CMC software of the invention resides in providing the course manager with the ability to send messages from the CMC globally to all golf carts on the course, or privately to a particular cart as illustrated in FIG. 7. As an example, if the course manager deemed it necessary to send a lightning alert to all carts and a request to clear the course for that reason, he or she need merely invoke the message window through the CMC, type the message that all golfers should immediately clear the course, and press the 'send' button. In response, the message is immediately broadcast to all carts on the course, and is received at the cart-based mobile units as a popup window containing that message.

The course management system of the invention is also provided with the capability to compile long-term course utilization statistics that are retrievable by the course management team. One important course utilization statistic is the mean hole play time calculated over a predetermined period of time. This provides a yardstick against which individual cart play times may be measured. Another statistic might be the frequency at which a particular hole is a bottleneck to smooth flow of play on the course. Such information cart be a basis for a decision to redesign the hole layout to improve speed of play.

The CMC further correlates the cart location over the digital map of the course, and of each particular hole. It is important for such correlation that the physical dimensions and characteristics of the hole be known with precision, requiring a precise survey of the hole. This in itself is a complicated issue for which the PROLINK system provides an innovative solution as will be described later. For the moment, it may be assumed that such accurate survey of the golf hole with precise information on coordinates already exists. With that survey information, an accurate correlation of the cart over the particular hole cart be made. According to the invention, the coordinates of the cart in latitude, longitude and altitude are determined and converted to a two-dimensional X-Y reference frame identical to the reference frame of the hole. The PROLINK system has the capability to send information bi-directionally between the clubhouse base station and the golf cart roving units. The CMC must send a significant amount of information to the roving units, such as differential GPS corrections to assure that the carts have very accurate yardage information, personal and global messages to golfers, pin placement and tee box location updates to golfers on the course, and so forth. Similarly, the golfers need to send information to the CMC such as the state of the course, the cart position, time of play for a given hole, general information or requests from golfers such as to send the refreshment cart and so forth.

Figure 8:
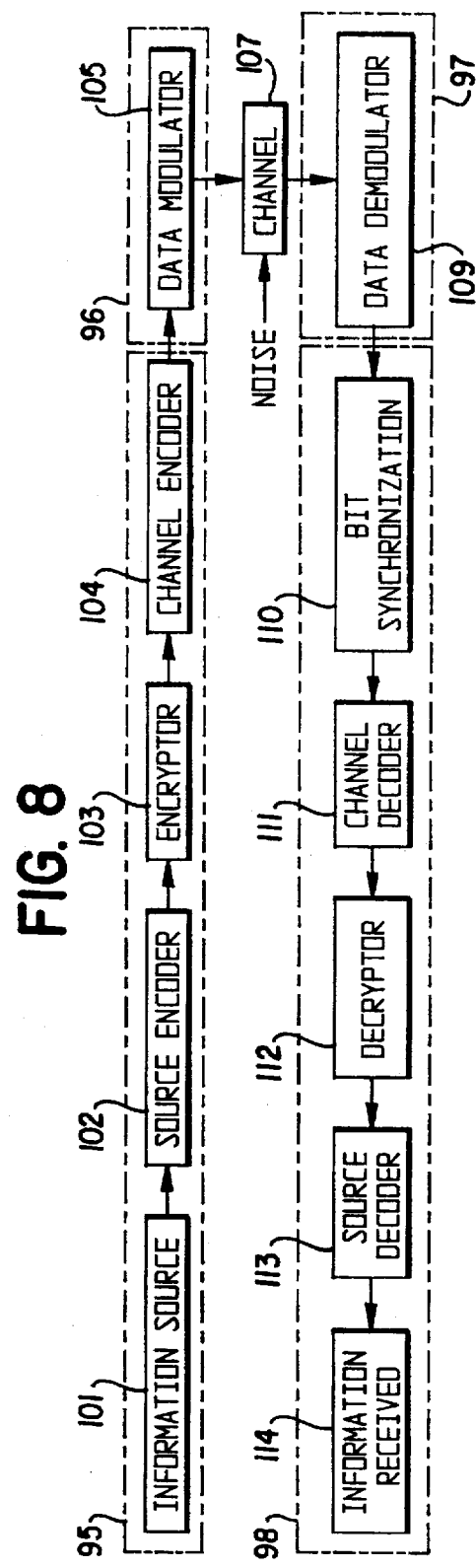
FIG. 8 is a block diagram of the PROLINK system communication processing.

A block diagram of the PROLINK communications system is shown in FIG. 8. An information source 101 at the transmitting end which may be the base station or 3a roving unit (cart) supplies information which is processed through a source encoder 102, an encryptor 103, a channel encoder 104, and a data modulator 105. The processed information is transmitted over a channel 107, which is a frequency band over which FCC-permitted communication may be made between various users. At the receiving end, which may be a roving unit or the base station depending upon which of the two was transmitting, the incoming data is demodulated at 109, and bit synchronized at 110. The data is then processed through channel decoder 111, decryptor 112, source decoder 113, and reproduced as the received information at 114, such as on a display screen of a computer monitor.

The communications network for the PROLINK system uses FSK modulation (binary FSK), a digital modulation technique which is inexpensive and simple to implement. Although FSK modulation makes somewhat inefficient use of bandwidth, the PROLINK system minimizes this bandwidth utilization problem by greater efficiency in the deployment of a variable length packet communications network. The communications network uses time division multiplexing in which all information is sent and received on a single frequency. This is important because of FCC restrictions on frequency allocations. In time division multiplexing (TDM) time slices are created on the single frequency so that in those time slices, carts can broadcast and the CMC can broadcast, but two transmitters cannot transmit at the same time because they will interfere with each other. If TDM is controlled adequately, when one transmitter is on for one cart, the transmitters for the other carts are off, and priority is determined by conventional technique, until every cart has had the opportunity to broadcast.

Similarly, the CMC cannot transmit at the same time as any CBS is transmitting. As previously discussed, a significant requirement of TDM is a very accurate time base, because of the need for every unit to know when it is allowed to transmit and when it is allowed to receive information. The traditional scheme for solving this problem is for the base station to call individual users (e.g., "Cart 82, where are you?"), and the cart to which the inquiry is made sends a response. This process continues as each cart is identified and an inquiry made as to whereabouts, with a subsequent reply by the cart.

In the PROLINK system, bandwidth efficiency is considerably better than with the traditional polling technique just described. This is achieved in great part by virtue of the accurate timing information on the system from the GPS receivers. In the variable link packet communications network of the system each cart is given a time slot for allowed transmissions. The carts independently know what their respective time slots are from the timing provided by the GPS receiver by the means and method described above. Hence, when a particular cart's time slice comes due, the cart broadcasts a very short data burst and then gets off the frequency. Then, the next cart broadcasts a data burst, and so on until all carts have had the opportunity to send or receive information. The base station transmissions are also multiplexed onto the allocated frequency with its own time slot.

The entire communications architecture is a packet communications structure, in which the small messages (packets) are built and then broadcast from point A to point B. Error detection is provided by conventional techniques. In the PROLINK system, acknowledgement error correction is used to ensure that messages are accurately received. Traditionally, each message packet has an error detection bit or bits embedded in it, in the header or trailer, which may be as simple as the sum of all the words or bytes in the message. The cart receives the information, adds up all the words and compares it to the received error detection bits. If the two match, then the message is deemed to have been received successfully. If, however, the message was corrupted during the transmission, an error detection technique alone will not suffice to correct it.

Many packet communication systems also have embedded error correction, such that a packet cart be detected as having an error and have sufficient redundancy to permit error correction with high reliability. However, a requirement to transmit both error detection and error correction bits in the packets increases overhead and thus reduces bandwidth. The system of the invention uses a technique of acknowledgment error correction in which the base station transmits the packet with any conventional error detection scheme. The cart, if it has detected an error in a message packet from the base station, waits until its next time slice, and then sends a simple status in its transmission to alert the base that the last transmission to that cart contained an error. The base then retransmits that information on the next frame, and this continues until the cart receives error-free message information. If the cart does not acknowledge because it received no message despite the fact that one was sent, the base recognizes the lack of acknowledgement and re-transmits the message on the next available frame. Thus, the PROLINK system is extremely bandwidth efficient because there is no need to constantly and periodically transmit error correction redundancy with every packet. Additional bandwidth is used only to request and transmit another packet when it has not been received properly.

Returning now to the discussion of the variable length communications network, this type of network operates considerably faster than polling of carts to obtain efficient two-way communication and with substantial bandwidth efficiency. Updates on the cart positions are available much more often than with polling. Spread spectrum communications is an alternative, but is presently more expensive to implement than the variable length packet network. Spread spectrum requires special digital signal processing which is computationally intensive, and special RF hardware for wide bandwidth operation which is expensive.

To start up the variable length packet communication network, the CMC must know which golf carts are on the course so that it can send individual messages to carts and control the timing of the entire network. Also, the carts must know their respective time slots so that they can transmit their respective locations back to the CMC, together with any information the golfers want to broadcast. The CMC identifies carts on the network—i.e., carts on the course and which have been powered on—is a function of course operation. When a golfer comes onto the course and is ready to play, he typically gives his clubs to a cart attendant, who then enters the golfer's name and the cart ID number into the PROLINK system. That information is then transmitted to the CMC. The CMC is now alerted that a particular cart has been powered on-line, and is being taken out for a round. Thus, each cart used to play golf is conveniently entered into the network.

To make the PROLINK variable length packet network more robust, a mechanism is provided by which a cart may automatically announce its presence to the CMC without an entry from the attendant. At the end of the CMC differential correction and message packets, an open time slot equal to 56 bits times remains. That time slot can be used by any cart on the course to announce its presence to the CMC by merely transmitting a special control word.

It will be helpful to an understanding of this aspect of the invention and its features to describe the variable length packet network in greater detail, commencing with a system overview.

System Overview

The PROLINK system provides command and control with bi-directional communications between a commander (the PROLINK base station) and a plurality of control assets (individual roving units, such as PROLINK-based golf cart). In the presently preferred embodiment, a variable length packet network is used for communications, in which digital messages containing data packets are transmitted between the base station and the roving units in a half duplex Time Division Multiplex (TDM) digital communication system. Each communication message may be a single packet or multiple packets, but available channel bandwidth is maximized by putting as many packets as can be accommodated in each message.

Each message has a message identification header. In general, bit synchronization information is provided at the beginning of each message, but long messages may also contain synchronization information in the middle or at the end of the message. Each packet has an identifier uniquely determinable from other packets in the message, and is embedded with error detection mechanisms.

In a TDM communication system, transmission of messages is tightly time controlled for efficient use of the available channel bandwidth, and to limit broadcasting to one transmitter a time. However, unlike conventional TDM systems that require an external synchronization mechanism originating from a command station and occupying considerable channel bandwidth, the PROLINK system maintains network synchronization by precise timing generated from the on-board GPS receiver. The PROLINK base station network synchronization occurs only when initializing the roving units with their assigned time slots for transmission. Each roving unit is automatically synchronized to GPS time and is allowed to broadcast in its respective time slot without interaction from the PROLINK base station.

Message and Packet Structures

Messages and packets are segregated into base groups and roving groups, with only one base message for the single base station, but as many roving messages as there are roving units on the variable length network. Base message and roving message structures differ for bandwidth efficiency reasons. In this description, the convention is that a byte consists of 8 bits and a word consists of 16 bits (i.e., a double byte), with bit 0 being the least significant bit (LSB) for all bytes and words. In words of a message, the most significant byte is byte 0 and the least significant byte is byte 1. This corresponds to the convention used in Motorola processors, and the Motorola 68332 processor Queued Serial Peripheral Interface (QSPI) transmits and receives the most significant bit first. The base packets and roving packets are as follows:

| Packet Identification | Packet Function | Broadcast Rate |
|---|---|---|
| Base Packets | | |
| $00_{hex}$ | Differential GPS | 1 Hz |
| $01_{hex}$ | Text Message | As Required |
| $02_{hex}$ | Pin/Tee Box Placement | 1 Round As Required |
| $03_{hex}$ | Network Control | 1 time each 60 sec minimum |
| $04_{hex}$ | Roving Unit Control | As Required |
| $05_{hex}$ | Channel Transition | Once each channel change |
| Roving Unit Packets | | |
| $00_{hex}$ | Roving Unit State | Depends on Network Size |
| $01_{hex}$ | Extended Status | When required only |

The Base Group

Up to 64 messages are possible in the base group, but only a single message is required because of the need for only one base station to support the PROLINK system. Each message may contain up to 256 unique packets, but multiple packets of like number can be sent in the same message subject to message space availability.

Base Message Structure

The base message consists of a bit synchronization word (16 bits), a message identification byte (8 bits), a number of message bytes, a header checksum, and packets, as defined in the following Table.

| Base Message Structure | | | |
|---|---|---|---|
| Byte | C Language Type | Byte Identification | Range |
| 0–1 | unsigned short | bit synchronization | $BFFF_{hex}$ |
| 2 | unsigned char | message identification | $40_{hex}$–$7F_{hex}$ |
| 3–4 | unsigned short | number of message bytes | $0000hex$–$FFFF_{hex}$ |
| 5 | unsigned char | header checksum | $00hex$–$FF_{hex}$ |
| 6 | unsigned char | first packet identification | $00_{hex}$–$FF_{hex}$ |
| — | — | — | — |
| — | — | — | — |
| — | unsigned char | second packet identification | $00_{hex}$–$FF_{hex}$ |
| — | etc. | | |

A Motorola 68332 Time Processor Unit (TPU) is used for bit synchronization. To support TPU detection of bit synchronization, the bit sync word is $BFFF_{hex}$, and the most significant bit (MSB) of the message identification byte must be low. Also, a selected bit, for example bit 14, of byte 2 is chosen to be high to distinguish a cart-based station message from a base station message. Thus, a maximum of 64 ($7F_{hex}$–$40_{hex}$) messages may exist. Details of bit synchronization are discussed below.

The number of bytes in a message is limited to 64K (actually, 65,535) by bytes 3 and 4, with consideration given to the physical hardware synchronization mechanism and stability over time. The header checksum (byte 5) is merely byte 2+byte 3+byte 4. Additions are unsigned and any carry is ignored. The first packet immediately follows the message header, the second packet immediately follows the first, and so on until all packets are embedded in the message. Any dead (unfilled) space between the last packet and the end of the fixed length message is set to $1_{hex}$ (binary 0000 0001). This pattern minimizes interrupts to the 68332 processor, while establishing the proper state for the next receive message to AC couple data from a receiver quadrature detector. A maximum of 96 bytes (768 bits) may be broadcast from the base in any single base message.

Base Packet Structure

Each base packet has a common structure with unique contents to support software commonality. The common structure is a header byte in the byte 0 packet position, and a checksum word as the last two bytes in the packet. The MSB of the header byte may be set to request an acknowledge from the receiving rogue(s), so that up to 128 unique packets can be transmitted from the base to the rogues. For example, a packet identification of $81_{hex}$ is identical to $01_{hex}$ to the receiving rogue except the $81_{hex}$ case requires a hard "acknowledge" from the rogue while an $01_{hex}$ does not. A total of six base packets is used in the preferred embodiment, viz., (1) a DGPS packet, (2) a text message packet, (3) a pin/tee box placement packet, (4) a network control packet, (5) a rogue control packet, and (6) a channel transition packet. The contents of these packets are defined below.

DGPS Packet

Differential GPS corrections are provided in the RTCM-104 format to the base, where they are repackaged into sub packets constituting a more robust form for RF transmission. The base then places all of these sub packets in the DGPS packet for broadcast to the rogues, with the first sub packet always being the RTCM-104-derived header sub packet. This is followed by either differential correction sub packets formed from a type 1 RTCM-104 message, delta differential correction sub packets formed from a type 2 RTCM-104 message, or constellation health sub packets formed from a type 5 RTCM-104 message.

The header contains information regarding the sub packet type following the header, and the number of such sub packets in the DGPS packet. Only a header sub packet and multiple sub packets of the single type defined in the header are allowed in each DGPS packet, i.e., multiple types are not allowed. For example, differential correction sub packets and delta differential correction sub packets can be sent only in two separate DGPS packets. Multiple DGPS packets may be included in any one frame.

The DGPS packet is the only variable length packet in the network and is the highest priority base packet since it must be sent at 1 Hz. While the MSB in RTCM-104 is the lower order bit, the MSB in the system of the invention is the higher order bit to maintain common convention with all other packets. A detailed description of the DGPS packet is illustrated in the following Table.

Packet 0 - DGPS

| Byte | C Language Type | Byte Identification | Range |
|---|---|---|---|
| 0 | unsigned char | packet identification | $80_{hex}$ or $00_{hex}$ |
| 1 | N/A | start of header sub packet | |
| — | | | |
| 6 | N/A | end of header sub packet | |
| 7 | N/A | start of first sub packet defined in header (length = i) | |
| — | — | — | — |
| 7 + i − 1 | N/A | end of first sub packet defined in header (length = i) | |
| 7 + i | N/A | start of second sub packet defined in header (length = i) | |
| — | — | — | — |
| 7 + 2 * i − 1 | N/A | end of second sub packet defined in header (length = i) | |
| — | — | — | — |
| 7 + N * i | N/A | start of $N^{th}$ sub packet defined in header (length = i) | |
| — | — | — | — |
| 7 + (N + 1) * i −1 | N/A | end of $N^{th}$ sub packet defined in header (length = i) | |
| 7 + (N + 1) * i & 7 + (N + 1) * i +1 | unsigned short | packet checksum | $0000_{hex}$–$FFFF_{hex}$ |

The packet identification byte (0) for the DGPS packet is 0, by definition. An $80_{hex}$ requires the rogue to acknowledge the successful receipt of the packet; a $00_{hex}$ does not. The data sub packet is of length i, determined by the rogues from the sub packet type defined in the header sub packet, and N data sub packets of the same type are included in one DGPS packet. The DGPS packet is terminated with a 16 bit checksum on bytes 0 through 7+(N+1)*i−1, computed by unsigned adding bytes and ignoring any carry. For the DGPS packet, a checksum failure does not preclude the use of sub packets with valid checksums.

Header Sub Packet

The header sub packet which is formed from the RTCM-104 header is illustrated in the following Table.

Header Sub packet

| Byte | C Language Type | Byte Identification | Range |
|---|---|---|---|
| 0–1 | unsigned short | sub packet type/station ID | $0000_{hex}$–$FFFF_{hex}$ |
| 2–3 | unsigned short | modified Z-count/station health | $0000_{hex}$–$FFFF_{hex}$ |
| 4 | unsigned char | number of following sub packets/spare | $00_{hex}$–$FF_{hex}$ |
| 5 | unsigned char | sub packet checksum | $00_{hex}$–$FF_{hex}$ |

The RTCM-104 header preamble ($66_{hex}$) is not included in the header sub packet for bandwidth efficiency reasons. Accordingly, the roving unit must insert the preamble during RTCM-104 message reconstruction for transfer to the GPS engine, which is a generic term used to describe a GPS receiver circuit card. Bytes 0 and 1 for the header sub packet and station identification are broken out as illustrated in the following Table.

Bytes 0–1

| Bits | Function |
|---|---|
| 15–10 | sub packet type (range 1 to 64 where 64 = $000000_{binary}$) |
| 9–0 | station identification (range from 0 to 1023) |

The station identification is identical to the definition in RTCM-104, and the sub packet type is equivalent to the RTCM-104 message type (frame ID).

Bytes 2 and 3 for the header sub packet are identical to the RTCM-104 modified Z-count and station health. The three bit RTCM-104 sequence number is not broadcast as part of the header. The rogue is required to create, implement, and rollover the sequence number upon receipt of each DGPS packet before the handover to the DGPS engine. Bytes 2 and 3 are defined as follows:

Bytes 2–3

| Bits | Function |
|---|---|
| 15–3 | modified Z-count (LSB = 0.6 seconds) |
| 2–0 | station health |
| | $000_{binary}$ = station staleness < 12 seconds |
| | $001_{binary}$ = station staleness < 18 seconds |
| | $010_{binary}$ = station staleness < 24 seconds |
| | $011_{binary}$ = station staleness < 48 seconds |
| | $100_{binary}$ = station staleness < 96 seconds |
| | $101_{binary}$ = station staleness $\geq$ 96 seconds |
| | $110_{binary}$ = reference RTCM-104 MSG type 16 |
| | $111_{binary}$ = reference station not working |

Byte 4 contains the number of sub packets following but not including the header sub packet, and three spare bits. The number of sub packets is not a direct RTCM-104 value. RTCM-104 specifies a length of frame value in 30 bit words where data occupies 24 bits and the remaining 6 bits are for parity. An RTCM-104 message has a length of N+2 words, where N=number of words in the message and the two extra words are for the header.

Each type 1 and type 2 message may contain as many SV (satellite vehicle) corrections and delta corrections as the number of SV's in view. A single correction requires 40 bits. If the last correction does not end on an integer word, fill bits are used to pad to the end of the last data (24 bits) in a 30 bit word, in a fill pattern of alternating 1's and 0's. Thus, a conversion from the RTCM-104 length of frame to the header sub packet number of sub packets for a type 1 or type 2 RTCM message is:

# of sub packets=(int)((RTCM-104 length of frame)*24/40)

where the calculation is carried out by the base station. When the roving unit reconstructs the RTCM-104 message (using only correction sub packets received error-free) to be turned over to the GPS engine, it computes the RTCM-104 length of frame from the number of "good" sub packets by reversing the above equation. The byte 4 format is:

| Byte 4 | |
|---|---|
| Bits | Function |
| 7–3 | number of sub packets (range = 0 to 31) |
| 2–0 | spares |

The byte 5 checksum is computed by unsigned adding bytes 0 through 4, and ignoring any carry. If the header sub packet checksum fails, all remaining DGPS packet sub packets are discarded before any decoding begins.

Differential Correction Sub Packet

A differential correction sub packet follows the header sub packet, containing a single SV differential correction derived from a type 1 RTCM-104 message, and is illustrated in the following Table.

| Differential Correction Sub packet | | | |
|---|---|---|---|
| Byte | C Language Type | Byte Identification | Range |
| 0 | unsigned char | scale factor/UDRE/SV ID | $00_{hex}$–$FF_{hex}$ |
| 1 | unsigned char | issue of data | $00_{hex}$–$FF_{hex}$ |
| 2–3 | short | pseudo range correction | $0000_{hex}$–$FFFF_{hex}$ |
| 4 | char | range rate correction | $00_{hex}$–$FF_{hex}$ |
| 5 | unsigned char | sub packet checksum | $00_{hex}$–$FF_{hex}$ |

Byte 0 contains a pseudo range/range rate scale factor, User Differential Range Error (UDRE), and satellite identification, as shown in the following Table.

| Byte 0 | |
|---|---|
| Bits | Function |
| 7 | pseudo range/range rate scale factor<br>(0: PR = 0.02 m, RR = 0.002 m/s)<br>(1: PR = 9.32 m, RR = 0.032 m/s) |
| 6–5 | UDRB<br>$00_{binary}$ – $1\sigma \leq 1$ meter<br>$01_{binary}$ – $1$ meter $< 1\sigma \leq 4$ meters<br>$10_{binary}$ – $4$ meters $< 1\sigma \leq 8$ meters<br>$11_{binary}$ – $1\sigma > 8$ meters |
| 4–0 | SV ID range = 1 to 32, where 32 = $00000_{binary}$ |

The issue of data (byte 1) is defined in U.S. D.O.D. Interface Control Document—GPS-200 and is a unique byte for each SV that corresponds to the ephemeris version used to compute the SV pseudo range and range rate. Bytes 2 and 3 contain the pseudo range correction for the SV identified in byte 0 bits 4–0. Byte 4 contains the range rate. The pseudo range and range rate LSB scale factors are defined in byte 0 bit 7, where the pseudo range correction is a 16 bit quantity and the range rate correction is an 8 bit quantity. The byte 5 checksum is computed by unsigned adding bytes 0 through 4, and ignoring any carry. If the differential correction sub packet checksum fails, the failing sub packet is discarded. The roving unit uses only validated (via a passing checksum) differential correction sub packets when reassembling the RTCM-104 message for transmission to the GPS receiver.

Delta Differential Correction Sub Packet

The delta differential correction sub packet follows the header sub packet and contains a single SV delta differential correction derived from a type 2 RTCM-104 message as illustrated in the Table below.

| Delta Differential Correction Sub packet | | | |
|---|---|---|---|
| Byte | C Language Type | Byte Identification | Range |
| 0 | unsigned char | SF/UDRE/SV ID | $00_{hex}$–$FF_{hex}$ |
| 1 | unsigned char | issue of data | $00_{hex}$–$FF_{hex}$ |
| 2–3 | short | delta pseudo range correction | $0000_{hex}$–$FFFF_{hex}$ |
| 4 | char | delta range rate correction | $00_{hex}$–$FF_{hex}$ |
| 5 | unsigned char | sub packet checksum | $00_{hex}$–$FF_{hex}$ |

This sub packet is identical to the differential correction sub packet in all bit, byte, word scaling and definitions. Its purpose is to provide SV ephemeris corrections when the base GPS receiver begins using a new SV. In this case, the base station may have a different issue of data from the roving unit, in which case the delta message corrects for this ephemeris difference until the roving unit acquires the new SV ephemeris in the 50 bits per second (bps) GPS SV digital transmission.

The byte 5 checksum is computed by unsigned adding bytes 0 through 4, and ignoring any carry. If the delta differential correction sub packet checksum fails, the failing sub packet is discarded. The roving unit uses only validated (via a passing checksum) delta differential correction sub packets when reassembling the RTCM-104 message for transmission to the GPS receiver.

Constellation Health Sub Packet

The constellation health sub packet is identical to the RTCM-104 type 5 message, and covers only one SV at a time, as illustrated in the following Table:

| Constellation Health Sub packet | | | |
|---|---|---|---|
| Byte | C Language Type | Byte Identification | Range |
| 0–3 | N/A | constellation health | $000000_{hex}$–$FFFFFF_{hex}$ |
| 4 | unsigned char | sub packet checksum | $00_{hex}$–$FF_{hex}$ |

Bytes 0–3 are coded as shown in the following Table:

| Bytes 0–3 | |
|---|---|
| Bits | Function |
| 23–19 | Satellite ID: SV ID range = 1 to 32 and where 32 = $00000_{binary}$ |
| 18 | Issue of data link: 0 indicates this information refers to nav data with IOD in type 1 or type 9 message. 1 indicates this information refers to nav data with IOD in type 2 message |
| 17–15 | Data health: see table 20-VII of ICD-GPS-200 |
| 14–9 | Carrier to noise ratio: sf = 1 dB/Hz, range = 25 to 56, LBS is bit 13 |
| 8 | Health enable: if 1, SV is healthy even though SV nav data indicates unhealthy |
| 7 | New navigation data: new SV nav data is being collected that will soon result in a new IOD for the type 1 message |
| 6 | Navigation data warning: a 1 indicates a problem in SV nav data |
| 5 | Loss of satellite warning: if i then SV is scheduled to be switched to unhealthy |
| 4–2 | Time to unhealthy: if but 17 is set, then bits 18–21 define how much time until the SV is set unhealthy. LSB = 5 minutes. Range is 0 to 80 minutes |
| 1–0 | spares |

The byte 4 checksum is computed by unsigned adding bytes 0 through 3 and ignoring any carry. If the constellation health sub packet checksum fails, the failing sub packet is discarded. The roving unit uses only validated (via a passing checksum) constellation health sub packets when reassembling the RTCM-104 message for transmission to the GPS receiver.

Text Message Packet

The text message packet enables the course manager to send a common message to all roving units (golf carts), or to send specific messages to any individual golf cart. A common message, for example, might be the score of a game, a lunch special, or other information which the course manager desires to transmit to all active carts. A unique message to a specific cart might be warnings regarding unauthorized behavior (e.g., driving the cart on the green), or a message from a business associate. Up to 24 characters can be transmitted at one time in a packet; however, up to 16 frames of the packet can be transmitted, which allows a total message length of 384 characters including punctuation and spaces (amounting to about five full text lines). The roving units do not display any part of the message until all frames have been received successfully. At that time the entire message is displayed in a pop up window.

The text message packet structure is illustrated as follows:

Packet 1 - Text Message Packet

| Byte | C Language Type | Byte Identification | Range |
|---|---|---|---|
| 0 | unsigned char | packet identification | $01_{hex}$ or $81_{hex}$ |
| 1 | unsigned char | cart address | $00_{hex}$–$FF_{hex}$ |
| 2 | unsigned char | issue of data message | $00_{hex}$–$FF_{hex}$ |
| 3 | unsigned char | number of frames for message/current frame number | $00_{hex}$–$FF_{hex}$ |
| 4 | unsigned char | ASCII character 1 | $00_{hex}$–$FF_{hex}$ |
| 5 | unsigned char | ASCII character 2 | $00_{hex}$–$FF_{hex}$ |
| 6 | unsigned char | ASCII character 3 | $00_{hex}$–$FF_{hex}$ |
| — | — | — | — |
| — | — | — | — |
| 27 | unsigned char | ASCII character 24 | $00_{hex}$–$FF_{hex}$ |
| 28–29 | unsigned short | packet checksum | $0000_{hex}$–$FFFF_{hex}$ |

The packet identification (byte 0) for the text packet is 1. An $81_{hex}$ requires the golf cart to acknowledge the successful receipt of the packet while a $01_{hex}$ does not require an acknowledge. A cart address (byte 1) of $00_{hex}$ is the all call address and is set if it is desired for all carts to receive a transmission. Any other address will communicate only with the specific cart number identified by the address, and with no other carts on the course.

Byte 2 is an Issue of Data Message (IODM) that identifies a particular message being sent from other messages either recently sent or to be sent. The purpose is to avoid confusion by roving units that successfully received a text message if the same text message is repeated at the request of other roving units that did not receive the original or received it in error. The IODM starts at $00_{hex}$ and increments by one each time a new text message is transmitted. In a repeat of a text message the IODM is set to the IODM that accompanied the original of that text message. When the IODM gets to $FF_{hex}$, it simply reverts to $00_{hex}$.

In byte 3, the upper nibble is the total number frames required to send the complete message, and the lower nibble is the frame number of the current transmission. Thus, if the message was to be sent in 12 total frames (frames 0 through 11) and frame 10 is currently being sent, byte 3 would be equal to $CA_{hex}$. A $0000_{binary}$ for each of the upper and lower nibbles of byte 3 indicates that the message consists of 16 frames and that frame 16 is currently being sent. This mechanization allows the roving unit to know if any frames were missed, and to request a repeat of a specific frame instead of the entire message, with concomitant saving of bandwidth and time.

Bytes 4 through 27 are the 24 specific ASCII characters that make up the piece of the message for the particular frame. Bytes 28 and 29 are the 16 bit checksum which is computed by adding bytes 0 through 27, with any carry being ignored.

Pin/Tee Box Placement Packet

Many courses change their pin locations on each hole on a daily basis. Although tee box locations are typically changed less frequently, an automated technique for updating the system database is still a requirement. To that end, in the PROLINK system a pin/tee box placement packet is broadcast every 16 seconds for each hole of the course. The "power on" default assumption (until an update is available) for all carts is that the pin is in the center of the green and the tee box locations have not changed from the previously stored baseline. Since the packet contains information for one hole, a total of 18 different packets are sent, one each 16 seconds in succession, if all 18 holes on the course have changed. The 18 holes constitutes a round of golf, of course, so that 18 pin/tee box placement packets are required to be broadcast every 288 seconds for an 18 hole course.

The pin/tee box placement packet is preferably assigned the lowest order of packet transmission priority, which is to say that if a base message has no space available, broadcast of the pin/tee box placement packet may be deferred to a subsequent frame in which space is available. Partly for that reason, although the 18 packets should be periodic on 16 second intervals, they may be distributed in any desired sequence throughout the 288 second interval to optimize message loading. This particular packet structure is defined in the following Table.

Packet 2 - Pin/Tee Box Placement

| Byte | C Language Type | Byte Identification | Range |
|---|---|---|---|
| 0 | unsigned char | packet identification | $02_{hex}$ or $82_{hex}$ |
| 1 | unsigned char | hole number | $00_{hex}$–$FF_{hex}$ |
| 2–3 | short | pin X position (LSB = $2^3$) | $8001_{hex}$–$7FFF_{hex}$ ($2'$s complement for –) –4096 m – 4095.875 m |
| 4–5 | short | pin Y position (LSB = $2^3$) | $8001_{hex}$–$7FFF_{hex}$ ($2'$s complement for –) –4096 m – 4095.875 m |
| 6 | unsigned char | front tee/front-middle tee | $00_{hex}$–$FF_{hex}$ |
| 7 | unsigned char | back-middle tee/back tee | $00_{hex}$–$FF_{hex}$ |
| 8–9 | unsigned short | packet checksum | $0000_{hex}$–$FFFF_{hex}$ |

The packet identification (byte 0) is 2, by definition. An $82_{hex}$ requires the cart to acknowledge receipt of the packet; an $02_{hex}$ does not require acknowledgement. The hole number (byte 1) can range theoretically from 1 to 255 with an 8-bit byte, although nothing beyond coverage of a 54 hole course would be required as a practical matter. The pin position for the hole is precisely indicated by bytes 2–3 and 4–5, while bytes 6–7 indicate all tee box locations. For instance, the upper nibble of byte 6 contains the tee box number that is the active front tee box, and the lower nibble of byte 6 contains the tee box number that is active in the front-middle position. Similarly, the upper and lower nibbles of byte 7 indicate active back-middle and active back (championship) positions of the respective tee boxes.

With a maximum of 16 different tee box locations allowed on each hole, colors for the active tee boxes (which are generally unique to the specific course) are stored in the course data base. Sixteen different colors are thus allowed for the tee boxes. The color schedule is common to both the base station and the carts. On courses having only three tee boxes, the back-middle tee identifier is $0_{hex}$. Bytes 8 and 9 are the 16 bit checksum, which is computed by adding bytes 0 through 7, and ignoring any carry. The carts store the pin/tee box placements in RAM memory until a daily power down switch is activated, which causes the data to be copied to flash memory.

Network Control Packet

A network control packet contains information to all carts for cold start when adequate UTC (Universal Time Coordinates) time and position data are not available from the GPS engine. This packet also contains cues for changing the network frequency, number of carts on the network, and halting or restarting the communications network under certain conditions. The packet is broadcast a minimum of every 16 seconds, and can be broadcast immediately when a network reconfiguration is required. The network control packet is defined as follows:

Packet 3 - Network Control

| Byte | C Language Type | Byte Identification | Range |
|---|---|---|---|
| 0 | unsigned char | packet identification | $03_{hex}$–$83_{hex}$ |
| 1–2 | unsigned short | UTC week since Jan 6, 1980 | $0000_{hex}$–$FFFF_{hex}$ |
| 3–4 | unsigned short | seconds in the week since midnight Saturday (LSB = 10 seconds) | 0–604,800 s |
| 5 | unsigned char | frequency/network status | $00_{hex}$–$FF_{hex}$ |
| 6 | unsigned char | current number of frames/ new number of frames | $00_{hex}$–$FF_{hex}$ |
| 7 | unsigned char | network frame counter | $00_{hex}$–$FF_{hex}$ |
| 8 | unsigned char | network duty cycle control | $0000_{hex}$–$FFFF_{hex}$ |
| 9–10 | unsigned short | packet checksum | $0000_{hex}$–$FFFF_{hex}$ |

The packet identification (byte 0) is 3. An $83_{hex}$ requires the cart to acknowledge successful receipt of a packet, whereas an $03_{hex}$ require no acknowledgement. The Rockwell Navcore V GPS engines receive its initialization data from the network control packet (bytes 1–4) as shown in the above table. The UTC time (bytes 1–4) is broadcast in a different format from that required by the Rockwell Navcore V, to save bandwidth. The UTC week (bytes 1–2) started (week 0) on Sunday morning, Jan. 6, 1980. Bytes 3–4 contain the number of seconds since the beginning of the UTC week scaled at 10 seconds per bit. The CPU card should reformat the time data to that required by the Navcore V. In addition to time, the GPS engine needs the initial position for rapid acquisition. Since each cart has a base point survey file in memory to support course reference frame positioning, the latitude, longitude and altitude from the base point survey file can be used to initialize the GPS engine.

The upper nibble of byte 5 indicates the channel to be used by the network, and the lower nibble shows the network control commands. Byte 5 is described further in the following Table:

Byte 5

| Bits | Function |
|---|---|
| 0–3 | bits 0–3 = $0_{hex}$ —> network continues operating in its previous state<br>bits 0–3 = $1_{hex}$ —> halt network (rogues immediately cease transmitting)<br>bits 0–3 = $2_{hex}$ —> restart network (rogues immediately begin transmitting in their time slots defined by bytes 16 and 17 conditioned by byte 18 - duty cycle)<br>bits 0–3 = $3_{hex}$ —> station identification to follow |
| | bits 0–3 = $4_{hex}$ —> Spare |
| | bits 0–3 = $F_{hex}$ —> Spare |
| 4–7 | bits 4–7 = $0_{hex}$ —> tune to channel 0<br>bits 4–7 = $1_{hex}$ —> tune to channel 1 |
| | bits 4–7 = $F_{hex}$ —> tune to channel 15 |

The correlation between channel number and frequency is part of the unique course database.

Byte 6 is used by the carts to compute new broadcast time slots. The upper nibble of byte 6 contains the old number of unique network frames with a range from 0 to 15, and the lower nibble contains the new number of unique frames with a range from 0 to 15. If the upper and lower nibbles are equal, then a network reconfiguration (time slot change) will not take place. The carts must then compute their new time slot by using byte 6 and their previous respective time slot. The algorithm used by a cart for that purpose will be defined presently.

Byte 7 is the network frame counter indicating the current frame being used by the network when the network control packet is received. The frame counter is robust to anticipate the possibility that a cart may get "lost" in the network. With only 16 possible frames, the frame counter range is $00_{hex}$ to $FF_{hex}$.

The most significant 5 bits of byte 8 (bits 7–3) define the network on-time, and the least significant 3 bits define the network off-time. Byte 8 is further described by the Table below.

Byte 8

| Bits | Function |
|---|---|
| 0–2 | (bits 0–2) * 2 seconds off time per period (range = 2 to 16 seconds) |
| 3–7 | (bits 3–7) * 4 seconds on time per period + (range = 4 to 128 seconds) |

If byte 8 is $00_{hex}$, the network is "on" at all times, with no dead time for shared channel users to cut in and use the channel. This does not preclude the fact that often the network frequency will be changed to allow shared channel users adequate access. When byte 8 is not zero, the entire communications network (base station and the carts) is allowed to function normally for the time indicated by bits 3–7, and then all transmissions must cease for the time indicated by bits 0–2. This action is carried out periodically by the base station and the carts while byte 8 is non-zero.

The duty cycle parameters are always synchronized to the beginning of the UTC week (bytes 1–2). For example, if byte $8=A3_{hex}$, the network on time is 80 seconds and the network off time is 6 seconds. The total period is 86 seconds. To synchronize with the current network duty cycle, a cart computes the number of periods since the beginning of the week, and then uses the fractional remainder to determine the duty cycle state for the current period.

Although network off time (bits 0–2) may be selected by a user, care is required since no DGPS corrections are provided during the period of the off time, with consequent potential degradation of yardage accuracy during that period.

Bytes 9 and 10 are the 16 bit checksum, which is computed by adding bytes 0 through 8, and ignoring any carry.

Roving Unit ("Rogue") Control Packet

A rogue control packet is used by the base station to specify to the carts their respective network transmission time slots, and to request packet transmission repeats when previous rogue packet checksum failures occur. This packet is further defined by the Table below.

Packet 4 - Rogue Control

| Byte | C Language Type | Byte Identification | Range |
|---|---|---|---|
| 0 | unsigned char | packet identification | $04_{hex}$ or $84_{hex}$ |
| 1 | unsigned char | cart address | $01_{hex}$-$FF_{hex}$ |
| 2 | unsigned char | re transmit control/ current frame | $00_{hex}$-$FF_{hex}$ |
| 3 | unsigned char | transmit frame number/ total number of frames | $00_{hex}$-$FF_{hex}$ |
| 4-5 | unsigned short | 2048 Hz count within the frame on which to begin transmission | $0000_{hex}$-$07FF_{hex}$ |
| 6-7 | unsigned short | packet checksum | $0000_{hex}$-$FFFF_{hex}$ |

The rogue control packet identification (byte 0) is 4, by definition. An $84_{hex}$ requires acknowledge of the cart's successful receipt of the packet, while a $04_{hex}$ does not. The cart address (byte 1) is the identification (ID) number assigned by the course administrator to the cart, and ranges from 1 up to 255 carts. Address $00_{hex}$ (the "all call" address) is not allowed, because the rogue control packet is only intended for a specific cart.

The upper nibble of byte 2 of the rogue control packet is a request for re-transmission of previous cart packets either not received as they should have been, or received in error attributable to a checksum failure. The lower nibble of byte 2 informs the cart of the current transmission frame on receipt of the rogue control message, to synchronize the cart with the other carts on the network. Byte 2 of this packet is further described in the following table:

Byte 2

| Bits | Function |
|---|---|
| 7-4 | $0_{hex}$ - null ... no re-transmission requested |
| | $1_{hex}$ - re transmit the last rogue packet 0 |
| | $2_{hex}$ - re transmit the second to last rogue packet 0 |
| | $3_{hex}$ - re transmit the third to last rogue packet 0 |
| | $4_{hex}$ - re transmit the last rogue packet 1 |
| | $5_{hex}$ - re transmit the second to last rogue packet 1 |
| | $6_{hex}$ - re transmit the third to last rogue packet 1 |
| | $7_{hex}$ - re transmit the last rogue packet 2 |
| | $8_{hex}$ - re transmit the second to last rogue packet 2 |
| | $9_{hex}$ - re transmit the third to last rogue packet 2 |
| | $A_{hex}$ - re transmit the last rogue packet 3 |
| | $B_{hex}$ - re transmit the second to last rogue packet 3 |
| | $C_{hex}$ - re transmit the third to last rogue packet 3 |
| | $D_{hex}$ - re transmit the last rogue packet 4 |
| | $E_{hex}$ - re transmit the second to last rogue packet 4 |
| | $F_{hex}$ - re transmit the third to last rogue packet 4 |
| 3-0 | $0_{hex}$ - frame 0 |
| | $1_{hex}$ - frame 1 |
| | $2_{hex}$ - frame 2 |
| | — — — |
| | — — — |
| | $F_{hex}$ - frame 15 |

The re-transmit control bits of byte 2 provide for up to five cart packets, for expansion purposes, although the presently preferred embodiment utilizes only one cart packet. Requests may be generated for as many as the last three transmissions of any particular packet sent by the cart. If byte 2 bits 7-4=$0_{hex}$, then no re-transmission is requested. Bits 3-0 of byte 2 indicate that there are currently not more than 16 frames in the variable length packet network, the current frame indicator providing the initial condition for the cart to determine its transmission time slot. The cart propagates the frame number internally on each integer GPS second after the initial frame, and rolls over the frame count to maintain synchronization with the base station.

The most significant nibble of byte 3 defines the frame to be used by the cart for transmission of all information to the base station, and the least significant nibble of that byte defines the total number of frames (maximum of 16) currently being used in the variable length network. This information is used by the cart to determine where a frame rollover occurs.

Bytes 4 and 5 define the actual count within the frame at which the cart is authorized to transmit. Each frame begins on an integer second and is one second long. The fastest task in the PROLINK Computer Unit (PCU) is 2048 Hz, which means, among other things, that 2048 counts exist within a frame at which the cart may begin a transmission. Bytes 6 and 7 are the 16 bit checksum which is computed by adding bytes 0-5, and ignoring any carry.

The Cart Group

The cart group contains as many cart messages as there are carts. Each message may contain only one packet at any given time, but up to 64 different packets are allowed.

Message and Packet Structures

Cart Message Structure

The cart message consists of a bit synchronization word (16 bits), a combination message identification and packet identification word (16 bits total), and the actual packets. This format is truncated significantly from the base station format for bandwidth efficiency; however, the messages maintain uniqueness between the base station and the carts for easy identification. The cart messages are an exact fixed length (9 bytes), and the base station uses this information to compute the checksum for error detection. The cart message structure is illustrated in the following table:

Cart Message Structure

| Byte | C Language Type | Byte Identification | Range |
|---|---|---|---|
| 0-1 | unsigned short | bit synchronization | $BFFF_{hex}$ |
| 2-3 | unsigned short | message/packet identification | $00_{hex}$-$3F_{hex}$ |
| 4 | — | packet contents | — |
| — | — | | — |
| — | — | | — |
| — | — | | — |
| 8 | — | end of packet | — |

The bit synchronization embedded in the cart messages (bytes 0 and 1=$BFFF_{hex}$) is identical to that of the base messages. The message and packet identification are quite different, but are easily separable as follows.

Bytes 2 and 3

| Bits | Function |
|---|---|
| 15 | 1 - terminate bit synchronization properly |
| 14 | 0 - immediately distinguish a rogue message from a cart message |
| 13-6 | Message identification byte (same as rogue ID or address) |
| | $00_{hex}$ - no definition |
| | $01_{hex}$ - cart 1 |
| | $02_{hex}$ - cart 2 |

Bytes 2 and 3

| Bits | Function | |
|---|---|---|
| | $03_{hex}$ - cart 3 | |
| | — — — | |
| | — — — | |
| | — — — | |
| | $FF_{hex}$ - cart 255 | |
| 5-0 | $00_{hex}$ - packet 0 | |
| | $01_{hex}$ - packet 1 | |
| | $02_{hex}$ - packet 2 | |
| | — — — | |
| | — — — | |
| | $3F_{hex}$ - packet 63 | |

The MSB of the message/packet identification word must always be low to support bit synchronization. Bit 14 is always zero, to distinguish a cart message from a base message. The next 8 bits (bits 13–6) define the cart address, and the last 6 bits define the cart packet type with up to 64 packets supported. To prevent confusion with an "all call" address, the cart address cannot be $00_{hex}$.

Cart Packet Structure

Each cart packet consists of data starting at packet byte 0 (message byte 4) and a one byte checksum at packet byte 4 (message byte 8), so that each packet may have up to 4 bytes (32 bits) of data.

Cart State Packet

The cart state packet (packet 0) is the primary packet for course management. It contains the location of the cart in the course coordinate frame and a one byte status, as follows:

Packet 0 - Rogue State

| Byte | C Language Type | Byte Identification | Range |
|---|---|---|---|
| 0 | unsigned char | rogue status | $00_{hex}$-$FF_{hex}$ |
| 1-3 | N/A | rogue position | $0000_{hex}$-$FFFF_{hex}$ |
| 4 | unsigned char | packet checksum | $00_{hex}$-$FF_{hex}$ |

The cart status (byte 0) is a catch-all status byte for the cart that contains the following information:

Byte 0 - Cart Status

| Byte Value | Function |
|---|---|
| $00_{hex}$ | Null ... no status or information to report |
| $01_{hex}$ | spare |
| $02_{hex}$ | spare |
| $03_{hex}$ | spare |
| — | — |
| $0F_{hex}$ | spare |
| $10_{hex}$ | resend text message packet (base packet 1) frame 1 |
| $11_{hex}$ | resend text message packet (base packet 1) frame 2 |
| $12_{hex}$ | resend text message packet (base packet 1) frame 3 |
| $13_{hex}$ | resend text message packet (base packet 1) frame 4 |
| $14_{hex}$ | resend text message packet (base packet 1) frame 5 |
| $15_{hex}$ | resend text message packet (base packet 1) frame 6 |
| $16_{hex}$ | resend text message packet (base packet 1) frame 7 |
| $17_{hex}$ | resend text message packet (base packet 1) frame 8 |
| $18_{hex}$ | resend text message packet (base packet 1) frame 9 |
| $19_{hex}$ | resend text message packet (base packet 1) frame 10 |
| $1A_{hex}$ | resend text message packet (base packet 1) frame 11 |
| $1B_{hex}$ | resend text message packet (base packet 1) frame 12 |
| $1C_{hex}$ | resend text message packet (base packet 1) frame 13 |
| $1D_{hex}$ | resend text message packet (base packet 1) frame 14 |
| $1E_{hex}$ | resend text message packet (base packet 1) frame 15 |
| $1F_{hex}$ | resend text message packet (base packet 1) frame 16 |
| $20_{hex}$ | resend pin/tee box packet (base packet 2) for all holes |
| $21_{hex}$ | resend last network control packet (base packet 3) |
| $22_{hex}$ | send rogue control packet (base packet 4) |
| $23_{hex}$ | network entry request |
| $24_{hex}$ | spare |
| $25_{hex}$ | spare |
| — | — |
| $2F_{hex}$ | spare |
| $30_{hex}$ | golfer request - send refreshment cart |
| $31_{hex}$ | golfer request - send ranger |
| $32_{hex}$ | golfer request - send extra balls |
| $33_{hex}$ | golfer request - send medical assistance |
| $34_{hex}$ | golfer request - Cart disabled ... send another cart |
| $35_{hex}$ | golfer request - Send a cellular telephone |
| $36_{hex}$ | golfer request - "Yes" response to any base question |
| $37_{hex}$ | golfer request - "No" response to any base question |
| $38_{hex}$ | spare |
| — | — |
| $4F_{hex}$ | spare |
| $50_{hex}$ | DGPS packet acknowledge |
| $51_{hex}$ | complete text message successfully received acknowledge |
| $52_{hex}$ | pin/tee box round received successful acknowledge |
| $53_{hex}$ | rogue control packet acknowledge |
| $54_{hex}$ | network control packet acknowledge |
| $55_{hex}$ | spare |
| — | — |
| $FF_{hex}$ | spare |

Bytes 1 through 3 form two 12 bit words that indicate the cart position as follows:

Bytes 1–3/Cart Position

| Bits | Function |
|---|---|
| 23-12 | Cart X-position —> 12 bit signed value with the LSB = 2 meters |
| 11-0 | Cart Y-position —> 12 bit signed value with the LSB = 2 meters |

Byte 4 is an 8 bit checksum computed by adding bytes 0 through 3, and ignoring any carry.

Extended Status Packet

The cart state packet allows only a single catch-all status byte to be sent for each cart transmission. Because of the number of status indicators, this status byte is not bit oriented. If a cart were requested by the base station to send a cart control packet acknowledge when the golfer requests the refreshment cart, requests would be sent in the next cart state packet and the following packet, which could take considerable time in a large network. This problem is exacerbated if more than two status responses are in the queue and must be sequentially broadcast.

An extended status packet allows a cart to catch up if it is unable to get status information to the base station fast enough. This can occur in networks with many frames because the base station may broadcast on every frame whereas the cart may only broadcast once each frame cycle. If, however, the cart chooses an extended status packet, the cart location will not be broadcast in the frame cycle, and hence, minimal use should be made of this packet. The extended status packet is described in the following table:

| Packet 1 - Extended Status | | | |
|---|---|---|---|
| Byte | C Language Type | Byte Identification | Range |
| 0 | unsigned char | cart status 1 | $00_{hex}$–$FF_{hex}$ |
| 1 | unsigned char | cart status 2 | $00_{hex}$–$FF_{hex}$ |
| 2 | unsigned char | cart status 3 | $00_{hex}$–$FF_{hex}$ |
| 3 | unsigned char | cart status 4 | $00_{hex}$–$FF_{hex}$ |
| 4 | unsigned char | packet checksum | $00_{hex}$–$FF_{hex}$ |

Each cart status byte in this packet is a catch-all status byte for the cart, containing information identical to that in the cart state packet. Thus, up to four unique status bytes can be broadcast in the extended status packet. Byte 4 is the 8 bit checksum computed by adding bytes 0 through 3, an ignoring any carry.

Communications Timing

The PROLINK system is a half duplex Time Division Multiplexing (TDM) digital communication system. In such a system, the transmission of messages is tightly time controlled to make efficient use of the available channel bandwidth, and to ensure that no more than one transmitter is broadcasting at any one time. Most digital communication systems require the command (base) station to synchronize the network, often with a significant resulting bandwidth reduction.

The PROLINK system, however, relies on the base station and all carts being synchronized to GPS time within a few microseconds, and therefore can dispense with the need for direct base synchronization. This is a significant advantage relative to the typical TDM system. All network participants need only be initialized to indicate when they are allowed to transmit. Thereafter, each is free to transmit in its own unique, specific time slot asynchronous of direct base station timing control.

Frame Timing

Each frame begins on an integer GPS second as discussed above with reference to FIG. 5, and is one second long, by definition. Frames repeat each second, and interleaved within the one second frame period are messages between the base station and the carts (i.e., to and from).

Referring to FIG. 11, the communications network packet timing diagram of the variable length network of the PROLINK system is shown. With the communications bit rate of 2048 bps, the base station message in a frame may occupy 768 bits which is equal to 37.5% of the available transmission time (375 ms). Each cart message in a frame may occupy 72 bits, or approximately 3.5% of the available transmission time (35 ms). Between transmissions, 3 bits (1.46 ms) allow the current transmitter to cease transmitting (i.e., to release the transmitter key line to drop the carrier power) and the new transmitter to begin transmitting (i.e., to assert the transmitter key line to generate carrier power).

A 78 bit gap immediately after the base message transmission allows carts to enter the network via a 72 bit cart message. At the end of the frame, a 5 bit gap (2.44 ms) exists before a new frame is started. A predetermined number of different carts may transmit in a single frame, for example, 16 carts/frame. Moreover, up to 16 unique frames are allowed in the presently preferred variable length network format. Thus, up to 255 carts (rather than 256, since cart address $00_{hex}$ is not allowed, being an "all call" address) may be employed in any one network. In that way, one PROLINK system base station can readily support three 18 hole courses (54 holes) operating simultaneously.

Referring to FIG. 10, a diagram illustrating the variable length network of the PROLINK system is shown. The frame cycle is circular with as many as 16 unique frames as denoted by frames 0, 1, ... n, where n is 15, the number of which is set by the base (command) station according to network load requirements; hence, the name variable length network. When few carts are on the course, the base station maintains only a relatively small number of unique frames to provide a higher update rate of the cart state packet to the course manager/administrator. This higher update rate is attributable to a need for fewer unique frames to be transmitted before the network returns again to frame 0 in the cycle, as shown in FIG. 10.

Since the number of carts in a frame is 16, the number of additional carts accommodated by an increase in the network size is quantized at 16, because only integer frames may be added or subtracted. For example, if 20 carts are on the course, the maximum number of frames required is 2 ((int) 20/16)+1). But if more than 32 carts are on the course, the base must command a network reconfiguration to add a third frame. The fastest unique cart position updates are provided to the base station every second when 16 or fewer carts are on the course, whereas the slowest updates are given every 16 seconds when more than 240 carts are on the course. This variable length structure ensures maximum network efficiency at all times.

No interruptions of a frame or a frame cycle are allowed in mid-execution. Rather, all interruptions in frame broadcast are restricted to the beginning of an integer second at the beginning of the frame cycle. The base is responsible for timing interrupts accordingly through the use of base packet 3 (network control). On reception of network reconfiguration commands in base packet 3 or base packet 4, all carts must wait until the end of the frame cycle before enacting the configuration change command. Examples of frame interrupts are (i) preparation for a station identification broadcast, (ii) a network reconfiguration, and (iii) network duty cycle control.

Bit Synchronization

In most digital communication systems, a challenge is presented to synchronize a receiver clocking in the digital base stream with a transmitter clocking out the digital bit stream asynchronously. In the preferred embodiment of the PROLINK system, the bit synchronization method takes advantage of the power of a Motorola 68332 microcontroller.

The PROLINK digital communication system functions are primarily carried out by a PROLINK Computer Unit (PCU), and hence, by the 68332 microprocessor. Referring back to FIG. 8, a digital transceiver includes a transmitting PCU CPU card 95 with a source encoder 102 for the information source 101, an encryptor 103 (optional), and a channel encoder 104, a transmitting PCU RF card 96 with a data modulator 105 for transmission over communications channel 107. On the other side of the communications channel, the transceiver includes a receiving PCU RF card 97 with a data demodulator 109, and a receiving PCU CPU card 98 with bit synchronization 110, a channel decoder 111, a decryptor 112 (if an encryptor is used on the transmitting side), and a source decoder 113 for outputting the received information 114. The RF card has no "intelligence", and is only responsible for modulating and demodulating the data on the carrier. The PROLINK system is partitioned in this manner to substantially reduce recurring cost, with considerable power afforded by the 68332 microcontroller on the CPU card, and obviating a need for an independent microcontroller for proper operation of the RF card.

The 68332 microcontroller is effectively two independent microcontrollers on a single chip. One is a powerful CPU-32 core, which is utilized in the presently preferred embodiment for all PROLINK graphics processing and interface control. The other is a Time Processor Unit (TPU), which handles select discrete I/O and bit synchronization functions of that embodiment.

The RF digital data stream is received by a 68332 Queued Serial Peripheral Interface (QSPI), which requires a clock synchronous with the received data to clock the data into a receive shift register. A series of synchronization bits is embedded by the transmitter at the start of the data stream. The receiving PCU TPU detects the synchronization bits and generates the QSPI receive clock. Such bit synchronization is considerably more efficient than one which sends start and stops bits at the expense of about 20% of channel bandwidth.

A preferred technique to accomplish bit synchronization will be described below. All falling edges of the input data stream create an interrupt to the 68332 processor via a TPU Period Pulse Width Accumulation (PPWA) function. The latter function measures the positive going period of any input waveform. As noted above, the PROLINK bit synchronization word is $BFFF_{hex}$ which indicates that 14 high bits exist for use in identifying a bit synchronization word. Upon interrupt, the 68332 processor immediately resets the PPWA function, which then begins accumulation of pulses at the next low to high transition of the data. Accumulation ceases at the following high to low transition where the processor is interrupted.

The 68332 processor reads the TPU PPWA accumulator to see whether 14 bits worth of accumulation has occurred. At the high to low transition, the PPWA automatically links to another TPU channel which immediately begins performing an output compare (OC) function. The OC function allows a programmable delay to transpire before the start of a 50% clock duty cycle. The clock is delayed one-half of one bit time (244 µs) before starting to synchronize with the incoming bit stream. If the 68332 check of the PPWA accumulation shows a non-14 bit time value, the 68332 shuts off the OC function before the clock can begin when in the bit synchronization search mode. The interrupt is masked, and therefore ignored, after the bit synchronization word has been detected and the data is being clocked in.

Once the clock is running, every occurrence of 14 high bits in the data stream simply resynchronizes the clock. The 68332 processor has the option of inspecting the first three bytes of any message (header) to ensure that the message is valid, and, if not, to halt the clock. Since all messages in the PROLINK communications network are fixed and time coherent, the 68332 processor can simply "look" for the message at the proper time, and shut off the OC generated clock after the message has been received to prevent clocking in any erroneous data.

It is important that clock drift should be well understood to define the maximum possible message length without a new bit synchronization word. This discussion stems from the fact that the cart and the base master oscillators are not synchronized, and any delta between the two results in a constant serial data stream clock bias. The base and all carts must periodically calibrate their master clocks in order to generate exactly 2048 interrupts in a one second period to provide adequate transmit time accuracy. This is possible since the GPS PPS can be used to measure the CPU card oscillator clock drift and compensate the interrupt counter for this drift as previously discussed. Since the TPU clock source is simply one fourth the master clock rate, once the master clock is calibrated the TPU clock is also calibrated. Although the PPWA and OC periods could be calibrated to reflect clock drift and seek to maintain synchronization between the transmitting and receiving CPU cards, that would be undesirable. The TPU timing resolution is 244 ns. Given that a bit is $\frac{1}{2048}$ s=488 µs, quantization error alone results in a 500 ppm (±250 ppm) error. The crystal oscillator on the CPU card is accurate to ±100 ppm over the PROLINK temperature range. Furthermore, the oscillator temperature coefficient is negative. The base station and the carts typically experience the same temperatures. Thus, the delta clock error between the base and the carts will be well under 100 ppm. If the base and the carts RSS±100 ppm errors, ±141 ppm 3σ is obtained. Thus, the hardware clock accuracy far surpasses the potential TPU performance. As a result, the PPWA and OC periods programmed by the base and the carts is a constant of the same value.

Delta clock error is only an issue for the base message since it is so long (375 ms) compared to the cart messages. Clock drift over the transmission interval is assumed to be quite small since the transmission intervals are correspondingly small. The delta clock error does not cause a serial clock bias greater than one fourth of a bit time (122 µs) during the receipt of the base message. This means that the TPU clock bias must be better than 326 parts per million during the message transfer (375 ms duration). Clock bias on the order of 100 ppm allows over 1.2 seconds of data transfer with a one fourth bit time error requirement. This allows approximately 2500 bits to be transmitted before the required occurrence of another bit synchronization word. The result is potential channel bandwidth overhead as low as 0.7 percent. This compares to the 20 percent number discussed earlier for transmission of start and stop bits for each byte.

Network Operation

The rules and procedures for overall operation of the variable length network are established with network start, stop, and reconfiguration procedures. Unique shared channel FCC operations are established, and techniques of network robustness are addressed below.

Network Start Up

For the variable length network to operate, the base station must know at all times which carts are on the course, and must have assigned all carts a time slot within a frame for cart communications to the base. Thus, a mechanism is necessary for the base to ascertain which carts are ready to be used, and hence to be initialized, for network operation.

Daily Cart Power Up Initialization

At the beginning of each day, all carts are in the cart garage. There are two PROLINK cart system on/off switches. The first is a master on/off that, when shut off, completely de-energizes all PROLINK cart components (entire PCU and monitor). The second switch is the daily on/off switch. When the daily on/off switch is off, the PCU CPU card receives an interrupt to implement an orderly power down, which results in the monitor and GPS engine being shut off (with SRAM power retained). The CPU card and the RF card are still operational. This allows the PCU to receive nightly downloads of advertising information and to provide nightly uploads of health and status data for distribution to the PROLINK system provider via a modem. The cart garage attendants will rarely, if ever, put the master on/off switch in the off position unless the PROLINK system is malfunctioning. The attendants do, however, power on the daily on/off switch when they have prepared the cart for use by golfers, and have moved the cart outdoors where the GPS antenna has reasonable line-of-sight to satellites.

When the daily on/off switch is powered on by the cart attendants, the CPU card initiates power to the GPS engine. The CPU card must wait for the GPS engine to have accurate GPS/UTC time before any RF transmissions can properly take place. At power on, the CPU card attempts to find the base transmission channel by listening on each course channel for a valid base message. If the GPS/UTC time is valid, then the base message will start on each integer second. If the GPS/UTC time is not valid, then the base message can begin at any time, as the cart is not aware of accurate time. Since the range between the base and the cart is typically quite small, it is only necessary for the CPU to dwell for two seconds on each channel to be assured that the base transmission would not have been missed. Access to each channel is attempted in circular fashion until the base message is successfully received.

If the GPS engine does not report good UTC/GPS time two minutes after a power on, the CPU awaits a base network control packet (packet 3) and initializes the GPS engine with the packet initialization data. Again, the cart is not allowed to transmit until it has good GPS/UTC time.

Cart Network Entry

Once the cart has good GPS/UTC time and is locked on the base message, the cart can begin the network entry process. Two methods are available to enter the variable length network, viz., (1) base station initiated entry, and (2) cart initiated entry.

In base initiated network entry, the base begins transmitting a cart control packet to the specific cart (by cart ID number) every 60 seconds (subject to bandwidth availability) until the designated cart responds with a cart control packet acknowledge. The transmitted packet contains all information required by the cart to participate in the network. The cart number may be entered by operator entry, but as previously described herein the preferred technique is that each assigned cart ID, cross-referenced to the using golfer, be entered on the course management computer (CMC 41, FIG. 3) by the attendant(s) at the time the golfer rents the respective cart.

The cart initiated network entry process allows a cart to request network privileges at a time that the base station is unaware that the cart is ready for network access. To that end, the cart transmits a cart state packet with a cart network entry request (byte $0=23_{hex}$) in the cart network entry time slot that occurs immediately following the base message (see the frame timing diagram, FIG. 11). To avoid conflicts over network access attributable to more than one cart seeking network entry at the same time, an access arbitration scheme is employed to determine which cart is given priority to take that network entry time slot.

The arbitration scheme used in the preferred embodiment of the PROLINK system, is that each cart seeds a random number generator with its unique cart number upon receiving a valid GPS/UTC time from the GPS engine. The random number generator has a uniform distribution with a range from 1 to 4 in integer steps (four discrete events). When a cart desires network privileges, it causes the random number generator to be sampled. If a 1 is generated, the cart is allowed to transmit in the next cart network entry time slot. If any other number is generated (a 2, 3, or 4), the cart is not allowed to transmit. Each second, the cart samples the random number generator until a 1 is generated and transmission is allowed. The cart continues this process until it is successfully integrated into the network by the base.

The performance of this arbitration scheme can be evaluated as follows. The probability that any cart has the opportunity to transmit in the network entry time slot is:

$P(\text{Cart } Rn=1)=¼$ i.e., the probability that the random number generator will generate a 1 when sampled by Cart Rn is 1 in 4. The probability that this cart will not be given the opportunity to transmit, then, is:

$P(\text{Cart } Rn \neq 1)=¾$ i.e., 3 in 4. Thus, any given cart will statistically be afforded one opportunity in any four attempts (4 seconds since the frame rate is one Hz) to actually transmit a request for network access.

In a case where two carts are seeking to transmit in the cart network entry time slot at the same time, it may be assumed that all cart random number generators are statistically independent provided that each cart has a different random number seed. Thus, the probability that cart A is attempting to transmit in the same frame as cart B is:

$P(\text{cart } A=1, \text{cart } B=1)=P(\text{cart } A=1)CDOTP(\text{cart} B=1)=(¼)(¼)=1/16$ The probability that cart A is transmitting and cart B is not transmitting in a given frame is:

$P(\text{cart } A=1, \text{cart} B \neq 1)=P(\text{cart} A=1)CDOTP(\text{cart} B \neq 1)=(¼)(¾)=3/16$ And the probability that neither cart A nor cart B is transmitting in a given frame is:

$P(\text{cart} A \neq 1, \text{cart} B \neq 1)=P(\text{cart} A \neq 1)CDOTP(\text{cart} B \neq 1)=(¾)(¾)=9/16$ Thus, both cart A and cart B are simultaneously attempting to transmit in the network entry time slot only 1 out of every 16 seconds. In that single conflicting frame, the base station will be unable to understand either cart. However, three times out of every 16 seconds (≈1 in 5 seconds) cart A will succeed in requesting network privileges, and 9 times out of every 16 seconds neither cart will be trying to gain access to the network. Thus, cart A will require about 5 seconds to enter the network when cart B is also attempting to gain entry, versus requiring only 4 seconds when cart A alone is requesting network privileges.

The time (in seconds) required for each cart to gain network access degrades rapidly with an increasing number of carts simultaneously requesting network privileges. It can readily be shown, for example, that if six carts were simultaneously requesting network privileges, each cart would encounter a 17 second delay before successful access to the base station. However, when one of those six carts succeeds, only five carts remain vying for network privileges, and then 4, and so forth. The total time required for all six carts to have gained access to the network is the integral of a curve, which can be shown to be 55.42 seconds. For 10 carts, the time period is 201 seconds for the base station to integrate all 10 carts into the network. Of course, it is quite unlikely that all carts would request network privileges at the same time. In fact, if no more than ten carts were powered on in a 3.4 minute period, the network would not need human entry of cart numbers even on an 80 cart course.

Cart Time Slot Allocation

After the base recognizes that a cart is requesting network privileges, the base immediately broadcasts a cart control packet (base packet 4) in the next base message addressed to the specific cart requesting privileges. Byte 0 of the packet must be $84_{hex}$ to require a cart acknowledge. The re-transmit control (upper nibble of byte 2) is set to $0_{hex}$ (no re-transmission required). If the base does not frame cycles, then the base will assume that the cart did not receive the packet and will re-transmit in the next base message, and then once each frame cycle thereafter until the cart successfully acknowledges. If no acknowledge is forthcoming in 16 frame cycles, the base station will delete the cart from the active network member list until the cart sends another network entry request in the network entry time slot.

Upon receipt of packet 4, the cart uses the lower nibble of byte 2 as the current frame indicator. The cart then has responsibility to increment the frame counter on each integer second and to roll over the frame counter (back to zero) when it exceeds the total number of frames indicated by the lower nibble of byte 3 in packet 4. The upper nibble of byte 3 contains the frame that the cart has been assigned for transmission. Bytes 4 and 5 contain the 2048 Hz count on which the cart is to transmit in the allocated frame. Each cart's 2048 Hz counter is zeroed on the integer second and then incremented by one for each received calibrated 2048 Hz interrupt. When the current frame computed by the cart equals the allocated cart transmission frame, and the cart count equals the allocated cart count, the cart message is broadcast. In this manner, each cart broadcasts its message at its specific designated time within a specific frame so that no two carts are transmitting at the same time, and that no cart is transmitting when the base is transmitting.

Network Reconfiguration

In the PROLINK system, the network configuration will require frequent change during normal network operations. Activities such as entry of additional carts into the network, transitioning channels and embedding a transmit/receive duty cycle to meet shared channel requirements, and station identification broadcasts, among other possibilities, necessitate network configuration changes.

Network Length Change

For optimum network operation, the base station is tasked to allocate frames and time slots within frames to carts in sequence starting with frame 0 at network start up. When more than 16 carts are required to be in the network, frame 1 will be allocated to accommodate those 16 additional carts, and so on up to the available total of 16 frames allocable for as many as 255 carts on the network. This ensures a rapid update rate for cart position reports to the CMC, and maximizes the efficient use of available channel bandwidth. The procedure for adding or subtracting network frames will now be described.

If the number of carts required to participate in the network exceeds the number of frames allocated for or by the network, it will be necessary to add frames. In that event, the carts must be informed of the additional frames so as to alter their transmit timing. The notification is transmitted by the base station by way of the network control packet (base packet 3). Byte 6 in base packet 3 contains the current number of frames in the upper nibble and the new required number of frames in the lower nibble. If the upper and lower nibbles are equal, the cart recognizes that no network reconfiguration is taking place. However, if the number of frames in the upper and lower nibbles differ, the cart computes its new transmit timing from the initial timing and the new number of frames. This is done by maintaining the same transmission frame and 2048 Hz count as originally communicated by the base in the cart control message, but with the total number of frames before cart transmission increased by the added number of frames. This, of course, means that the length of time required by the cart to complete a frame cycle is increased by the newly added frame(s), but the actual cart time slot remains the same. An analogous situation occurs where the number of carts in the network is reduced, except that the length of time required to complete a frame cycle is also reduced for the remaining carts, with resulting higher cart state packet transmission rates.

The base asserts the new number of frames at the beginning of a frame cycle and continuously over the duration of the frame cycle by sending a network control packet every frame. By definition, the carts cannot enact a frame change until the end of a frame cycle, which provides desirable redundancy where a cart may not be receiving reliable base data. Further, if the base fails to receive a particular cart transmission consistently over three frame cycles immediately after a network length change, the base responds by broadcasting a cart control message to that cart to verify the proper time slot data.

The base does not increase frame size until no "blank" time slots are present in any of the currently allocated frames, a situation more likely to occur toward the middle of the day when some carts complete their 18 hole rounds. For instance, frame 0 is the first to be filled, and may only be half occupied by noon as frame 0 carts retire after the round. Instead of adding new frames to accommodate additional carts for afternoon rounds, the base inserts the new carts into frames and time slots that have recently become available, to maximize use of channel bandwidth. Cans used for two rounds a day (morning and afternoon) relinquish their time slots after each round and are allocated new frames and time slots by the base at the beginning of the new round.

At the end of the round, the cart daily on/off switch is switched to the off position by the cart shop attendant to reset all cart mode control logic and conserve power. At any time during a round, the base can send a cart control packet instructing a cart to begin using a different time slot for communications, such as when network size is reduced toward the end of the day.

Network Channel Transition

FCC rules require sharing of channels in the 450–470 MHz range by all users, although a fixed limit does not exist for any particular user's length of stay on such a channel. To preclude any apparent, much less actual, monopoly of a channel by the PROLINK system, several techniques are employed. First, the PROLINK system operates under the UHF offset channel telemetry rules with no more than 2 watts power and an antenna height no greater than 20 feet, which limits both transmission range and interference potential. Under FCC UHF offset band rules, no limitation is placed on the number of frequencies that may be held by a user, and typically, the PROLINK system would maintain from three to six frequencies. Second, the PROLINK system dictates frequent hops to alternate frequencies to allow other users to gain access to the channels to be shared.

The upper nibble of byte 5 in the network control packet (base packet 3) indicates the channel to be used by the cart. If this packet contains a different channel designation than the current channel, all carts are obliged to switch to the new channel at the end of the frame cycle. This is achieved by reprogramming the cart's RF card frequency synthesizers. As discussed above, the first base message (frame 0) of the new frame cycle is restricted to only DGPS related packets. This enables all carts to begin switching channels at the end of the old frame cycle, and allows time for the frequency synthesizers to be reprogrammed, settle, and return to lock during the first frame of the new frame cycle without loss of any critical cart-specific information. Since the frequency synthesizers can be reprogrammed and settle within 150 ms, all carts are ready to transmit in their respective frames by the time the base completes transmission of the first frame DGPS only packets (375 ms duration).

The base refrains from sending any cart specific packets (packets 1 and 4) until it has received at least one DGPS packet acknowledge (cart state packet byte $0=50_{hex}$) on the new channel from the cart for which the specific packet is intended. This avoids the possibility of transmissions by the base to a specific cart in the unlikely event that the cart failed to make the designated channel change.

Referring back to FIG. 3, the PROLINK base station employs two PROLINK Computer Units (PCU'S)—one of which is the primary base transceiver (45) that operates the entire communications network, and the other (51) serving as a scanner to check all channels for traffic. Upon request by the CMC, PCU 51 reports all current channel traffic activity on which the CMC will base a decision on moving to a new channel.

When a change of channel is decided, the base maintains the upper nibble of byte 5 set to the new channel over the entire frame cycle so that all carts are notified. Once a channel change is declared, it is not subject to change in mid-cycle, which means that a problem could erupt if a shared channel user were to usurp the channel in a frame cycle period and find that the entire network is displacing it on the selected channel at the end of the first frame cycle. To avoid this, however, PCU 51 transmits a Morse Code station identification on the new channel immediately after the channel change has been declared and for that entire frame cycle, so that the PROLINK system immediately "claims" the new channel when it is available, and satisfies the FCC identification requirement.

As a further protection against a cart not receiving a channel change notice (packet 3), the cart, upon recognizing that it is not receiving any further base station transmissions, is adapted to begin scanning each channel with a per-channel dwell time of 2 seconds until it locates the base message. During the scan period, the cart is precluded from transmitting, and when the DGPS packet is received the cart acknowledges such receipt to inform the base station it is available for packet 1 and 4 transmissions.

To prevent the system from monopolizing a particular channel for too long an interval, the base station uses a random number generator to determine the length of time the channel will be occupied, at start up or during the channel transition process. The random number seed is the time at which GPS/UTC time became valid, and the generator produces a uniform distribution with an integer range from 5 to 15 minutes. At the end of the time interval which has been determined in this manner, the base (CMC) commands a channel change.

Network Emergency Use Access

FCC rules specify that shared channel users declaring a life threatening emergency have channel priority over all others until the emergency has subsided. As the PROLINK system does not employ voice recognition to recognize a declaration of emergency authorization on a particular channel, the following procedure is implemented. If the base detects eight cart state packet checksum failures in a single frame, it assumes that someone has "stepped on" (seeks to confiscate) the channel. The base then immediately ceases all transmission on that channel, and shifts to a clear channel. The carts go through a scanning exercise of the type described above to locate the new base channel. No cart specific packets (packets 1 and 4) are broadcast by the base until a cart DGPS packet acknowledge is received from the cart on the new channel.

Alternatively, the base can invoke a duty cycle on network operations so that the network alternates between operating normally for a predetermined period of time and pausing for another predetermined period of time to allow access to the channel by any shared channel users or emergency users. The network duty cycle is controlled by byte 8 of the network control packet, in which the most significant nibble controls the network "on" period and the least significant nibble controls the network "off" period. A change in the network duty cycle is asserted by the base at the beginning of a frame cycle, in the network control packet. A Received Signal Strength Indicator is used by the base and the carts during the network "off" time to determine if someone cut in on the channel.

Network Station Identification

FCC rules require that the base broadcast a Morse code station identification at least once every 15 minutes. This is done automatically by the scanning receiver just before every network channel change when the new channel is claimed.

Network Stop & Restart

The base station can prevent carts from transmitting in their time slots by setting the upper nibble of byte 5 of the network control message to $1_{hex}$ at the beginning of a frame cycle, and transmitting a network control packet with the network halt bit asserted for each frame in the frame cycle. This process is continued until all carts are known to be off the air. This capability to halt the network is provided principally for test purposes.

During the halt period, the base and the carts continue propagating the frame count and 2048 Hz counts, and all functions remain operational except the actual broadcast of information in the allocated time slot. The base may continue to broadcast if desired, but without the expectation of any cart response until the network is commanded to restart. Network restart is commanded by the base station by sending a network control packet with the upper nibble of byte 5 set to $2_{hex}$. This process is continued until all carts are known to be on the air through their DGPS packet acknowledges.

Network Robustness

It will be observed from the foregoing descriptions that, in general, the PROLINK variable length network is a hybrid acknowledge based and repeat request based system. The base only requires the cart to acknowledge successful receipt of certain packets at certain times. The base only requests an acknowledge from a cart in one packet type in an entire frame cycle, since the cart can respond only once each frame cycle. For redundancy, the base may broadcast the same packet type with the acknowledge request set many times over the frame cycle to provide the cart a higher probability of receiving the packet, but an acknowledge would not be expected until the cart has the opportunity to broadcast in its time slot. If the base fails to receive the appropriate cart acknowledge, it assumes the cart failed to receive the packet properly and re-transmits the packet until the cart acknowledges. When no packets in a base message request acknowledge, and no golfer status is to be sent, the cart automatically sets the DGPS acknowledge condition.

Each packet has certain unique error handling aspects as follows.

Base DGPS Packet

Each time a cart receives a DGPS packet with the acknowledge request set, the DGPS packet acknowledge must be set in the next cart state packet transmission. Additionally, the cart sets the DGPS packet acknowledge if no other acknowledges are set or other cart status, such as golfer requests, are required, to act as a cart "heart beat" monitor.

Base Text Message Packet

Text messages are sent from the base station to the carts over as many as 16 frames, and the carts acknowledge only the successful receipt of the entire text message in the cart state packet (byte 0). If a text frame is in error, the carts can request a re-transmission of the specific frame via the cart state packet. If multiple frames are in error, the cart must broadcast a re-transmission request for each errant text frame one frame at a time until a successful receipt of the entire message can be acknowledged to the base.

Base Pin/Tee Box Placement Packet

The base sends a pin/tee box placement round (one packet for each course hole) every 288 seconds. The cart sends an acknowledge if the entire round of packets is successfully received.

Base Network Control Packet

A network control packet is broadcast every 60 seconds by the base, and each cart is required to send an acknowledge only if the acknowledge is requested by the base.

Base Cart Control Packet

Cart control packets are addressed to specific carts only, and a cart is required to acknowledge successful receipt of such a packet only if the acknowledge is requested by the base.

Cart Transition Packet

The base sends a channel transition packet only in the first frame of a frame cycle immediately after a channel change, but no acknowledge is required for this packet.

Cart State Packet

If the base fails to receive a cart state packet during the allocated time slot, a re-transmission request is sent via the cart control packet (byte 2).

Cart Extended Status Packet

Broadcast of the extended status packet is minimized because its transmission does not provide a cart location update to the base station. To that end, rules established for cart transmissions are that the base is always the highest priority requester for the cart, re-transmit requests have the second priority, and golfer requests are the third priority. A cart extended status packet is sent to the base only if multiple acknowledge requests have been made by the base without the cart having been given an opportunity to respond, or if re-transmit requests cannot be sent within the second frame cycle following the request, or if the golfer request cannot be sent within the third frame cycle following the request.

Communications Link Performance

Preferably, the PROLINK system utilizes a single transceiver located at the golf course club house to reliably communicate with all golf carts on the course. This radius of operations rarely exceeds 2 kilometers. On many flatter courses this can be done with little communications link margin. However, on courses with substantial hills significant link margin can be sacrificed due to terrain losses. As described earlier herein, in these instances passive reflectors are utilized to improve link margin in areas that are non-line-of-sight from the club house. As a last resort, the base transceiver can be located at a site different from the clubhouse that provides improved line-of-sight conditions, but significant power and communications hardwiring are required.

Transceiver Characteristics & Requirements

Recognizing cost as a paramount consideration in the design of a suitable transceiver, a simple Coherent Phase Frequency Shift Keying (CPFSK) is preferred for the digital modulation in the PROLINK system. CPFSK is not, however, as bandwidth efficient as some other forms of modulation, resulting in a maximum possible bit rate of about 2400 bps. But considerable bandwidth efficiency is made up through the use of the highly efficient PROLINK variable length network.

The key characteristics and requirements for the PROLINK transceiver are set out in the following table:

| PROLINK System Characteristics/Requirements | |
| --- | --- |
| Transmit/Receive IF Bandwidth | ≦15 kHz |
| Receiver Sensitivity At Antenna Input | ≦ −113 dBm for a 12 dB SINAD |
| Receiver Noise Figure | <7 dB |
| Bit Rate | 2048 bps |
| Modulation | CPFSK |
| Bit Error Rate (BBR) Requirement | <1 × 10$^{-5}$ |
| Synthesized Frequency Range | 450–470 MHz |
| System Radius Of Operations | ≦2 km |

Background Noise

For any link margin calculation, the natural background noise must be examined as the limiting factor in receiver performance. The background noise is computed by $$N_{bkgnd} = kTB$$

where k=Boltzman's Constant=1.38×10$^{-23}$

T=Noise Temperature in degrees Kelvin

B=Receiver Bandwidth

A noise temperature of 310 K. (100 F.) is assumed. The computed background noise, then, is:

$$N_{bkgnd} = 10 \log (1.38 \times 10^{-23} CDOT15,000 \times 310) = -162 \text{ db}$$

Required Carrier to Noise Ratio

A minimum required carrier to noise ratio exists for a given modulation technique, to achieve bit error rate requirements. PROLINK uses CPFSK modulation running at 2048 bps, with the probability of a bit error as a function of the energy per bit being:

$$P_e = (½) erfc(\sqrt{\gamma_b}/2)$$

where $\gamma_b$=energy per bit erfc=complementary error function To provide a 10$^{-5}$ bit error rate, the signal to noise ratio per bit must be 12.6 dB. Therefore, at 2048 bps, the signal to noise ratio must be at least 45.7 dB.

Free Space Path Losses

The free space path loss is computed by $$L_s = (\lambda/4\pi R)^2$$

where

λ=wavelength (meters)

R=range (meters)

For the PROLINK system, since the maximum frequency is 470 MHz (λ=0.6383 meters) and the maximum range is 2000 meters, the maximum free space path loss is 91.5 dB.

Link Margin

The PROLINK system link margin is defined as:

| LINK GAINS | |
| --- | --- |
| Transmit Power | 2 Watts = 3 dB |
| Transmit Antenna Gain | 1.5 dB |
| Receive Antenna Gain | 1.5 dB |
| TOTAL GAINS | 6 dB |

-continued

| LINK LOSSES | |
|---|---|
| Transmit Insertion Loss | 1.5 dB |
| Free Space Path Loss | 91.5 dB |
| Terrain Losses | X dB |
| Multipath Losses | Y dB |
| Receive Insertion Loss | 1.5 dB |
| TOTAL LOSSES | 94.5 dB + X dB + Y dB |

The total gains less the total losses are $-88.5$ dB$-X$ dB$-Y$ dB. The terrain and multipath losses are left as variables and in essence are allocated whatever is left of the link margin. A significant margin must remain to support these less predictable losses.

Since the background noise floor is $-162$ dB and the receiver noise figure requirement is 7 dB, the receiver noise floor should be about $-155$ dB. At least 45.7 dB above this noise floor is required to achieve 2048 bps with less than 1 bit error in 100,000 bits transmitted. Thus, the received signal must have a power of at least $-109.3$ dB.

Therefore, the terrain and multipath losses can be as high as $$X+Y=20.8 \text{ dB}.$$

Referring back to FIG. 11, the time division multiplexing frame structure, and the frequency of transmitting frames is revisited. Although it has been noted that the frames are transmitted once per second, that simply means the structure generally repeats once per second. FIG. 11 shows the timing and the number of bits associated with each packet within a one second frame, indicating two frames of information or a total of two seconds of transmission, with a transmission rate of 2,048 bits per second. This data rate is selected because it is the fastest interrupt rate in this embodiment of the PROLINK system. Also, it is very convenient from a system architecture design perspective to use a power of 2 bit rate. Powers of 2 are useful in fixed point processors because bits can be shifted by one position to the right to divide by two or to the left to multiply by 2. A shift of two positions is the equivalent of multiplying by four, etc. In a real time operating system, this technique avoids many extensive computations of floating point systems by use of computationally efficient bit shifts.

The first packet transmitted is the differential GPS correction packet, consisting of 512 bits. The next packet is the CMS computer message packet, consisting of 348 bits of information, including pin placements, tee box locations, and messaging information for each individual cart. In the presently preferred embodiment, the CMS computer message packet is never longer than 348 bits of information so the total packet transmitted from the CMS computer to the carts at the beginning of each frame is 860 bits long.

The next packet consists of 56 bits which is the cart network entry packet. This is the aforementioned 56 bit time slice that allows any cart to transmit information using the random number seed, to announce its entry into the network. Once entry is announced, the CMS computer schedules transmission time by providing the new cart with time slice control information.

The fourth packet is the cart one state which consists of another 56 bits of information, including a header indicating the number of the cart, and a message portion indicating the status of the cart. Status information might include, for example, "Were refreshments ordered?", "Is the cart disabled?", or "Did the cart receive the last broadcast from the base?" Next, this fourth packet includes the location of the cart on the course, and finally, error detection bits embedded in the packet to allow the base to detect an error in the cart transmission. Following the cart one packet transmission, there is a 5 bit (2.44 millisecond) gap and then cart 2 transmits its information, followed by another 2.44 millisecond gap and cart 3 packet transmission. This continues until cart 18 completes its transmission within the first frame.

At the end of the first frame, the second frame begins as illustrated in FIG. 10. The second frame begins exactly as the first frame did, with the differential GPS correction consisting of 512 bits, the CMC message packet consisting of 348 bits, and then a time slice for cart network entry, followed by cart 19 transmission, etc. This entire process of interleaving new carts into each frame continues until there are no more carts in the network. Once that happens, the transmission wraps back around and starts with cart one again. As an example of the efficiency of this network, if there were 72 carts on the course, 18 carts per second would report their position, so that in four seconds all of the carts on the course would have reported their position to the CMC. Their positions are updated on the digital map of the course while the course manager is monitoring.

Thus, once every four seconds, the manager will observe each cart's location change. This is extremely efficient considering that 72 carts on the course update every four seconds, and especially so when the information is being transmitted at 2,048 bits per second. That is relatively slow because FSK at 2,048 bps is limited in bandwidth, so transmission cannot be much faster than that without exceeding the FCC bandwidth allocated for the frequency range used by the system.

The variable length packet network allows changes to be made in the network. For example, if the network currently has 72 carts which are accommodated by four frames, but suddenly a 73rd cart needs to come into the network, then clearly a change is required to allow that 73rd cart to come into the network. To that end, when the 73rd cart is ready to come into the network, the CMS computer broadcasts a network reconfiguration message, which is enclosed in the CMC packet that occurs on every frame. This message is broadcast multiple times for redundancy, to ensure that all of the carts on the course have received it.

Contained in the network reconfiguration message is the number of existing carts in the network and the number of new carts. If the number goes from 72 to 73, an entire 18 cart frame must be added, because not less than one frame may be added to the network. The network reconfiguration message contains the information that allows the carts to calculate independently their own new time slots, but the old carts remain in place in their respective frames and the new carts are added into the new frame(s). Once this reconfiguration command is transmitted to the carts, they immediately begin operating in their new time slots.

All of the timing is adjusted appropriately to reflect the extra carts inserted into the network. Now, instead of an update for each cart every four seconds on the CMC, an update is transmitted for each cart every five seconds in the example where 18 carts are added. The network cart continue to be expanded indefinitely, with the only result that the update rate for each individual cart slows down in a linear fashion with the number of frames that are added. Each frame adds one extra second to the circular time interval to return to frame one and start the frame sequence again. The CMC knows that all of the carts actually made the transition to the new timing, because it commands the carts to make that change. If a particular cart encounters an error in the transmission, or does not receive the CMS computer command, it continues transmitting in its old time slot. In doing so, of course, it is now corrupting or interfering with the transmission of another cart that may have been authorized to use that time slot.

The CMC monitors all transmissions after the network reconfiguration command has been sent, and verifies that cart 1 is transmitting in slot 1, etc. around the entire network. If one of the carts fails to make the commanded change, the CMS computer will not hear that cart in the proper time slot and will immediately broadcast as part of the CMC message packet a command specifically to that cart to make the change. If one slot is experiencing corrupted or interfering transmissions the CMC will not understand the transmission. In that case, the CMC retransmits to the cart assigned to that slot to notify it to continue in that slot. Hence, a feedback mechanism effectively exists after the configuration is commanded, by which the CMC can observe within one circular time interval of the network whether or not all carts have successfully made the network reconfiguration transition.

The network is halted at the end of the day when all golfing is completed, simply by the CMC issuing a halt command. All carts that may be on at that time will thereafter cease transmitting in their respective time slots and await further commands from the CMC.

According to another aspect of the invention, the differential GPS packet is structured in an innovative way. An industry standard known as the "RTCM-104 technical standard for transmission of differential corrections to GPS receivers" contains a message structure used by most of the GPS receivers and base stations to transmit and receive information. The RTCM-104 standard structure was originally developed to meet a U.S. Coast Guard desire to transmit information at 50 bps in the same format as the GPS satellite signals themselves. The Coast Guard carried over a 6 bit parity implementation for error detection used by the GPS satellites, in the form of a cyclic code. In that code, the last bit of each transmitted word determines the polarity of the following transmitted word. Hence, all of the words in the message are chained together in a way that the last bit of each word influences the next word. In a typical RTCM-104 differential correction, as many as 1500 bits of information may be transmitted for the satellite corrections to be applied by the GPS receiver. Unfortunately, in transmitting such a long serial chained bit stream, any channel noise that corrupts one of those bits, creates a strongly likelihood that the entire 1500 bits will be unusable.

In the PROLINK system, the RTCM-104 standard is used in the base station on a NAVSTAR XR5M GPS receiver, but the standard message format is repackaged in a much more robust format. To that end, each individual satellite range and range rate is assembled in a message packet that has error detection on the packet. All of these satellite packets are then stacked up and transmitted together to the carts. The carts then monitor each packet, i.e., satellite measurement, for errors. If no error is present, that packet is set aside and all remaining packets are checked. Packets with errors are discarded. Error-free packets, i.e., for which the satellite range or range rates were broadcast correctly, are reassembled into the RTCM-104 standard message format and transmitted to the GPS receiver. Consequently, if, for example, eight satellites are in view, only four are required for an effective solution by the GPS receiver.

This solution resides in the ability to individually decide which pieces, i.e., which satellites of the 1000 or 1500 bit RTCM stream, are corrupted and to discard those pieces (the corrupted satellites) while retaining and using the ones that are good. Perhaps six out of eight are good, or only four, or all are good, but in any event the determination of "good pieces" ensures much more effective operation. The update rate will be once per second for differential corrections, a desirable outcome considering having been confronted with the possibility of having to discard 1500 bit long streams merely because one bit was corrupted.

Radio links by nature have channel noise that corrupts transmissions at times, resulting in invariable use of some form of error detection and error correction. In the packet communications network described above, error detection is provided by means of a simple check sum or cyclic redundancy code, for example. Error correction is achieved through a packet acknowledge system. In the differential GPS packet structure, since the GPS receiver only needs four satellites and the base station collects information from all satellites in view, the invention takes advantage of this fact, and despite any channel error, good packets identifying corrections cart still be used from the RTCM-104 correction because of the special packet structure of the invention. Accordingly, the PROLINK system differential correction is much more robust than the industry standard RTCM-104.

Turning to another aspect, it is extremely important when seeking to transfer information between two points, whether on a golf course or elsewhere, to have sufficient power at the source of the transmitted waveform to reach the destination point. On a golf course, the maximum range of operation is typically a two to three kilometer radius. Given that range of communication, transmitter and receiver designs cart be implemented with adequate transmitter power and receiver sensitivity to reliably transmit the information from source to destination. One of the more perplexing problems is where large hills are present on the course so that the transmitter antenna is no longer within the line of sight of the cart receiving antenna. The PROLINK system utilizes reflectors, diffractors or repeaters in those circumstances, with priority and preference given to RF reflectors and diffractors, and repeaters used as a last resort.

The CPU accepts user commands, controls displays, controls the transfer of data between the individual carts and the base station, monitors the performance of the RF interface, and performs the calculations necessary to provide accurate distance information to the user. It includes a digital electronic processor for performing the data processing functions including running of programs and instructions; a crystal oscillator for precise clock and timing functions; random access memory (RAM) and erasable programmable read only memory (EPROM); a maintenance communications interface; a keyboard interface; a video interface with video driver and video memory; a GPS module interface; an RF transmitter/receiver interface; and A/D and digital to analog D/A converters.

CPU control is exercised by the digital electronic processor—a microprocessor or microcontroller of the type previously described herein. The processor reads binary instructions that direct the operation of the system from the EPROM constituting program memory. The memory may also contain data describing the golf course including layout and hole maps, distance data, equipment configuration data, RF communications data, GPS satellite communications data, diagnostic instructions, advertising matter, and other information necessary for reliable operation and which requires nonvolatile memory storage. The RAM memory is used by the processor to perform distance calculations, and to store communications data, golfer scores or handicaps, and any other transient data necessary to operate the system.

The CPU provides an external communications interface for maintenance functions to be performed, golf course data or control program instructions to be updated, and any portion of nonvolatile memory to be either examined or updated. User commands are accepted by the CPU from a keypad having individual keys and a directional controller, and configured in row and column format that allows each depressed key to be individually identified. The system software enables the function labels for the individual keys to be viewed by the user along the bottom edge of the display, and each of the keys to be redefined by appropriate software programming whenever a new display mode is selected. The directional controller preferably has mouse, trackball, or other device with analogous characteristics that will allow the user to move the cursor at will on the display.

Individual hole maps for the course, score data, advertising matter, keypad function labels and other information are displayed on the base station color video monitor from the CPU. The processor expands packed binary data retrieved from the EPROM and updates readable/writable memory dedicated to driving the display. The display memory should be of sufficient capacity to hold two screen images simultaneously so that either image may be selectively presented on the display. This significantly decreases throughput requirement for the processor since one image can be created while the other is being displayed. Sufficient definition is provided by the display to support IBM video graphics array format images.

A bi-directional serial communications interface is provided between the CPU and a GPS module. The serial interface enables the processor to write configuration data to the GPS module and read position data and various GPS satellite configuration data. The GPS module is preferably a Rockwell International Corp. model previously described herein. The module includes an antenna for receiving data transmitted by the GPS satellites. The GPS module provides present position data for the mobile unit by processing RF data transmitted by the satellites, and also provides a discrete digital electronic time pulse signal as the system's time base or reference.

The CPU interface to an RF receiver/transmitter (R/T) at the roving unit enables each golf cart to communicate information to the base station RF R/T located in the pro shop or other convenient location on the course. The antenna location either provides good direct line-of-sight communication to all carts on the course, or cart be adapted to do so by means of repeaters, reflectors or the like as previously described herein. The mobile (roving unit) RF receiver receives data from the base transmitter and stores it in memory for use by the base in calculating its position and for other tasks. The mobile RF transmitter transmits serial data to the base station receiver identifying the cart and its location every few seconds. By virtue of these transmissions, the specific location of each cart is determined and identified on the digital mapping display on the base station monitor.

A/D and D/A converters are used to convert analog signals received on the RF carrier, whether at the base station or a roving unit, to digital signals for local processing by the CPU, and to convert other processed digital signals to analog signals for responding RF transmissions. Since the roving units operate from a battery (the golf cart battery or suitable long-lived battery for a hand-held unit), conventional power conservation steps are employed to assure that the units will remain fully operational throughout the average time required to play a round of golf on the particular course, with adequate safety margin.

A precise, digital, color graphic map of the entire golf course on the CMC monitor enables the course administrator to track the location of each roving unit (and thus, the golfer(s) to which that unit is assigned) on the course, including the relationship to features of the hole being played. Each roving unit automatically displays a map of the particular hole being played, from the time the tee box of the particular hole is approached to the time the cart is driven (or the hand-held unit is taken) from the vicinity of the green and toward the location of the tee box for the next hole. The golfer commanding the unit is able to zoom in on a portion of the hole with a specific feature of interest such as a water hazard or a sand trap. This capability is provided by the digital mapping of the course stored in the PROLINK system, and by the real time data supplied by each roving unit to the CMC as to their respective locations on the course.

This digital map is created by use of conventional differentially-corrected GPS techniques. The course features are stored and displayed using a vector-based map storage scheme that provides several advantages over standard bit-mapped graphics representations, including advantages of memory storage, scaling, and rotation. The digital map data base for each hole contains all of the important features of the hole, such as the green, fairway, water hazards, sand traps, grass bunkers, rough areas, cart paths, the pin, and so forth. Each feature is mapped by a survey of the course in which DGPS position measurements around the perimeter of features that cover an area, such as greens or fairways, is collected. An analogous process of data collection is performed along the length of linear features such as cart paths, and at point objects such as the pin. As a result of the survey, a vector list is compiled to describe each feature, including the outline of an area feature, for example.

The vector list is processed to the extent required to remove spurious data points, smooth out jagged outlines, and close the outline of area-type features. Data points which add little or no information to the map may be deleted to reduce the memory storage requirements of the map data base. Course features associated with a particular hole are combined to form a data base for that hole, for display in distinctive colors. A sand trap for example may be sand color, a water hazard depicted as blue, a green as green, and so forth.

Since each feature of the golf course is surveyed individually, the survey can be easily updated when features are changed by the course. For example, tee box and pin locations for each hole cart be programmed into the data base as they are changed, which typically would be daily. Features may be added or removed from the map data base to improve detail or reduce clutter as required.

A vector based map storage and display technique as described above has some of the following significant advantages. First, memory storage requirements are reduced relative to other techniques since only the outlines of map features are stored, thereby allowing detailed features to be represented by very few data points. The area features are drawn and filled from these few stored data points at the time the particular features are displayed. In contrast, bit-mapped images require that all of the filled area also be stored. Therefore, significant memory requirements are avoided in the vector based scheme, with the trade-off being a modest amount of computer processing. Yet, the vector based scheme provides comparable high resolution. Second, scaling is also enhanced because in the vector based system, displayed features may be reduced or enlarged on the screen with no loss of information (subject, however, to the resolution of the display). Additionally, a single feature may be displayed at different magnifications. In contrast, bit-mapping requires storage of a separate image for each magnification, if high image quality is to be maintained at higher magnifications. Among other things, this necessitates the availability of considerably more memory than is required for the vector based system. Third, rotation enjoys similar advantages to scaling in a vector based system compared to a bit mapped system. The former easily displays features such as the hole map at different orientations, as desired, depending on the overall shape of the hole. In contrast, bit-mapped images are not readily rotated because huge computational power is required to rotate the huge amount of data comprising the bit-mapped stored image.

This conversion is performed in three steps. First, the latitude, longitude and altitude indicia are converted to delta north and delta east from a survey point located at the course management system GPS antenna. After computing delta north and delta east between the course position and that surveyed antenna, this information is translated (shifted) in direction to the top left corner of the CMC screen constituting point 00 on the Cartesian coordinate frame.

After translation, the cart coordinates are in a shifted delta north-delta east, and need to be rotated into the hole rotation, i.e., to conform to the hole orientation. For example, on the PROLINK system display at both the base station and the cart, the golf holes are generally oriented in a north-south direction. This gives the golfer an intuitive feel for his location relative to the pin because the golfer is always heading to the hole toward the flag, so the depiction on the screen is almost invariably with the pin at the top and the tee boxes at the bottom.

But since all golf holes are not oriented in a north-south direction, this pin at the top, tee boxes at the bottom orientation is achieved for some holes by rotating the hole. And for correlation of a cart to the hole it is necessary to rotate the cart coordinates to the same angle of rotation as the hole. After the rotation is complete, the golf cart coordinates are then scaled precisely to the same scale as that of the hole on the computer screen. For example, a golf hole 500 yards in length is represented on the computer screen by a fixed number of pixels, at a typical scale of one pixel equal to one yard.

The accuracy of the CMC cart correlation is better than two yards. If the scale is one yard equals one pixel on the computer screen, the cart is so accurately correlated on the hole depicted on the screen to its actual location on the hole on the course, that the error is a margin of only three pixels. Such an error is almost imperceptible on the screen. This important innovation of the system of the invention is less a function of the correlation algorithms than of the accuracy of the digital map created for the course depiction. As noted above, the present invention utilizes a unique surveying process to create this digital map.

The process consists of collecting differential GPS corrected coordinates around the outline of each object (fairway, green, tee box, etc.) and connecting the points to produce a vector list describing the outline of each object. The survey data is then processed using computer algorithms which smooth the segments, perform data compression, and correct the vector list for crossing vectors and overlapping points. First, the GPS coordinates of a reference point for the course survey data is determined by placing a referenced GPS receiver at a point near the golf course. For example, this point may be near the golf club-house or the anticipated location of the course management station. The geodetic coordinates (latitude, longitude, altitude) of the referenced receiver antenna do not have to be determined precisely because all survey data is collected relative to this reference point and positioning of the golf carts during subsequent operation of the system is also performed relative to this reference point. By using such a reference point, the need for a precise survey of the reference receiver antenna location is eliminated.

The outline of each object on the golf course is determined by collecting GPS position data around the perimeter of each object. Objects that are simply linear such as golf cart paths or narrow streams are surveyed by collecting data along them from one end to the other. The output of the GPS receiver as it is moved along the object perimeter are geodetic coordinates at regular time intervals, typically 1 per second. It is understood that universal transverse mercator (UTM) coordinates could also be used instead of geodetic coordinates. These coordinates are stored for later post-processing as will be discussed shortly. Moreover, each object is identified by a unique object number and an object type to determine how it is post-processed and drawn when displayed.

The survey data are corrected for selective availability and atmospheric errors using data collected by the reference GPS receiver. It is understood that any number of differential GPS methods can be used to remove these common errors from the survey data relative to the reference point. Such methods include but are not limited to 1) computing position solutions at the reference station using the same groups of satellites used by the GPS receiver for surveying where position offsets from the reference point due to the above errors can be used to correct the survey data in real time via a data link or by post processing, or 2) computing range and range-rate corrections for each satellite signal received at the reference point and transmitting these corrections to the GPS receiver used for surveying in real time.

Each of the absolute geodetic coordinates are converted into an x-y grid coordinate. The coordinates for each survey data point are computed as shown in equations 1 and 2.

$$x = (\phi_{survey} - \phi_{ref})(\rho + h_{ref}) \qquad \text{EQN. 1}$$

$$y = (\Lambda_{survey} - \Lambda_{ref})(\nu + h_{ref}) \qquad \text{EQN. 2}$$

where $\phi$ is latitude, $\Lambda$ is longitude, and h is altitude.

The meridional and prime vertical radii of curvature, $\rho$ and $\nu$, respectively are computed as shown below:

$$\nu = a(1 - \sin \phi^2_{ref})^{-\frac{1}{2}}$$

$$\rho = a(1 - e^2)(1 - \sin \phi^2_{ref})^{-\frac{3}{2}}$$

where a and e are the earth semimajor axis and eccentricity, respectively.

Survey Data Post-Processing Procedure

Referring to FIG. 12, a post-processing block diagram is shown. The input survey data is first sent through a low pass filter algorithm in order to reduce noise in the data. This filtering smooths the object outline and improves the performance of the subsequent processing steps.

A remove bad segments block performs the removal of spurious data points that may appear in the collected data. This block makes use of the knowledge that the process of slowly tracing the outline of an object will produce true data points no more than a few meters apart such that data that is farther than a threshold distance from a previous data point can be eliminated from the vector list.

The process of tracing the outline of a closed object typically produces a region where the start and end points overlap. A remove overlap block can be used to reduce the number of survey points in the database by removing the points in an overlapping region since they add no information. The overlap removal is accomplished by removing points from the end of the vector list until the distance from the new end point to the start point stops decreasing. This process is repeated with the start points to insure that all possible points are removed. Typical results of the overlap removal algorithm are shown in FIGS. 13A and 13B, the former showing the outline of the object with a region of overlapping start and end points, and the latter showing the same outline after the overlap is removed by the foregoing process.

Additionally, noise in the survey data cart produce object perimeters which cart contain segments which cross each other. Although smoothing and compression will usually eliminate these crossing line segments, those which pass are then removed via removed crossing segments block. An example of a crossing line condition is shown in FIG. 14A. Remove crossing segments block will detect such crossing segments and all of the data points between the crossing segments are replaced by the vertex of the crossing segments. The results of this removed crossing segments block process are shown in FIG. 14B.

A compressed data block makes use of the fact that the outline of an object is drawn as a series of straight line segments (vectors), to remove data points (segment vertices) where the object outline is relatively straight, but retain points where the outline curvature is relatively significant. To that end, data points are removed from the outline of an object until the error in the outline becomes greater than a predetermined maximum allowed distance for that object. For example, the accuracy of the fairway outline is not as critical as that of the green because the system always displays fairways at low magnification levels such that small errors in the outline are invisible to the user. The green, on the other hand, can be shown magnified and thus the detailed curvature of the green must be accounted for.

Figure 15A:
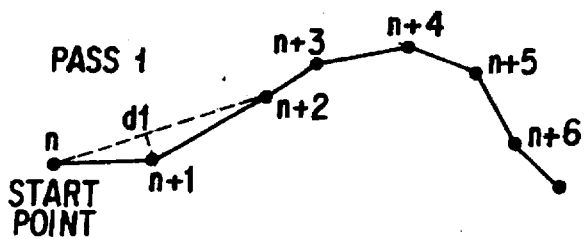
FIGS. 15A–F are pictorial diagrams illustrating the results of a portion of the post processing algorithm for compressing data.
Figure 15B:
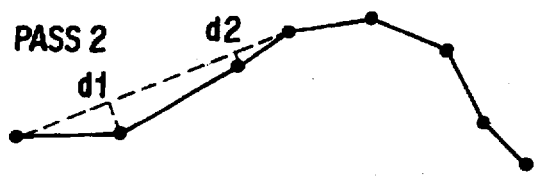
Figure 15C:
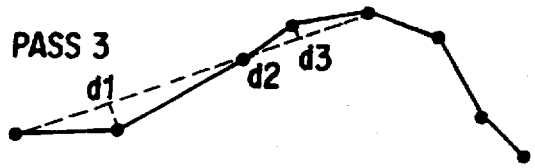
Figure 15D:
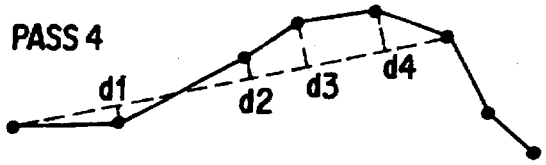
Figure 15E:
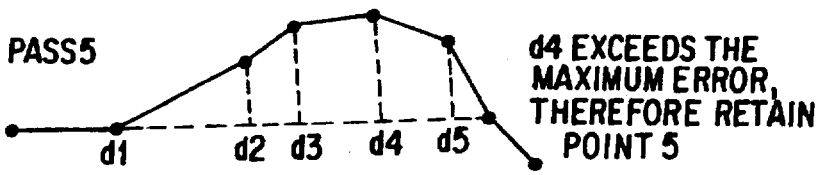

Referring to FIGS. 15A–F, an example of the data compression algorithm is illustrated. From a start point in the vector list, a line vector is constructed to each subsequent point in succession until the distance between any of the intervening points and the vector becomes greater than the predetermined limit for that object. If this condition is detected for a vector from the start point, N, to N+5, then points N+1, N+2, N+3 are discarded and point N+4 is retained. Referring to FIG. 15A–G, passes 1–5 show the succession of vectors constructed from the start point to each successive point in the perimeter (points N+2 through N+6). In FIG. 15E (pass 5), the distance D4 from the line to point N+4 is greater than the maximum predetermined distance. As a result, points N+1 through N+4 are discarded and point N+5 is retained.

Figure 15F:
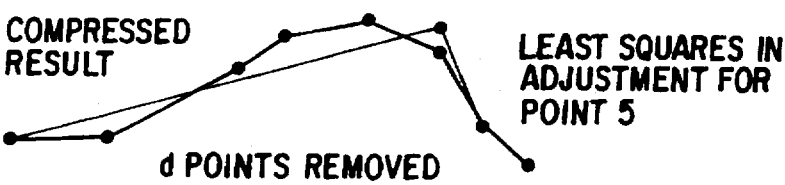

In order to improve the accuracy of the compressed data a least squares fit may be performed to the point to be discarded and the first point to be retained. The best fit line to these data points is used to adjust the location of the N point. The result of the least squares fit in this example is shown in FIG. 15F where the location of point N+5 is adjusted upward so that the vector connecting points N and N+5 minimizes the error between it and the discarded points.

This process is again repeated using the N point from the last compression step as the new starting point until the end of the perimeter vector list is reached.

In this manner, the outline of a golf course including the fairways, the greens, the tee boxes and various hazards such as sand traps, water and trees cart be stored into memory by using vectors as described above in a very efficient and accurate manner.

Figure 16:
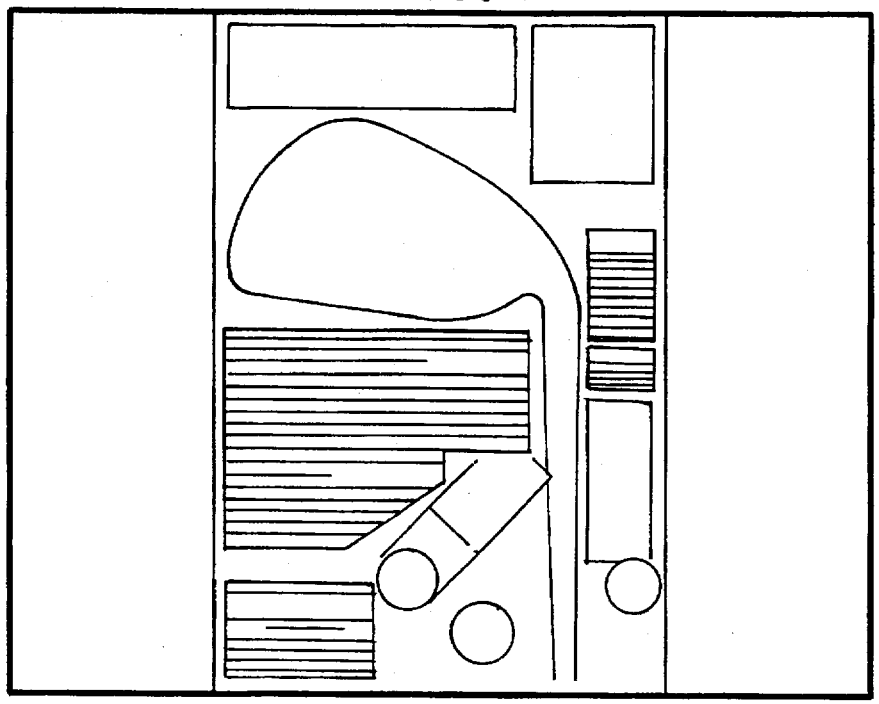
FIG. 16 is a pictorial diagram illustrating an advertisement for displaying on a monitor of the cart.

In the preferred embodiment of the PROLINK system, the cart CRT monitor provides a full color graphic display in up to 256 colors in 640×480 pixels. As the cart approaches a hole to commence play—at least for the first hole—the cart monitor may, for example, display the course logo and a promotional message for the course or an advertisement for a particular manufacturer's golf clubs by accessing data stored in memory as shown in FIG. 16. Alternatively, the base station may transmit promotional messages or advertising messages globally to all carts on the course, which would be displayed in pop-up windows subject to priority given to pop-ups featuring golf tips for the hole.

Figure 17:
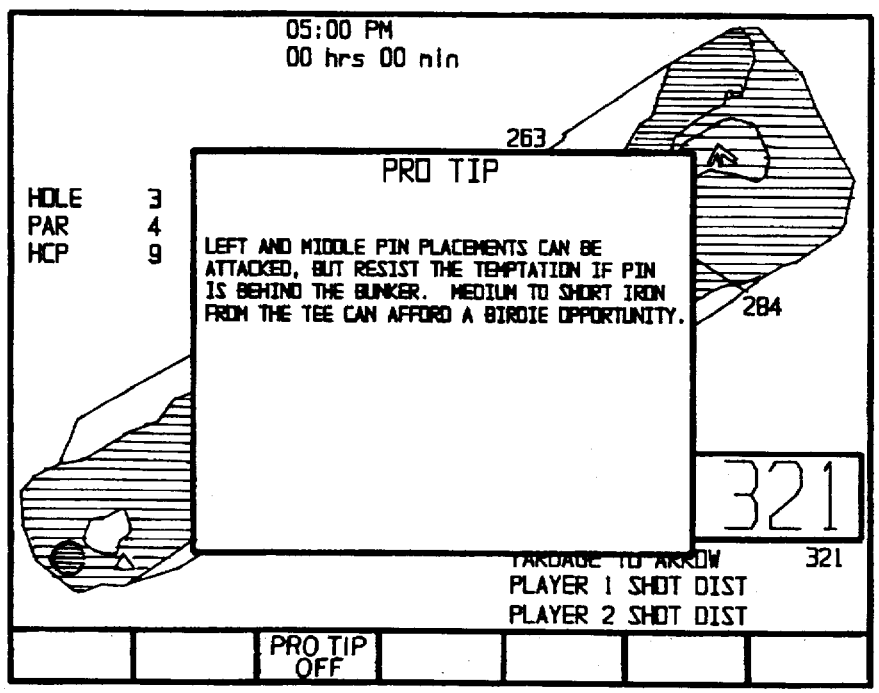
FIG. 17 is a pictorial diagram illustrating a pop-up window for displaying on a monitor of the cart.

When the cart is within a predetermined distance of the tee box for play of a hole, the golfer may press a "Play Tips" button on the console. The system responds with a pop-up window on the display monitor that furnishes a set of recommendations or suggestions for play of that hole provided by the course professional (the course "pro"). Exemplary displays might be: "Watch sand traps on right side of fairway during drive," or "This green is shared with hole 16—approach fuller part of green." This "Play Tips" function is illustrated in FIG. 17.

After reviewing the play tips for the hole, the golfer would want to view the reading of yardage to the pin on the cart monitor, for selection of the appropriate club to drive from the tee. The calculation of the yardage to the pin is readily calculated in a well-known manner.

In addition, the golfer may view the range from the roving unit location to points selected by the course pro as key points of interest for play of the hole. These are shown on the digital map of the hole when it is displayed on the cart monitor screen. FIG. 18 illustrates examples of range points on hole 3 of the course, such as to a water hazard and sand trap, as well as distance to the pin. The golfer's position is represented on the display by a white triangle, shown at the bottom of the Figure where, in this example, the golfer is positioned to drive his first ball from the blue tee box. The specific ranges and graphics displayed on the screen give the player important information for avoiding hazards which are not be visible with the naked eye from the tee box.

The golfer cart also use the yardage cursor arrow in the PROLINK system to determine the best lay up shot. In the example of FIG. 18, distances from the white triangle to various locations of the golf course as well as to the yardage arrow are shown. Thus, the golfer has considerable range information available to enable strategic planning of each shot.

Next, the golfer "zeroes" the carry distance, i.e., to cancel out any previously accumulated range yardage for the last (and any earlier) shot. After the carry distance is zeroed, the golfer hits his shot from the tee. As the player drives his cart to the new location of the ball (the lie), the carry distance is displayed as a continuously increasing incremental count from zero. When the cart arrives at the ball location from the tee shot, it is an accurate measure, typically within three yards or less, of the distance covered by the last drive (i.e., the carry distance).

In preparation for the next shot, the range points and yardage are viewed again. If the hole is short, the golfer may begin an approach to the green at this point. For a longer hole that might share the same green and thus occupy the same display as the hole currently being played, the player would now set up for another drive.

At any time during play, the course manager has the capability to send a message to any or all golfers on the course from the clubhouse. Such messages when transmitted appear in one or more pop-up windows on the monitor screen of the cart assigned to the player(s) for whom they are intended. In that respect, they are similar to the "play tip" window of FIG. 17, except that the message in the window in this instance is transmitted from the base station. For example, a typical message to all golfers on the course (thus shown on all active cart screens) might be: "Clear the course, there is lightning in the area," or a private message to a certain player might be: "Mr. Jones, call your office."

The PROLINK system of the cart may also be used by the player to request or otherwise advise the clubhouse of the need for a service attendant, such as for the refreshment cart or for repair of a broken water pipe or for cart repair or replacement, or merely to furnish information to the course manager, such as the improper driving of a cart onto the green of a hole.

When the golfer has a green approach shot on a hole, a green zoom function may be activated to provide a blowup of the green itself in a considerably larger size in a window of the same dimensions as those of either of the message or play tips windows. The displayed yardage may be to key points such as to the front of the green, the back of the green, and the pin. The display of the green includes contour lines that indicate the slope of the green, as additional information to the golfer to play his approach shot or his putt. This information allows the golfer to determine whether the putt should be made, for example, to undershoot the pin because of the direction of slope of the green, and to avoid an unfavorable lie on an overshoot attributable to the contour of the green in that area.

After completing the putting on the green, the cart is driven to the next hole. During that transition an advertisement is automatically displayed between holes, without need for intervention by any person, triggered by the PROLINK system's capability to identify the precise location of the cart on the course. The advertisement might be displayed on the screen for a period of, say, 30 seconds, extolling the virtues of a particular automobile, golf clubs, sister golf course under the same course management, or other subject matter. This display advertising capability to a captive audience as the cart is moving between holes or at the beginning or end of the round, provides the course with an additional revenue opportunity.

In its presently preferred embodiment, the PROLINK system provides a very large memory map, e.g., 16 megabytes (MB), with 2 MB of flash memory, by virtue of the use of a Motorola 68332 processor. The primary function of the flash memory is to hold the full color (256 colors maximum) ads that are displayed to the golfer during the transition between holes.

If, for any reason, the PROLINK system becomes confused as to the identity of the hole to be played, the golfer is automatically prompted to provide that information. But ordinarily, the system immediately recognizes the cart position on the course and responds in appropriate manner for the display, without need for the golfer to request it. This delivery of information to the golfer without intruding on his play is a key aspect of the PROLINK system.

If the golfer desires to use more advanced features of the system, such as scoring, green zoom, pro tips, yardage arrow to set up approach shots, or others, it is only necessary to press one button on the PROLINK console in the cart. The result is an extremely user-friendly system that avoids any likelihood of anxiety on the part of the user/player to obtain the system's benefits.

Figure 9:
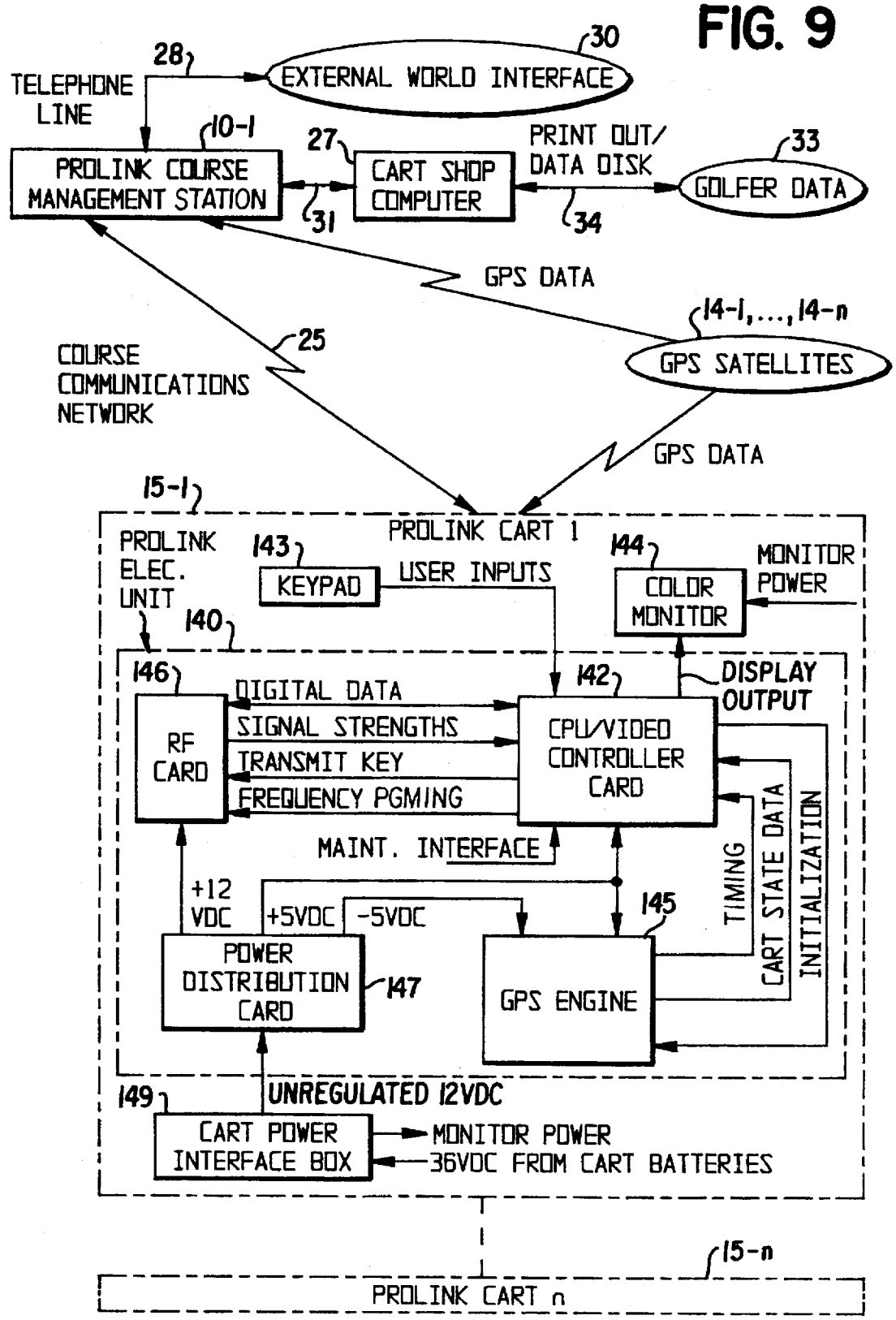
FIG. 9 is a more detailed block diagram of the cart-based system (mobile unit) portion of the PROLINK system.

Referring now to FIG. 9, in which like reference numbers to those used in FIG. 2, for example, refer to like portions of the PROLINK system, additional details of a preferred embodiment of a roving unit (cart) are illustrated in block diagrammatic form. The GPS data is received by the cart 15-1 from the satellites 14-1, . . . , 14-n, together with data from the base station (course management station) 10-1 on the course communications network. The cart includes a cart-based PROLINK Computer Unit (PCU) 140 which is substantially similar to primary PCU 44 (of FIG. 3) with the exception that PCU 140 additionally includes a GPS engine. PCU 140 includes a CPU/video controller card 142, that interacts with a keypad 143, color monitor 144, GPS engine 145, RF card 146, and power distribution card 147. The latter is supplied by a cart power interface box 149, which is itself energized by the cart batteries. The color monitor assembly 144 is mounted inside the golf cart below the roof for ease of viewing by the cart occupants without interfering with the driver's view of the cart path. The key pad assembly 143 mounted below the base of the monitor allows ready access by the cart operator. The PCU 140 is embedded in the cart roof, and a cart power interface box 149 is mounted in the cart out of the way of the occupants.

The cart's color monitor is preferably a 7.5-inch or 9-inch (diagonal measure) Sony Trinitron (trademark of Sony Corp.) CRT, having drive electronics that adhere to the video graphics array (VGA) standard for personal computers (PCs). The monitor resolution is 640×480 pixels, and a video controller card (chip) provides up to 256 colors on the screen of the monitor at any millimeters. The one-dimensional screen surface allows easy hand application of anti-glare coatings.

The keypad assembly is mounted below the base of the monitor beneath the CRT, with soft keys, i.e., keys that are software controllable, illustrated in FIGS. 1C, 17 and 18. The key mechanism to be pressed by the golfer using the unit is a small keypad strip that runs just underneath the tube in the monitor. The physical mechanical keys are beneath the software label illuminated on the screen. For example, in FIG. 18, the legend "player 1 zero carry" is directly above a button on the keypad, as are the "help" indicator, "pro tips", and "player 2 zero carry". The yardage arrow for the Prolink unit may be a joy stick assembly, a trackball assembly, or four to eight arrows that allow the golfer to move the arrow around with ease.

Soft keys are used to assure that the PROLINK system has flexibility for growth, and for incorporating immediate golfer feedback. Soft keys cart be reprogrammed as necessary if a particular golfer has a preferable location for a particular key, and that reprogramming is done strictly through software. Similarly, the label for each key is created in software along the bottom strip of the CRT, so that these keys may be reprogrammed to have different meanings at any time.

A Cart Power Interface Box is mounted under the seat of the cart or could alternately be mounted underside of the roof of the cart, alongside the PCU. As shown in FIG. 9, a pair of wires run from the DC power supply (typically several batteries supplying +36 volts) and the ground reference of the golf cart into the roof assembly and to the cart power interface box. The power interface box converts this unregulated 36v supply and converts it to unregulated 12v DC which is used to power the PCU, and to 24v DC used to power the monitor. The PROLINK electronics uses unregulated 12v DC as the primary power source because similar system concepts are applicable not only to the golf market, but to many other markets as well. Unregulated 12v power is readily obtained from many types of motor vehicles, tractors, aviation equipment, airplanes, and so forth.

A block diagram of the CPU video card is shown in FIG. 19. The card has two primary sections, the first section being the CPU, and the second being the video controller.

In a preferred embodiment, the 68332 microcontroller device which has a large linear address space that allows it to address up to 16 megabytes (MB) of memory was selected as the CPU. A single compressed advertisement may occupy 64 kilobytes (KB, or K) of memory, which would severely crimp address space for programs, scratch pad, and video memory needs with smaller capacity address capability, but not with the 16 meg address capacity of the 68332 microcontroller. Additionally, this device was selected because of its 32 bit core, which provides high speed processing efficiencies. All data and address registers within the device are 32 bits wide to enable 32 bit multiply and divide operations, dynamic range addition and subtraction, and very efficient movement of data in 32 bit memory blocks.

The processor supports a large number of peripheral devices on chip through a cubed serial peripheral interface which constitutes a high speed serial interface used to "talk" to peripheral devices, such as the receiver transmitter card and the data link of the system. As aforementioned, the 68332 microcontroller also has an on-chip Time Processing Unit, or TPU, that provides a 16 channel input/output timing function capability independent of the processor core. Thus, the TPU can sample and compute timing information on discrete inputs without interfering with other processing being performed by the 68020 core, akin to parallel processing. The TPU supports real time interrupt requirements of the system, and bit synchronization on the incoming RF digital data string.

The microcontroller of the mobile unit is a 5 volt version (i.e., 5 volt TTL logic level) that runs at a maximum clock speed of 16.77 megahertz (MHz), and consumes approximately 600 milliwatts (row) of power. A 3 volt version of the 68332, currently under development, would enable reduction of power consumption by a factor of 2 to 3. While that is not especially important for a cart-based system with the large battery capacity of the cart, it is highly desirable to enable a hand-held, lightweight, battery operated version of the Prolink system as the roving mobile unit where a cart is not used by the golfer.

The 5 volt version of the 68332 used in the presently preferred embodiment of roving units in the PROLINK system has power saving modes. For example, power dissipation is reduced by running the clock at lower speeds. With its internal static RAM, the clock cart be stopped without losing the internal state of the device. This enables reducing clock speed from 16.77 MHz to DC without loss of any information. Clock speed reduction of smaller amounts is desirable in various circumstances. For example, redrawing a graphic screen containing a digital map of a hole cart be done at a lower clock speed than the 16.7 MHz used to draw the original screen, such as 12 MHz, with attendant power savings. The CPU card has 64K of static RAM organized in two 32K×8 chips, one being for the lower byte (8 bits) of a word and the other for the upper byte of the word.

Logic support for processing operations is provided by programmable array logic (PALs), with the ability to create numerous logic gates on a single chip. The CPU card contains flash EPROM chips of sufficient capacity to support the desired advertising display requirements of the system, with slots for expansion of memory as necessary to accommodate even greater graphic requirements.

The 68332 microcontroller also provides the capability to implement I²C access (I²C is a trademark of Philips Corp. for its inter integrated circuit bus—a serial communications interface between integrated circuits), primarily in software but also to an extent in the processor hardware. Many integrated circuits (ICs) can carry on communications among each other with high speed parallel interfaces that may require from ten to twenty parallel traces in a circuit card. In contrast, the I²C bus serial interface requires running only two etches or two traces to the chip, albeit that a serial bus transfers information at a much slower rate than a parallel bus. In the PROLINK system, the I²C bus is implemented in software, using an interrupt service routine running at 512 KHz, although it could be done at up to 100 KHz. The hardware requirement is only two output discrete devices, namely, the serial data line and the serial clock line, from the 68332 device.

Frequency synthesizers used on the RF card of the preferred embodiment are I²C bus compatible. The frequency synthesizers are programmed with the appropriate RF frequency to which the Prolink system is tuned, to transmit to and receive transmissions from the base station, using the I²C bus. Additionally, the CPU card contains an analog-to-digital/digital-to-analog (A-to-D/D-to-A) converter, with four A-to-D inputs and one D-to-A output, driven by the I²C bus. This contributes to a very small, tightly integrated, few trace package, without need for a more complicated multi-layer card. The CPU card is only a four layer card with a power plane, a ground plane and two digital trace planes. If parallel interfaces to the A-to-D/D-to-A converter and the frequency synthesizers had been used, at least one and possibly two more layers would have been added with attendant complexity and cost.

The other main section of the CPU video controller card (the first being the CPU section and its components), is the video controller section. The principal video controller requirements for the Prolink system are the need to drive a high resolution color graphics display, and to display information on either or both a cathode ray tube (CRT, or computer monitor) and an LCD panel. The high resolution color graphics display supports photograph-quality advertisements and digital course map details. As LCD brightness is improved and LCD panel cost is lowered, the LCD panel may become advantageous for use over a CRT display. The CRT currently used in the preferred embodiment of the cart-based unit is a monitor using a Sony Trinitron tube and developed by Display Technologies, Inc.

The video controller requires a very high level of chip integration, to avoid numerous discrete components or many low level ICs, resulting in selection of the 90C20 video controller available from Western Digital. The 90C20 device is capable of supporting up to 1 meg of dynamic RAM, which is compatible with the Prolink system usage, and to address and write video imagery data to the RAM. In addition, the 68332 microcontroller cart access the dynamic RAM through the 90C20 device to update graphics images. The 90C20 video controller is periodically refreshed to support full video graphics array, and represents a single chip solution for the CRT horizontal vertical timing or flat panel timing, and the RAM refresh control. The 68332 device writes video data into DRAM (dynamic RAM), the contents of the DRAM are then scanned and pumped through the A-to-D/D-to-A converter to create red, green, and blue drive signals for the red, green, and blue electron guns.

Also on board the 90C20 video controller is a color palate register which provides the 256 colors for the display. Importantly, the highly integrated single chip video solution is quite economical in that it carries a relatively low price tag for purchases in quantity.

Figure 20A:
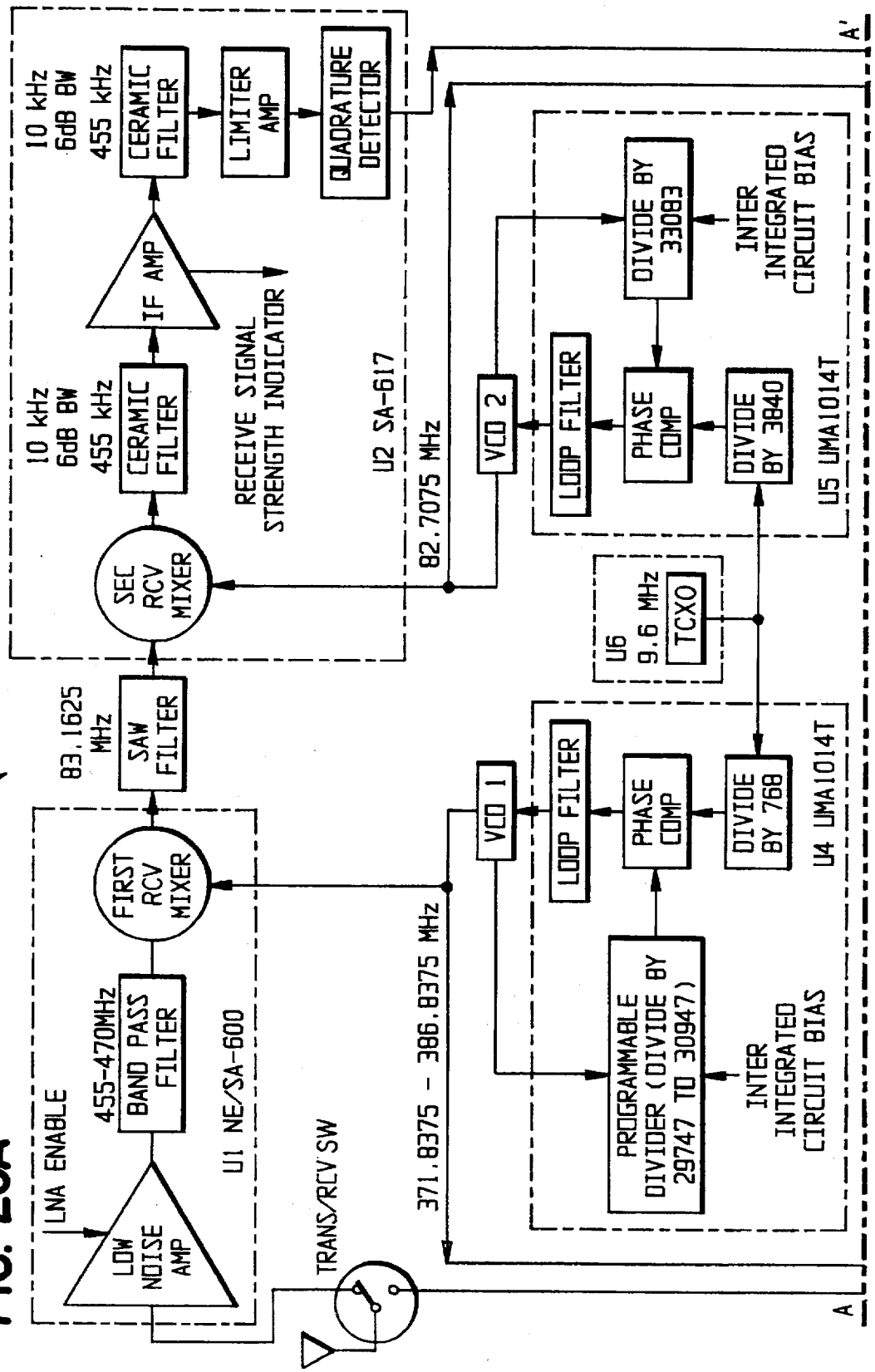
FIG. 20 is a detailed block diagram of the RF card of FIG. 9.
Figure 20B:
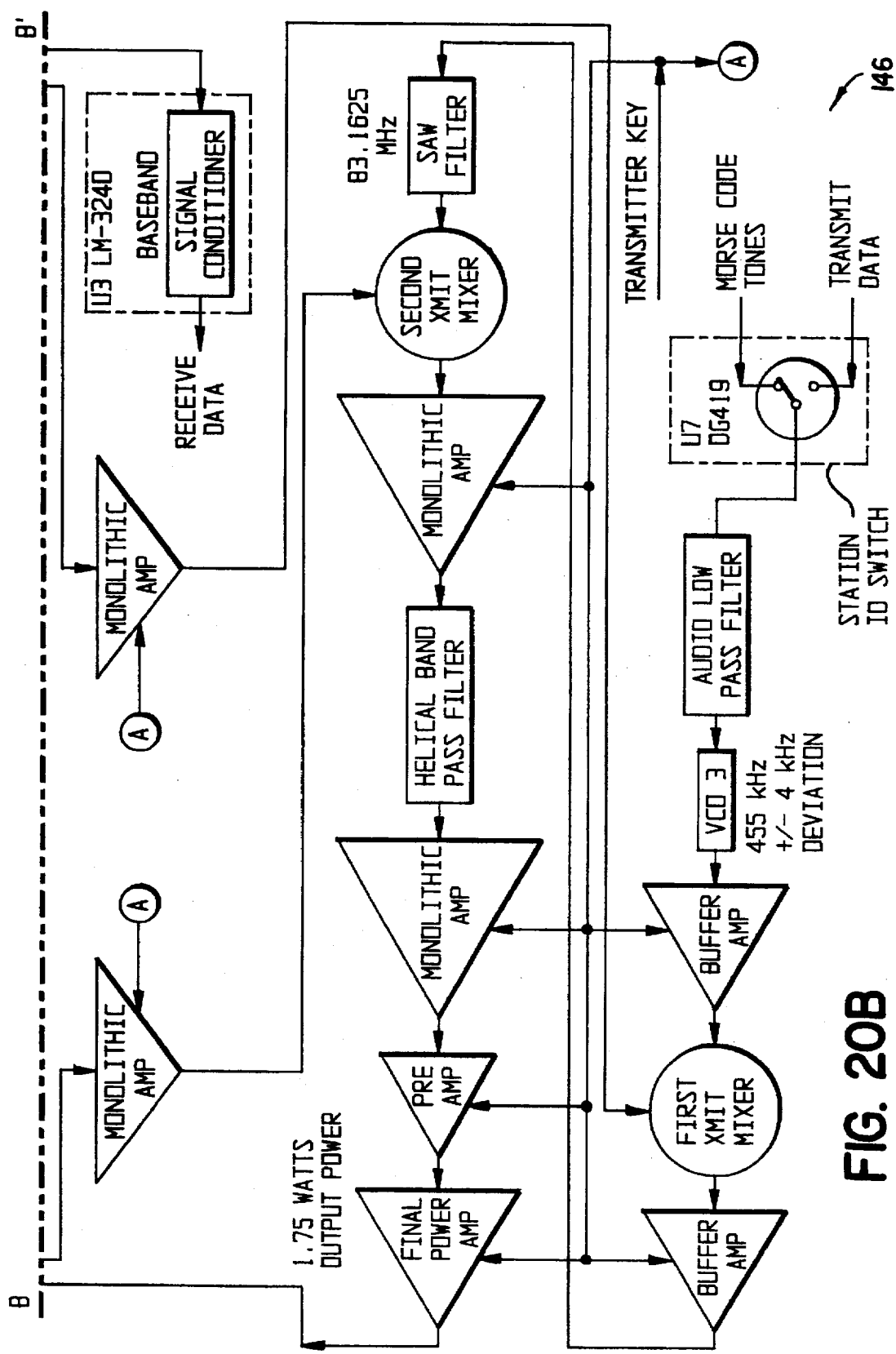

A block diagram of the RF card is shown in FIG. 20. The unit uses a digitally tuned UHF FSK transceiver. A key requirement for the RF card is that it be able to transmit as well as to receive. The operating range of the system is preferably a minimum of two kilometers, with a transmit power of not more than two watts, to avoid a need for compliance with current FCC limitations. Two watts allows the system to fall under the regulatory rules of the UHF offset band in the 450–470 MHz region of the spectrum, which is a typical radius of operations for a golf course (i.e., two kilometers or an approximately one and one-quarter mile radius is about the largest size to be expected for a typical 18 hole course. The RF card is frequency synthesized in design, so that the CPU card may command the RF card to tune to different frequencies. This is important for dynamic asset management. For example, if a course has 80 PROLINK systems carts and is currently regularly only using 40, the 40 unused carts may readily be transferred to another course for greater utilization and return on assets. To that end, it is important that the receiver/transmitter (R/T) have the capability to change frequencies to enable transmissions on the frequencies authorized for the other course by the FCC, and to avoid a need to reprogram the R/T with a new frequency.

In addition to its other advantages, FSK may be implemented at relatively low cost, compared to other potential solutions. Although binary frequency shift keying modulation is not very band width efficient, it does allow a simplified receiver design and the substantially lower cost of implementation. Further, bandwidth inefficiency is more than compensated in the PROLINK system through use of the variable length network described earlier herein.

Referring now in greater detail to FIG. 20, the receiver/transmitter card is relatively small, typically three inches by four inches, with two layers consisting of a trace layer on top and a ground plane on the back side of the card. A connector and various other components are also placed on the back side of the card. The R/T card is powered by +5 volts and +12 volts, and has a frequency range of operation between 455–470 MHz. The received RF signal passes from an antenna to a band pass filter, which may be implemented in discrete components, acting as a preselect filter over the entire frequency range, which prevents any spurious signals in the cellular band or the VHF band from squeezing through into the mixer stage. Continuing on the receiving side, an NE 600 Philips/Signetics Semiconductor circuit chip is a low noise amplifier and first stage mixer receiver that boosts the incoming RF signal gain about 20 db. An automatic gain control is implemented in the low noise amplifier in that the NE 600 may be turned on or off through the CPU card and the 68332 processor.

A voltage controlled oscillator (VCO) operating between about 370–385 MHz mixes the incoming RF data down to a 83.1625 MHz signal, which is passed through a SAW filter, i.e., a surface acoustic wave filter. This filter has very high roll off characteristics with the desired bandwidth. After passing through the SAW filter, the signal goes into a second receiver mixer, which is part of an NE 617 chip also manufactured by Philips/Signetics Semiconductor. The second mixer converts the 83.1625 MHz signal to 455 kHz, a traditional intermediate frequency. Thus, the PROLINK R/T card has two IF (intermediate frequency) amplifiers, one at 83.1625 MHz and another at 455 KHz. The single chip NE 617 device implements a receiver mixer, ceramic filters, an amplifier, and a quadrature detector. A received signal strength indicator is passed through the A/D converter on the CPU card into the 68332 processor, and gives the 68332 knowledge of that signal strength.

A second VCO performs the conversion from 83.1625 MHz to 455 KHz by mixing an 82.7075 MHz signal with the 83.1625 MHz signal to provide the 455 KHz signal. The quadrature detector of the NE 617 chip aids in demodulating frequency shift keying data in that it provides an indication of the baseband signal that is either higher or lower than the reference. If the deviation were 5 KHz for the frequency shift keying, and the carrier frequency were 460 MHz to the center of the band, the FSK would shift around the 455 KHz IF frequency, and would move from 455 to 460 to 455 to 450 KHz, with the frequency transitions being proportional to the bit rate. A logic one may be represented by a 460 KHz IF demodulated signal, and a logic zero may be represented by a 450 KHz signal. The quadrature detector takes the ±5 KHz deviation baseband demodulated signal and provides a digital representation through a comparator, as the received digital data. The output voltage of the quadrature detector is applied through a signal conditioner, and, if that output voltage is higher than the reference, it becomes a logic one, or, if lower than the reference, it becomes a logic zero. Hence, the received digital data stream is reconstructed by the quadrature detector and the signal conditioner/comparator.

Both frequency synthesizers are Philips/Signetics model UMA 1014. The first of the two uses a 9.6 MHz TCXO (a thermally controlled crystal oscillator) and multiplies that frequency through the VCO to the 370 to 385 MHz range. This range is achieved in that the CPU video controller card cart program the frequency of the frequency synthesizer frequency through the I$^2$C bus. For example, programming a divide-down factor such as divide by 768 to provide a 12.5 KHz output, as the channel spacing or ±12.5 KHz as a 25 KHz bandwidth, may be used to shift around the 360 to 380 MHz VCO. In essence, the output of the frequency synthesizer steers the VCO to achieve the desired frequency, e.g., the mid-point of the band 370 MHz, which is fed back to the frequency synthesizer through a programmable divider (a prescaler), that reduces the frequency to a convenient value.

A phase locked loop compares the 12.5 KHz output from the synthesizer divider to the feedback frequency that has been divided down. If they are the same, then the frequency is 370 MHz; if they are different, however, then the phase locked loop changes the output voltage driving the device to pull the VCO into the right frequency. The second stage mixer is implemented in the same way, except that the VCO is more easily implemented because of the lower frequency. The second synthesizer is also programmed by the I$^2$C bus.

Both frequency synthesizers are fed by a common, conventional thermally controlled crystal oscillator running at 9.6 MHz. The TCXO must perform at a maximum error of five parts per million over the full temperature range of operation to comply with FCC rules on frequency selectivity for the transmitter. If, for example, a transmitter is to transmit at 460 MHz but actually transmits at 460 MHz plus 50 KHz, not only has the signal been missed, or the channel slot been missed, but the signal is riding on top of another channel slot and therefore interfering with another operator.

It will be seen, then, that the receiver is implemented primarily using four circuit chips—the NE 600, NE 617, and two UMA 1014's for the first and second stage mixers, along with a few discrete components such as the VCO's, the SAW filter, the band pass filter, the antenna input, and so forth. Referring now to the transmitter, one challenge is to put the transmitter on the same card as the receiver, principally because of the danger of blowing out the receiver. In the PROLINK system, when the transmitter is powered, on the transmit/receive switch is switched to the transmit position so that none of the two watt transmitter power out of the final stage amplifier is allowed to feed back into the high sensitivity NE 600 chip. The receiver and transmitter are preferably partitioned on the card.

The transmitter cart run up to 2400 bps, as is done in the PROLINK system, without exceeding the allocated FCC bandwidth. That is a strategic number in that 2,048 is 2 to the 11th power. By processing or transmitting data at a power of 2 bit rate data cart also be received at that rate, which allows more effective scaling of input information. A divide or multiply function cart be implemented by merely shifting bits left or right. That is important to preserving throughput in the processor without need for a floating point processor or co-processor, either of which would add considerably to system cost. When a logic one is transmitted by the CP video controller card over the transmit serial data interface, the 455 KHz frequency is pulled up to 460 KHz, whereas a logic zero pulls the frequency down 5 KHz to 450 KHz. This provides an open loop VCO, with no phase locked loop to hold the frequency at 455 KHz. Therefore, the serial data stream can be transmitted in a very simple manner, with the frequency shift keying for a logic one and a logic zero and a 5 KHz deviation for transmitting data.

The PROLINK RF receiver/transmitter card utilizes a unique method of conversion from the transmitter. It is desirable to transmit and receive on the same frequency—to use only one FCC frequency to implement the system. In turn it is then only necessary to feed one set of frequency synthesizers, if properly done, and the transmit up conversion from IF of 455 KHz to the second IF of 90 MHz, to the RF frequency of 450–470 MHz is precisely the reverse of the received down conversion frequencies. Hence, the first mixer is driven by the same frequency synthesizer that drove the second mixer on the receiver section of the card. Also, the second mixer on the transmit side is driven by the same frequency synthesizer as the first receiver mixer. The signal, say, 450 MHz, is mixed with another frequency through a transistor scheme, with say, 360 MHz. The resulting signal is the original fundamental frequency plus and minus the mixing frequency. Therefore, the fundamental frequency is 450 MHz, and the output of the mixer in this case is two frequencies, a 90 MHz frequency and an 810 MHz frequency, and the undesirable second derivative frequency of 810 MHz is removed.

The RF frequency shift keying transceiver is not only cost effective and of very simple design, but also cart be programmed under computer control. Thus, the computer cart readily maintain the FCC authorized frequency without concern for deviation from that frequency.

Figure 21:
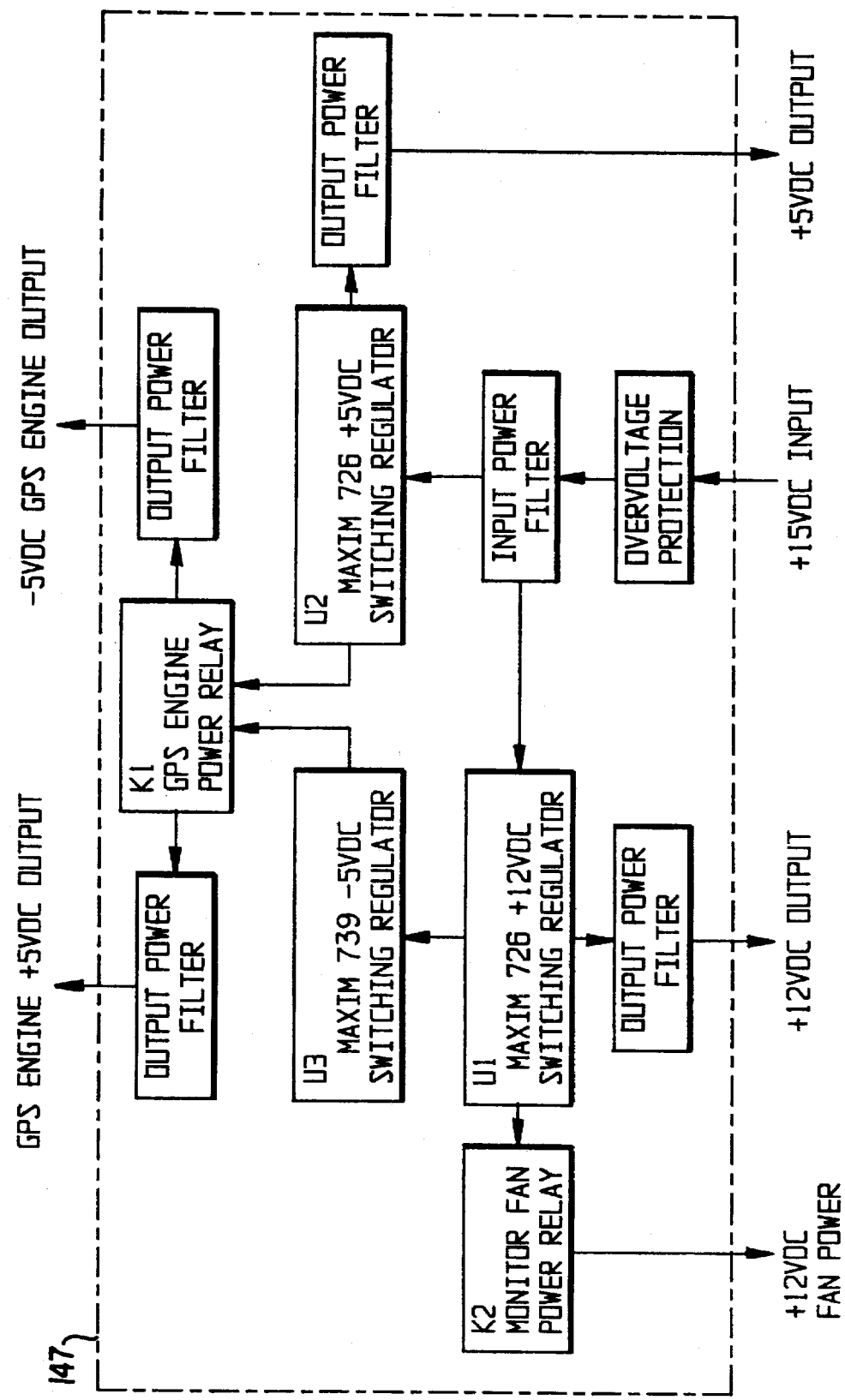
FIG. 21 is a detailed block diagram of the power distribution card of FIG. 9.

A block diagram of the PROLINK power supply card of FIG. 9 is shown in FIG. 21. The card includes an input power filter for receiving an input power supply voltage. The output of the input power supply filter is coupled to three switching regulators: (1) a +5 volts switching regulator, (2) a +12 volts switching regulator, and (3) a −5 volts switching regulator. The output of the +12 volts regulator is supplied to an output power filter and then supplied to RF card 146 (of FIG. 9). The output of the +5 volts regulator is supplied to an output power filter and then supplied to CPU/video card 147 (FIG. 9). Also, the output of the +5 volts regulator is supplied to a GPS engine relay. The output of the −5 volts regulator is also supplied to the GPS engine relay where either +5 volts or −5 volts is supplied to GPS engine 145 (FIG. 9) via a power filter. Additionally, power distribution card 147 includes an overvoltage protection circuit and a fan relay.

Although a preferred embodiment and method have been described to illustrate the best mode presently contemplated of practicing the invention, it will be apparent to those skilled in the relevant art that variations and modifications may be made without departing from the true spirit and scope of the invention. Accordingly, it is intended that the invention be deemed limited only to the extent required by the appended claims and the rules and principles of the relevant law.

What is claimed is:

1. A method for creating a digital map of a golf course, comprising the steps of:

collecting survey data around the outline of each object to be surveyed on the course by collecting Global Positioning System (GPS) position data around the perimeter of each object;

post processing said survey data including the substeps of:

low pass filtering said survey data to reduce noise in said survey data and smooth the outline of each object for which survey data was collected;

removing overlapping segments comprising the outline of each object;

removing crossing segments comprising the outline of each object; and compressing said survey data by discarding at least some data points collected among the survey data for the outline of an object selected to be surveyed which are within a predetermined permissible error for display of the outline of the selected object.

2. The method of claim 1, further including the step of converting said GPS position data to an x-y grid coordinate system for said post-processing.

3. The method of claim 1, wherein the step of collecting survey data includes:

collecting a plurality of differential GPS (DGPS) corrected data points for said position data around the outline of an object selected to be surveyed on the course, and connecting the DGPS data points collected for the selected object to produce a vector list as a series of straight line segments between successive data points describing the outline of said selected object, in which the data points constitute vertices of the segments.

4. The method of claim 3, wherein the step of discarding data points includes:

eliminating at least some of those among the collected DGPS data points which lie between a pair of data points for which the outline of the selected object is relatively straight according to said predetermined permissible error, and retaining at least those among the collected DGPS data points which lie between a pair of data points for which the outline of the selected object has a relatively significant curvature according to said predetermined permissible error.

5. The method of claim 1, further including the step of selectively displaying the created map of the golf course on a real-time display monitor.

6. The method of claim 5, wherein the step of displaying the created map of the golf course on a real-time display monitor comprises positioning the display monitor in a clubhouse for the golf course, and further displaying the real-time positions of golf carts on the course as identifiable cart points on the displayed map on the monitor, whereby to provide real-time information on the status of play of the course by golfers who utilize the carts by observation of the monitor.

7. The method of claim 5, wherein the display monitor is located in a golf cart for use in playing the course, and further including displaying the real-time position of the golf cart on the course as an identifiable cart point on the displayed map on the monitor, whereby to provide information to a golfer using the cart regarding relative distance between said real-time position of the cart and a selected object on the course, for improving play.

8. The method of claim 7, further including the step of selectively posting the distance between said golf cart and a selected object on the course by displaying said distance on demand as a measurement value on the monitor in the cart.

9. The method of claim 7, further including:

storing the compressed survey data remaining after said post processing, and selectively retrieving a portion of the stored compressed survey data representing the next hole to be played when the golf cart approaches a tee box thereof, for automatic switching to a display of the map of said next hole on the cart monitor.

10. The method of claim 5, wherein the display monitor is a color monitor, and wherein the step of selectively displaying the created map of the golf course on said display monitor includes displaying selected features of each hole of the course in distinctive colors relatively closely matching the actual colors of the respective selected features for enhanced realistic display as part of the map.

11. The method of claim 1, wherein the step of collecting survey data is performed relative to a preselected reference point on or near the golf course.

12. A method for creating a map of the layout of a golf course including each hole of the course and features of each hole selected from a group comprising tee-box, cup, green, fairway, rough, hazards, and cart paths, for display on a monitor, said method comprising the steps of:

using a position determining system to collect survey data as data points for those of said features selected to be surveyed, including collecting data points by traversing the boundary of at least some of the selected features, relative to a preselected reference point so that all of the survey data points for each of the selected features and each said boundary are uniquely identified with respect to said reference point, and processing the survey data for display as said map on said monitor.

13. The method of claim 12, wherein:

the step of collecting survey data is performed using a satellite navigation system as said position determining system.

14. The method of claim 13, wherein:

the satellite navigation system is a Global Positioning System (GPS).

15. The method of claim 14, wherein:

the collection of survey data is performed using real-time Differential GPS (DGPS) processing.

16. The method of claim 14, further including the step of:

subsequently processing the collected survey data for correction using Differential GPS (DGPS) processing.

17. The method of claim 14, wherein:

the reference point is preselected to be located at an arbitrary fixed position on or near the golf course, and further including the step of determining a set of coordinates representative of the arbitrary position of the reference point relative to which said survey data is to be collected, independent of a determination of precise geodetic position of either the reference point or respective ones of the selected features.

18. The method of claim 17, wherein the step of collecting survey data includes:

collecting a plurality of spaced-apart data points about the perimeter of a selected feature to loosely define the outline of the selected feature, and creating a vector list representing successive substantially straight line segments connecting adjacent selected pairs of the collected data points for the selected feature to better define the outline thereof.

19. The method of claim 18, wherein the step of processing the survey data includes compressing the survey data by:

eliminating at least some of the collected data points which lie between a pair of more widely separated data points and whose vectors are within a preselected maximum deviation value relative to a line connecting said pair of more widely separated data points, to produce a realistic approximation of the outline of the selected feature suitable for display, and processing the remaining data points and their associated vectors to display the selected feature as part of the map of the course for observation of points of interest thereon.

20. The method of claim 19, wherein:

the step of processing the remaining data points and their associated vectors is performed to remove overlap and crossing among said line segments to further compress the survey data and enhance said realistic approximation.

21. The method of claim 20, further including:

processing collected data points and vectors associated therewith to smooth the outline of the selected feature.

22. The method of claim 19, further including:

processing the compressed survey data for display of the map on a color monitor, and filling in the outline of at least some of the selected features with representative color information during processing of the collected survey data to provide said at least some selected features of each hole of the course with distinctive colors relatively closely matching the actual colors of the respective selected features, for enhanced realistic display as part of the map on the color monitor.

23. The method of claim 22, wherein the color monitor is at a location suitable for viewing by a course manager, and further including storing the compressed survey data for retrieval together with real-time GPS data for display of real-time positions of golf carts on the course as moving symbols on the course map, indicative of the status of play of the course by golfers who utilize the carts.

24. The method of claim 22, wherein the color monitor is located in a golf cart for use by golfers in playing the course, and further including storing the compressed survey data for retrieval together with real-time GPS data for display of the real-time position of the golf cart on the course as a symbol whose movement on the displayed course map tracks that of the cart on the course, to enhance the golfers' knowledge of the course and the features of individual holes thereof.

25. The method of claim 24, including:

further processing retrieved compressed survey data for manipulation with real-time GPS data for selective display of a measure of the real-time distance between the golf cart and a selected feature on the course map displayed on the cart monitor.

26. The method of claim 24, further including:

selectively retrieving a portion of the stored compressed survey data representing the next hole to be played when the golf cart approaches a tee box thereof, for automatic switching to a display of the map of said next hole on the cart monitor.

27. The method of claim 19, further including:

manipulating the compressed survey data for selective rotation of a displayed hole represented thereby to enable desired changes of the orientation of the map thereof on the monitor.

28. The method of claim 18, wherein said monitor is located in a golf cart together with a GPS receiver, and further including the step of:

recalling collected survey data while GPS data is being processed, for display of the real-time position of the cart on the course as a symbol of corresponding movement within the course map on the cart monitor, to enhance play of the course by enabling the cart user to view the cart position relative to the hole being played and the selected features thereof.

29. The method of claim 18, wherein said monitor is located in a base station of the course together with a GPS receiver, for operation in conjunction with a plurality of golf carts employing GPS and GPS data processing while in use on the course, and further including the step of:

retrieving collected survey data while GPS data is being processed, for display of the real-time position of each said cart when powered on for use on the course as a symbol of corresponding movement within the course map on the base station monitor, to enhance management of the course usage by enabling a course administrator at the base station to view the status of individual play of the course by each cart user and collective play by all cart users.

30. The method of claim 29, wherein the arbitrary position of said reference point is preselected to coincide with the location of an antenna for the GPS receiver at the base station.

31. The method of claim 12, further including the step of:

determining a set of coordinates defining an arbitrary position of the preselected reference point to establish an origin for collection of survey data, whereby the amount of survey data required for collection and storage for said map is reduced by eliminating a need for obtaining precise geodetic coordinates of the reference point and each data point.

32. A method for creating a digital map as a realistic approximation of the layout of a golf course including each hole of the course and selected features of each hole affecting play thereof, for use in viewing the real-time position of a roving unit used by golfers playing the course as a symbol whose movement corresponds to that of the roving unit on selected portions of said map when displayed on a display monitor, said method comprising the steps of:

using a Global Positioning System (GPS) to obtain survey data for each hole and features thereof selected for the map, including:

collecting a plurality of spaced-apart data points about the perimeter of selected features of each hole with a mobile GPS receiver to loosely define the outline of each such selected feature, and creating a vector list representing successive substantially straight line segments connecting adjacent selected pairs of the collected data points for each such selected feature to better define the outline thereof; and processing the survey data for display on said monitor.

33. The method of claim 32, wherein the step of processing the survey data includes compressing the survey data to reduce storage requirements therefor, by:

eliminating at least some of the data points which lie between a pair of more widely separated ones of the collected data points and whose vectors are within a preselected maximum allowable deviation value relative to a line connecting said pair of more widely separated data points, and processing the remaining data points and their associated vectors to produce a realistic approximation of the outline of the selected feature on the map for viewing on the display monitor.

34. The method of claim 33, wherein the step of processing the remaining data points and their associated vectors includes:

removing overlapping and crossing among said line segments to further compress the survey data.

35. The method of claim 33, including:

further processing the collected survey data for display on a color monitor incorporated in a roving unit, and filling in the outline of at least some of the selected features with representative color information during processing of the collected survey data to provide selected features of each hole of the course with distinctive colors relatively closely matching the actual colors of the respective selected features, for enhancing a realistic representation thereof in the map displayed on the color monitor.

36. The method of claim 32, including:

storing the processed survey data and triggering retrieval of a portion thereof representing the next hole to be played for automatic display of the map thereof on a display monitor incorporated in a roving unit, when the roving unit having said display monitor is brought into predetermined close proximity to a tee box of said next hole.

37. The method of claim 32, including:

further processing the collected survey data for display of the created map on a display monitor incorporated in a roving unit having a GPS receiver for identifying the real-time position thereof as a moving symbol on the map, whereby a golfer playing the course with the roving unit can view the position thereof on the map of the course displayed on the monitor, and further to enable selection of a scaled version of the map of the entire course or of selected portions including individual holes thereof for display on said roving unit monitor.

38. The method of claim 37, including:

further processing the collected survey data for retrieval during processing of GPS data for selectively posting the real-time distance between the roving unit and a selected feature of the golf course in conjunction with the course map displayed on the roving unit monitor.

39. The method of claim 32, including:

further processing the collected survey data for display of the created map on a display monitor located at a base station having a GPS receiver, for interacting with a plurality of roving units employing GPS, to identify the real-time position of each roving unit on the course as a moving symbol on the course map, whereby a course manager can view the relative positions of the roving units, and thereby the status of play of the course by golfers using the roving units, on the map of the course displayed on the base station monitor.

40. The method of claim 32, including:

further processing the collected survey data for rotation to a predetermined orientation of the created map for each hole when individually displayed on the monitor.

41. The method of claim 32, further including:

storing at least a portion of the processed survey data including the location of a tee box on each hole for display on the map of the respective hole on a monitor in a roving unit, and updating the location of the tee box on each hole when desired to reflect a course-designated change of tee box location for display on the roving unit monitor, by reprogramming the respective stored data indicative thereof.

42. A method of digitally mapping features of a hole of a golf course that affect play of the hole for real-time display on a monitor used during play of the hole, said method comprising the steps of:

moving a position data collector of a position determining system about the perimeter of each of the hole and at least some of the features thereof selected to be mapped, to obtain survey data for use in displaying a map of the hole on the monitor, eliminating some portions of the survey data which are unessential for depicting a realistic approximation of an outline of the actual hole and of selected features thereof on the map, and processing the remaining survey data to provide a digital representation thereof suitable for display of a map of the hole on the monitor.

43. The method of claim 42, wherein:

the positioning system is a Global Positioning System (GPS), and the position data collector comprises a GPS receiver.

44. The method of claim 43, wherein:

the survey data is obtained as a plurality of differential GPS (DGPS) corrected data points.

45. The method of claim 44, further including:

employing the DGPS corrected data points in an x-y grid coordinate system having a preselected reference point.

46. The method of claim 43, wherein:

the position data collector includes a golf cart incorporating said GPS receiver.

47. The method of claim 43, wherein:

the golf cart has said monitor mounted therein for use during play of the course with said cart.

48. The method of claim 47, including:

obtaining survey data in mapping all holes of the course with said golf cart, and storing the survey data for retrieval such that each hole is displayed by automatically switching to a map thereof on the monitor for play thereof in its respective order of succession when the golf cart approaches within a predetermined distance from a tee box of the respective hole.

* * * * *